United States Patent
Kleinert et al.

(10) Patent No.: US 11,077,526 B2
(45) Date of Patent: Aug. 3, 2021

(54) LASER PROCESSING APPARATUS, METHODS OF LASER-PROCESSING WORKPIECES AND RELATED ARRANGEMENTS

(71) Applicant: ELECTRO SCIENTIFIC INDUSTRIES, INC., Beaverton, OR (US)

(72) Inventors: Jan Kleinert, Beaverton, OR (US); Zhibin Lin, Beaverton, OR (US); Hisashi Matsumoto, Beaverton, OR (US)

(73) Assignee: Electro Scientific Industries, Inc., Beaverton, OR (US)

( * ) Notice: Subject to any disclaimer, the term of this patent is extended or adjusted under 35 U.S.C. 154(b) by 498 days.

(21) Appl. No.: 15/750,140

(22) PCT Filed: Sep. 8, 2016

(86) PCT No.: PCT/US2016/050804
§ 371 (c)(1),
(2) Date: Feb. 2, 2018

(87) PCT Pub. No.: WO2017/044646
PCT Pub. Date: Mar. 16, 2017

(65) Prior Publication Data
US 2019/0001442 A1    Jan. 3, 2019

Related U.S. Application Data

(60) Provisional application No. 62/216,102, filed on Sep. 9, 2015, provisional application No. 62/241,624, filed
(Continued)

(51) Int. Cl.
*B23K 26/08*    (2014.01)
*B23K 26/382*    (2014.01)
(Continued)

(52) U.S. Cl.
CPC ........ *B23K 26/382* (2015.10); *B23K 26/0622* (2015.10); *B23K 26/082* (2015.10); *B23K 26/703* (2015.10); *B23K 2103/54* (2018.08)

(58) Field of Classification Search
CPC .. B23K 26/06; B23K 26/0648; B23K 26/064; B23K 26/382; B23K 26/0622;
(Continued)

(56) References Cited

U.S. PATENT DOCUMENTS

| 4,081,653 A | 3/1978 | Koo et al. |
| 4,328,410 A | 5/1982 | Slivinsky et al. |

(Continued)

FOREIGN PATENT DOCUMENTS

| CN | 101099226 A | 1/2008 |
| DE | 102013201968 B4 | 8/2014 |

(Continued)

OTHER PUBLICATIONS

The PCT/US2016/050804, international search report dated Dec. 26, 2016, 3 pages.
(Continued)

*Primary Examiner* — Charles P. Cheyney

(57) ABSTRACT

Apparatus and techniques for laser-processing workpieces can be improved, and new functionalities can be provided. Some embodiments discussed relate to processing of workpieces in a manner resulting in enhanced accuracy, throughput, etc. Other embodiments relate to realtime Z-height measurement and, when suitable, compensation for certain Z-height deviations. Still other embodiments relate to modulation of scan patterns, beam characteristics, etc., to facilitate feature formation, avoid undesirable heat accumulation, or otherwise enhance processing throughput. A great number of other embodiments and arrangements are also detailed.

20 Claims, 15 Drawing Sheets

Related U.S. Application Data on Oct. 14, 2015, provisional application No. 62/271,446, filed on Dec. 28, 2015, provisional application No. 62/294,991, filed on Feb. 12, 2016, provisional application No. 62/366,984, filed on Jul. 26, 2016.

(51) Int. Cl.
  *B23K 26/082* (2014.01)
  *B23K 26/0622* (2014.01)
  *B23K 26/70* (2014.01)
  *B23K 103/00* (2006.01)

(58) Field of Classification Search
  CPC ............... B23K 26/082; B23K 26/703; B23K 2103/50; B23K 2103/54
  USPC .............. 219/121.61, 121.6, 121.68, 121.69, 219/121.78, 121.71
  See application file for complete search history.

(56) References Cited

U.S. PATENT DOCUMENTS

| | | | |
|---|---|---|---|
| 4,792,930 A | 12/1988 | Kobayashi et al. | |
| 4,912,487 A | 3/1990 | Porter et al. | |
| 5,633,747 A * | 5/1997 | Nikoonahad | .... G01N 21/95623 250/234 |
| 5,638,267 A | 6/1997 | Singhose et al. | |
| 5,751,585 A | 5/1998 | Cutler et al. | |
| 5,798,927 A | 8/1998 | Cutler et al. | |
| 5,825,551 A | 10/1998 | Clarkson et al. | |
| 5,837,962 A * | 11/1998 | Overbeck | .......... B23K 26/0665 219/121.68 |
| 5,847,960 A | 12/1998 | Cutler et al. | |
| 5,917,300 A | 6/1999 | Tanquary et al. | |
| 6,037,967 A * | 3/2000 | Allen | ................... B23K 26/032 347/255 |
| 6,081,325 A * | 6/2000 | Leslie | .................... G01N 21/94 356/237.2 |
| 6,314,473 B1 | 11/2001 | Singer et al. | |
| 6,430,465 B2 | 8/2002 | Cutler | |
| 6,700,600 B1 | 3/2004 | Sandstrom et al. | |
| 6,706,998 B2 | 3/2004 | Cutler | |
| 6,706,999 B1 | 3/2004 | Barrett et al. | |
| 6,816,294 B2 | 11/2004 | Unrath et al. | |
| 6,947,454 B2 | 9/2005 | Sun et al. | |
| 7,019,891 B2 * | 3/2006 | Johnson | ............. B23K 26/0626 219/121.6 |
| 7,027,199 B2 | 4/2006 | Johnson | |
| 7,033,188 B2 | 11/2006 | Johnson | |
| 7,133,182 B2 | 11/2006 | Johnson et al. | |
| 7,133,186 B2 | 11/2006 | Johnson et al. | |
| 7,133,187 B2 | 11/2006 | Johnson | |
| 7,245,412 B2 | 7/2007 | Bruland et al. | |
| 7,259,354 B2 | 8/2007 | Pailthorp et al. | |
| 7,605,343 B2 | 10/2009 | Lei et al. | |
| 7,611,745 B2 | 11/2009 | Nishikawa et al. | |
| 7,834,293 B2 | 11/2010 | Wile et al. | |
| 8,026,158 B2 | 9/2011 | Bruland et al. | |
| 8,076,605 B2 | 12/2011 | Bruland et al. | |
| 8,158,493 B2 | 4/2012 | Shah et al. | |
| 8,288,679 B2 | 10/2012 | Unrath | |
| 8,374,206 B2 | 2/2013 | Peng et al. | |
| 8,404,998 B2 | 3/2013 | Unrath et al. | |
| 8,497,450 B2 | 7/2013 | Bruland et al. | |
| 8,648,277 B2 | 2/2014 | Aplay et al. | |
| 8,680,430 B2 | 3/2014 | Unrath | |
| 8,847,113 B2 | 9/2014 | Unrath et al. | |
| 8,896,909 B2 | 11/2014 | Sandstrom et al. | |
| 8,928,853 B2 | 1/2015 | Lin et al. | |
| 9,259,802 B2 | 2/2016 | Willey et al. | |
| 2001/0045419 A1 | 11/2001 | Dunsky et al. | |
| 2003/0112323 A1 * | 6/2003 | Shirota | ................ G02B 26/127 347/246 |
| 2005/0184036 A1 | 8/2005 | Hunter et al. | |
| 2005/0224469 A1 | 10/2005 | Cutler et al. | |
| 2006/0114948 A1 | 6/2006 | Lo et al. | |
| 2011/0108531 A1 * | 5/2011 | Stokes | .................... B23K 26/40 219/121.69 |
| 2012/0273472 A1 * | 11/2012 | Unrath | ................. B23K 26/082 219/121.73 |
| 2014/0026351 A1 | 1/2014 | Willey et al. | |
| 2014/0083983 A1 | 3/2014 | Zhang et al. | |
| 2014/0197140 A1 | 7/2014 | Unrath | |
| 2014/0263201 A1 | 9/2014 | Unrath | |
| 2014/0263212 A1 | 9/2014 | Zhang | |
| 2014/0263223 A1 | 9/2014 | Unrath | |
| 2014/0312013 A1 | 10/2014 | Frankel et al. | |
| 2016/0243646 A1 * | 8/2016 | Kleinert | ............... B23K 26/066 |
| 2017/0036301 A1 * | 2/2017 | Zhang | ................. B23K 26/082 |
| 2019/0001434 A1 * | 1/2019 | Liu | ...................... B23K 26/082 |
| 2019/0143449 A1 * | 5/2019 | Zenou | ........................ B41J 2/04 219/76.1 |

FOREIGN PATENT DOCUMENTS

| | | |
|---|---|---|
| JP | 1992-033788 A | 2/1992 |
| JP | 2003-136270 A | 5/2003 |
| JP | 2012-115899 A | 6/2012 |
| JP | 2014-514754 A | 6/2014 |
| WO | WO2009/087392 A1 | 7/2009 |
| WO | WO2014/152380 A1 | 9/2014 |
| WO | WO2015/108991 A3 | 7/2015 |

OTHER PUBLICATIONS

The PCT/US2016/050804, written opinion, 14 pages.
The office action dated Aug. 1, 2019 to the Chinese Application No. 201680048544.2, 21 pages.
The office action dated Sep. 29, 2020 to Japanese patent application No. 2018-512536, 7 pages.
Colin J. Moorhouse et al., "Laser Drilling of Copper Foils for Electronics Applications", IEEE Transaction on Components and packaging Technologies, vol. 30, No. 2, Jun. 2007, p. 254-263.

* cited by examiner

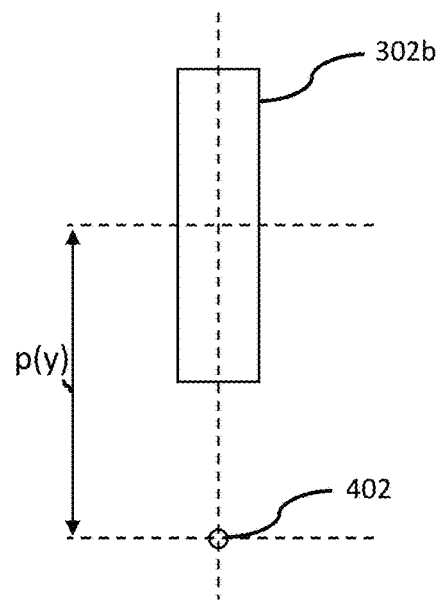
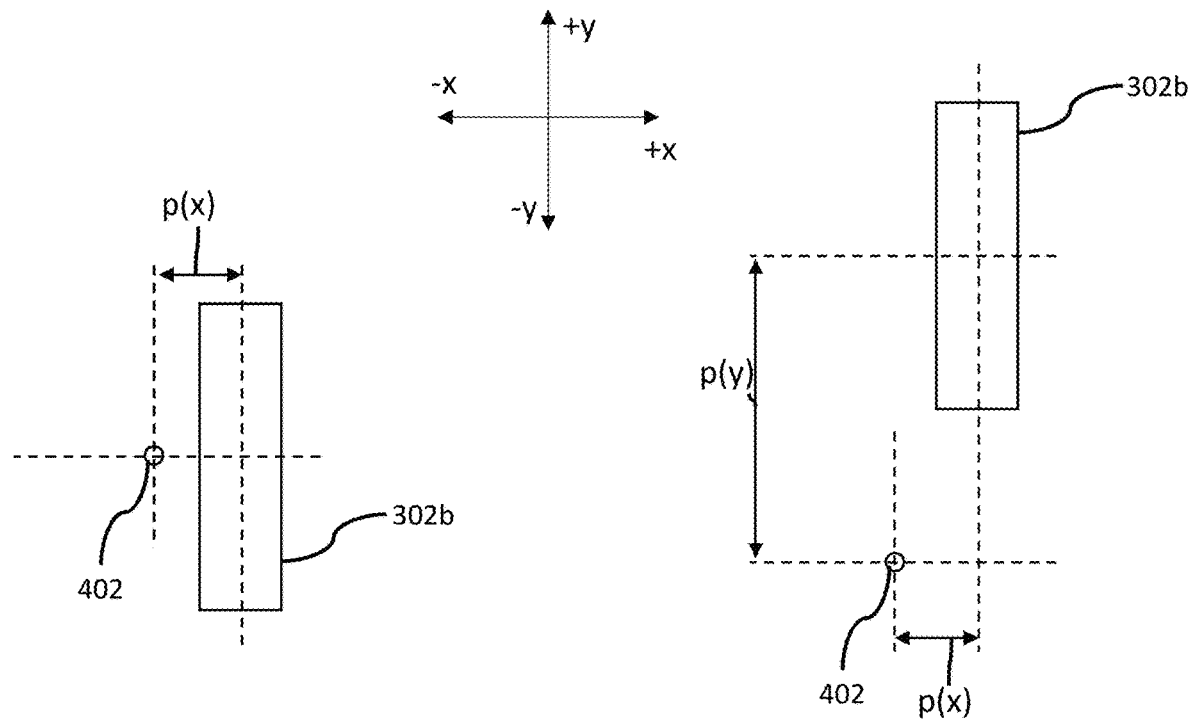
FIG. 4
FIG. 5
FIG. 6

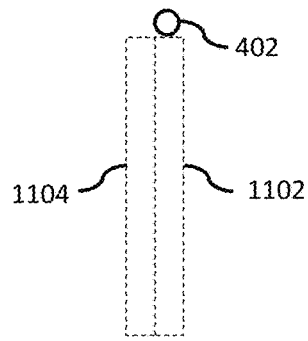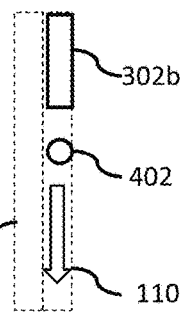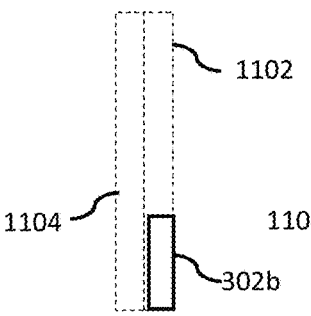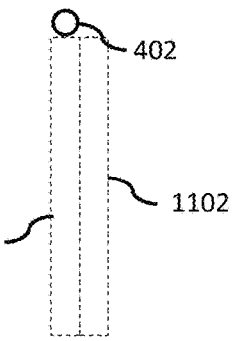
FIG. 11　　FIG. 12　　FIG. 13　　FIG. 14
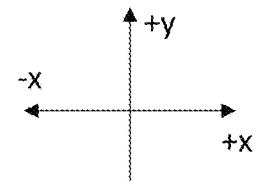
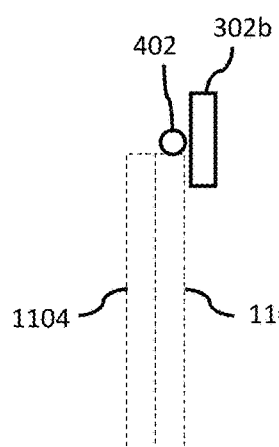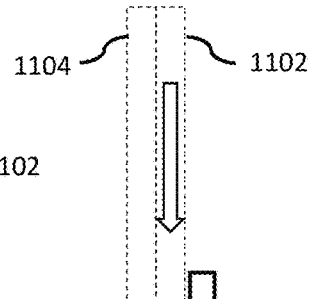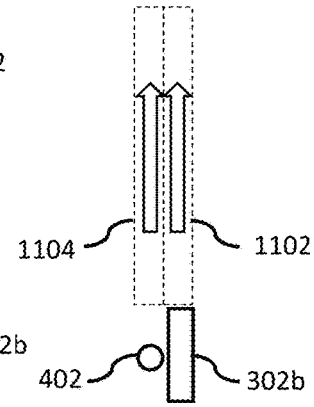
FIG. 19　　FIG. 20　　FIG. 21

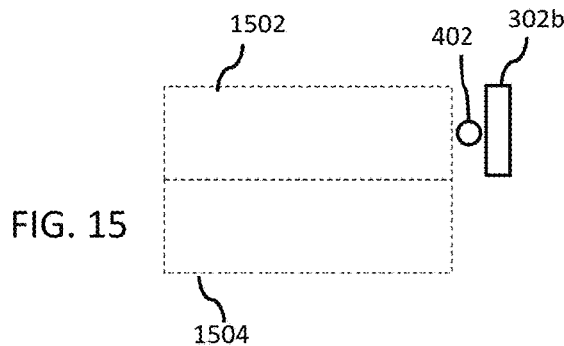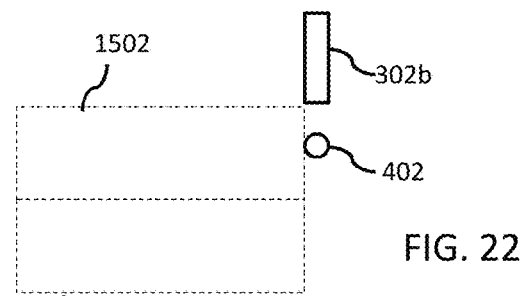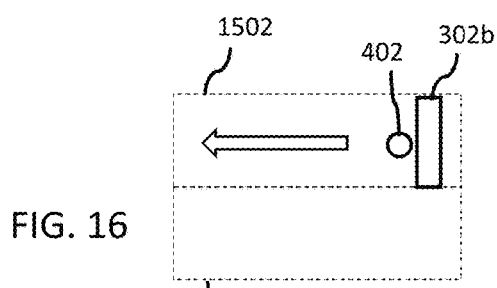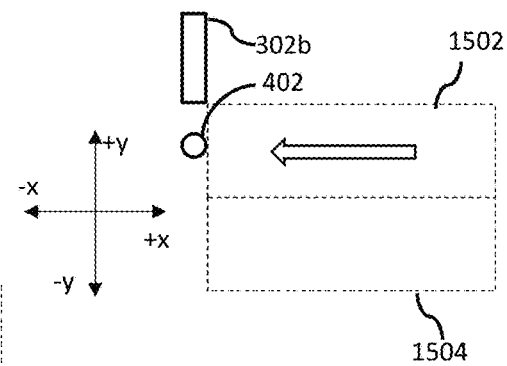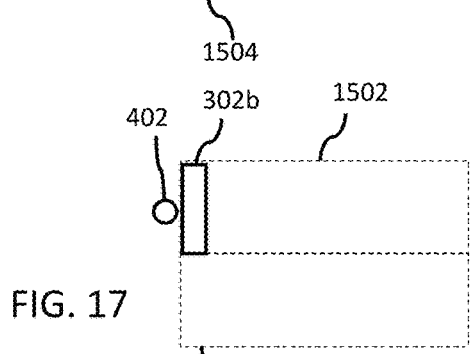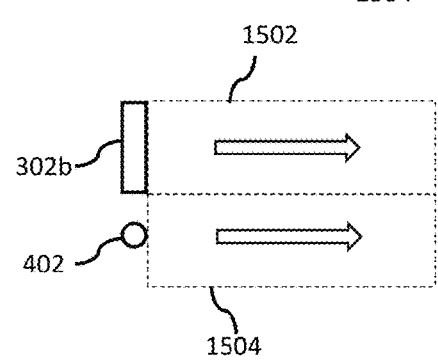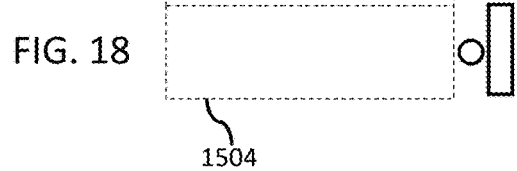

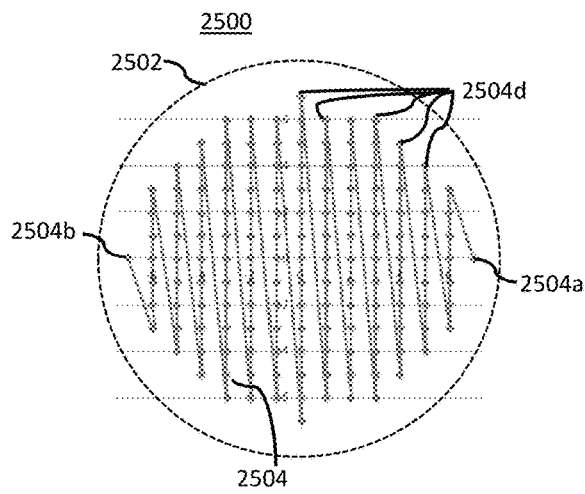
FIG. 25
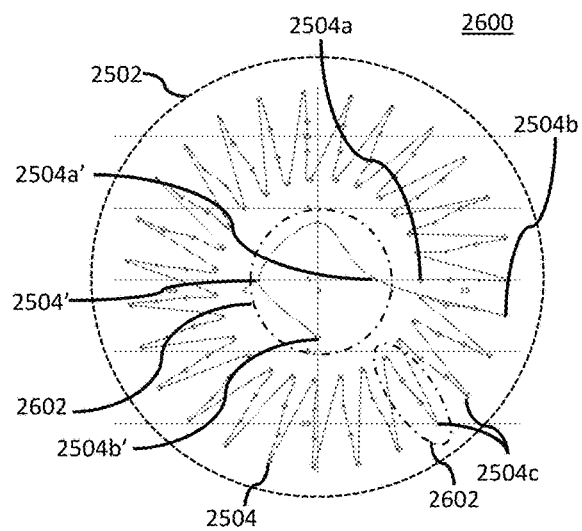
FIG. 26
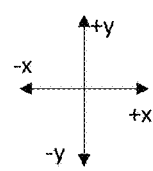
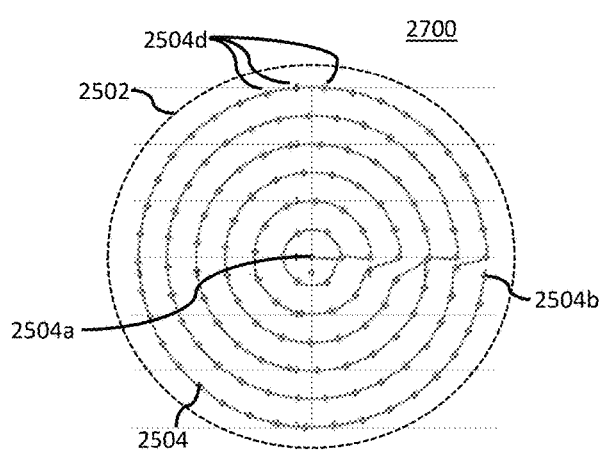
FIG. 27

LASER PROCESSING APPARATUS, METHODS OF LASER-PROCESSING WORKPIECES AND RELATED ARRANGEMENTS

CROSS-REFERENCE TO RELATED APPLICATIONS

This is a PCT National Phase in US (371) patent application claims priority of PCT/US2016/50804, filed Sep. 8, 2016. Which claims the benefit of U.S. Provisional Application No. 62/216,102, filed Sep. 9, 2015, of U.S. Provisional Application No. 62/241,624, filed Oct. 14, 2015, of U.S. Provisional Application No. 62/271,446, filed Dec. 28, 2015, of U.S. Provisional Application No. 62/294,991, filed Feb. 12, 2016, and of U.S. Provisional Application No. 62/366,984, filed Jul. 26, 2016, each of which is incorporated by reference in its entirety.

BACKGROUND

I. Technical Field

Embodiments disclosed herein relate generally to laser processing apparatus and methods for laser-processing of workpieces.

II. Discussion of the Related Art

Material ablation by pulsed light sources has been studied since the invention of the laser. Reports in 1982 of polymers having been etched by ultraviolet (UV) excimer laser radiation stimulated widespread investigations of the process for micromachining. Since then, scientific and industrial research in this field has proliferated—mostly spurred by the remarkably small features that can be drilled, milled, marked, and replicated through the use of lasers. A wide variety of potential applications for lasers in high-tech manufacturing industries have been, and continue to be developed and implemented. For example, lasers are a useful tool for milling or drilling holes, forming trenches, etc., and forming other features in or on a wide range of materials. The combination of high resolution, accuracy, speed, and flexibility has allowed laser processing to gain acceptance in many industries, including the manufacture of workpieces such as integrated circuits, hard disks, printing devices, displays, interconnects, and the like. However, trends in many industries tend to demand the formation of more features, smaller features, a higher density of features, etc., thus pushing the limits of existing laser-processing technologies to process workpieces with an acceptable level of accuracy, quality, throughput and flexibility.

SUMMARY

In one embodiment, a method of forming a via in a workpiece involves rastering a beam axis (along which laser pulses can be directed onto the workpiece) with respect to the workpiece, and delivering a plurality of laser pulses to the workpiece at a plurality of spot locations.

In another embodiment, a method of forming a via in a workpiece involves moving a beam axis relative to the workpiece using positioner including an AOD while directing laser pulses along a beam path that forms the beam axis to form a via having a diameter that is less than or equal to a scanning range associated with the AOD.

In another embodiment, a method of forming a feature in a workpiece includes moving the beam axis relative to the workpiece such that groups of laser pulses are delivered to the workpiece along many scan lines and, for each scan line, the last laser pulse is delivered to a location that is closer to the boundary of the feature to be formed than a location to which a first laser pulse was delivered.

In still another embodiment, a method of processing a workpiece includes moving the beam axis relative to the workpiece within a scanning range, wherein an extent of the first scanning range in a first direction is less than an extent of the first scanning range in a second direction.

In yet another embodiment, an apparatus for processing a workpiece, using multiple beams of laser energy, can include first to fourth scan heads; a first stage configured to impart a first movement to the first and third scan heads, and a second stage configured to impart a second movement to the first and second scan heads.

In still another embodiment, an apparatus can include multiple distributors for direct a beam of laser energy among multiple beam paths.

In another embodiment, an optics assembly, for use in an apparatus for laser-processing a workpiece, can include a housing having an optical input port and an optical output port, wherein the housing includes at least one registration feature configured to facilitate optical alignment of a beam path within the apparatus with at least one selected from the group consisting of the optical input and output ports. The optics assembly may further include at least two optical components mounted within the housing and in optical alignment with the optical input and output ports.

In one embodiment, an acousto-optic (AO) device can include an AO cell, an ultrasonic transducer, an absorber, and a cooling plate in thermal contact with a face of the AO cell extending between the ultrasonic transducer and the absorber. Thermal transfer characteristics of the cooling plate can vary along a direction extending from the connector end and the absorber end such that the cooling plate can: a) remove less heat from a central region of the AO cell that is located relatively far from at least one selected from the group consisting of the connector end and the absorber end, and b) remove relatively more heat from a peripheral region of the AO cell relatively close to at least one selected from the group consisting of the connector end and the absorber end.

In another embodiment, a method includes driving an AOD system to modulate a received laser pulse such that an $M^2$ factor and/or a spatial intensity profile type of the modulated laser pulse is different from that of the received laser pulse.

In still another embodiment, a method includes generating laser pulses having a wavelength in a range from 9 μm to 11 μm and deflecting a beam path along which the pulses propagate using an acousto-optic deflector (AOD) including an AO cell containing germanium.

In yet another embodiment, a method of forming a feature in a workpiece including an electrical conductor structure arranged in thermal contact with a dielectric structure can include indirectly ablating the electrical conductor structure using laser pulses having a wavelength less than 1 μm. Another method of forming a feature in a workpiece can also deflecting a beam of laser pulses to irradiate a plurality of spot locations and indirectly ablate a layer of material.

In still another embodiment, a method for processing of a workpiece can include delivering the first and second beams of laser energy along a common beam axis to ablate a workpiece, wherein the first beam of laser energy has a wavelength to which at least a portion of the workpiece is transparent, and is characterized by a plurality of laser pulses having a first pulse duration sufficiently short so as to induce nonlinear absorption of light within the portion of the workpiece, and wherein the timing with which laser pulses in the first beam of laser energy are generated is independent of the act of generating the second beam of laser energy.

As will become evident, the present specification identifies a great number of problems (e.g., associated with accuracy, quality, throughput, etc., which are difficult to overcome with conventional laser processing apparatus or conventional laser processing techniques), and details a great number of embodiments, examples, implementations, combinations, etc., that overcome such problems, provide new or improved capabilities, and the like.

BRIEF DESCRIPTION OF THE DRAWINGS

FIGS. 4 to 6 schematically illustrate a spatial relationship between a sensing range and a second scanning range, according to some embodiments.

FIGS. 11 to 24 schematically illustrate techniques for scanning a sensing range and second scanning range, according to some embodiments.

FIGS. 25 to 28 schematically illustrate techniques for scanning a process spot, according to some embodiments.

FIG. 29 illustrates a scan pattern overlaid on a top view of a workpiece to be processed. FIGS. 29A and 29B schematically illustrate cross-sectional views of a feature formed using the scan pattern shown in FIG. 29, taken along lines XXIXA-XXIXA and XXIXB-XXIXB', respectively.

DETAILED DESCRIPTION

Figure 1:
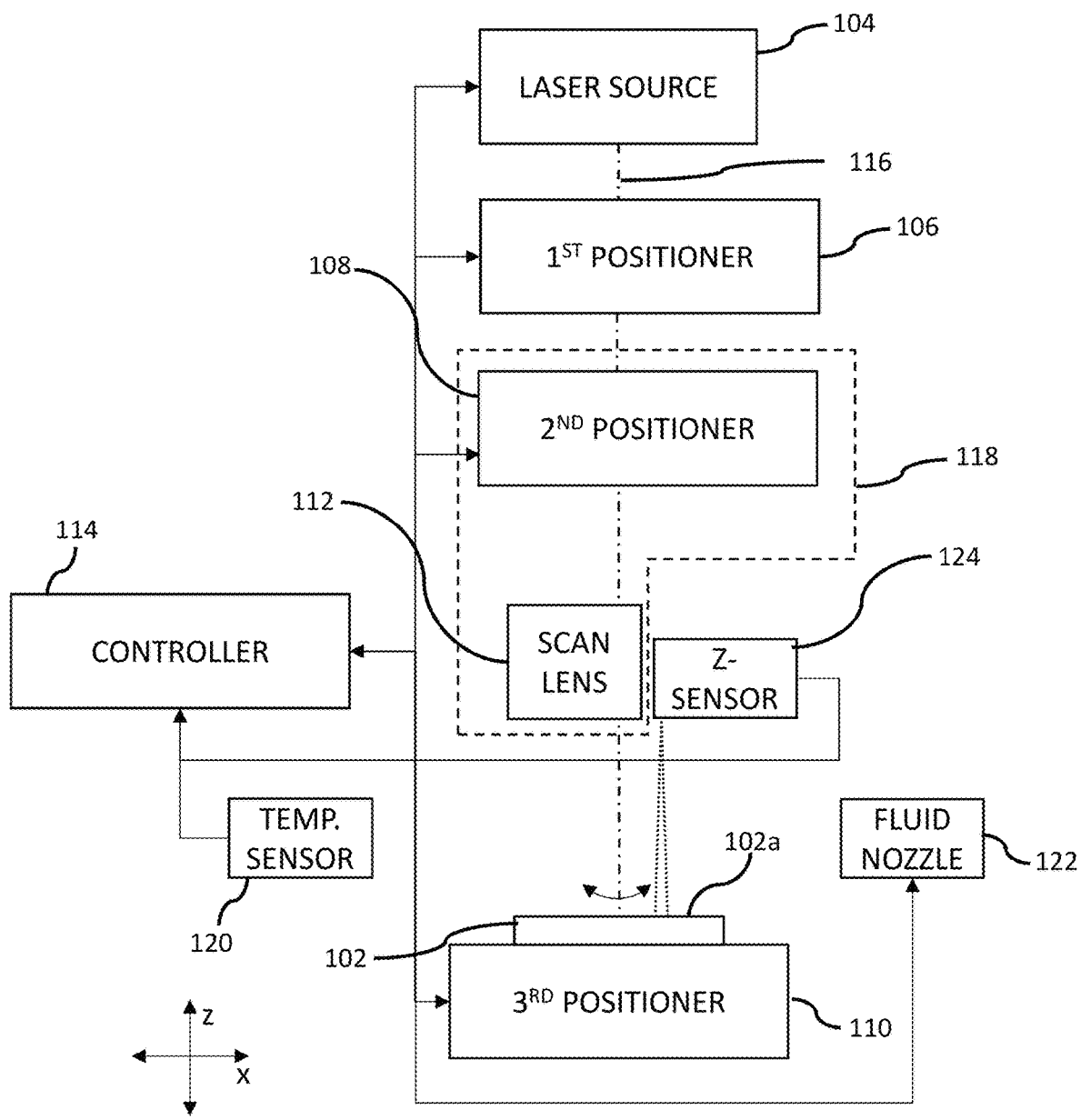
FIG. 1 schematically illustrates an apparatus for processing a workpiece, according to one embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. Overview

Embodiments described herein relate generally to methods and apparatuses for laser-processing (or, more simply, "processing") a workpiece. Generally the processing is accomplished, either in whole or in part, by irradiating the workpiece with laser radiation, to heat, melt, evaporate, ablate, crack, discolor, polish, roughen, carbonize, foam, or otherwise modify one or more properties or characteristics of one or more materials from which the workpiece is formed (e.g., in terms of chemical composition, atomic structure, ionic structure, molecular structure, electronic structure, microstructure, nanostructure, density, viscosity, index of refraction, magnetic permeability, relative permittivity, texture, color, hardness, transmissivity to electromagnetic radiation, or the like or any combination thereof). Materials to be processed may be present at an exterior of the workpiece prior to or during processing, or may be located completely within the workpiece (i.e., not present at an exterior of the workpiece) prior to or during processing.

Specific examples of processes that may be carried by the disclosed apparatus for laser processing include via drilling or other hole formation, cutting, perforating, welding, scribing, engraving, marking (e.g., surface marking, sub-surface marking, etc.), laser-induced forward transfer, cleaning, bleaching, bright pixel repair (e.g., color filter darkening, modification of OLED material, etc.), decoating, surface texturing (e.g., roughening, smoothing, etc.), or the like or any combination thereof. Thus, one or more features on that may be formed on or within a workpiece, as a result of the processing, can include openings, slots, vias or other holes, grooves, trenches, scribe lines, kerfs, recessed regions, conductive traces, ohmic contacts, resist patterns, human- or machine-readable indicia (e.g., comprised of one or more regions in or on the workpiece having one or more visually or texturally distinguishing characteristics), or the like or any combination thereof. Features such as openings, slots, vias, holes, etc., can have any suitable or desirable shape (e.g., circular, elliptical, square, rectangular, triangular, annular, or the like or any combination thereof) when viewed from a top plan view. Further, features such as openings, slots, vias, holes, etc., can extend completely through the workpiece (e.g., so as to form so-called "through vias," "through holes," etc.) or only partially through the workpiece (e.g., so as to form so-called "blind vias," "blind holes," etc.).

Workpieces that may be processed can be generically characterized being formed of one or more metals, polymers, ceramics, composites, or any combination thereof (e.g., whether as an alloy, compound, mixture, solution, composite, etc.). Specific examples of workpieces that may be processed include, panels of printed circuit boards (PCBs) (also referred to herein as "PCB panels"), PCBs, flexible printed circuits (FPCs), integrated circuits (ICs), IC packages (ICPs), light-emitting diodes (LEDs), LED packages, semiconductor wafers, electronic or optical device substrates (e.g., substrates formed of $Al_2O_3$, AN, BeO, Cu, GaAS, GaN, Ge, InP, Si, $SiO_2$, SiC, $Si_{1-x}Ge_x$ (where $0.0001<x<0.9999$), or the like, or any combination or alloy thereof), lead frames, lead frame blanks, articles formed of plastic, unstrengthened glass, thermally-strengthened glass, chemically-strengthened glass (e.g., via an ion-exchange process), quartz, sapphire, plastic, silicon, etc., components of electronic displays (e.g., substrates having formed thereon, TFTs, color filters, organic LED (OLED) arrays, quantum dot LED arrays, or the like or any combination thereof), lenses, mirrors, screen protectors, turbine blades, powders, films, foils, plates, molds (e.g., wax molds, molds for injection-molding processes, investment-casting processes, etc.), fabrics (woven, felted, etc.), surgical instruments, medical implants, consumer packaged goods, shoes, bicycles, automobiles, automotive or aerospace parts (e.g., frames, body panels, etc.), appliances (e.g., microwaves, ovens, refrigerators, etc.), device housings (e.g., for watches, computers, smartphones, tablet computers, wearable electronic devices, or the like or any combination thereof).

Accordingly, materials that may be processed include one or more metals such as Al, Ag, Au, Cu, Fe, In, Mg, Pt, Sn, Ti, or the like, or any combination thereof (e.g., whether as an alloy, composite, etc.), conductive metal oxides (e.g., ITO, etc.), transparent conductive polymers, ceramics, waxes, resins, inorganic dielectric materials (e.g., used as interlayer dielectric structures, such as silicon oxide, silicon nitride, silicon oxynitride, or the like or any combination thereof), low-k dielectric materials (e.g., methyl silsesquioxane (MSQ), hydrogen silsesquioxane (HSQ), fluorinated tetraethyl orthosilicate (FTEOS), or the like or any combination thereof), organic dielectric materials (e.g., SILK, benzocyclobutene, Nautilus, (all manufactured by Dow), polyfluorotetraethylene, (manufactured by DuPont), FLARE, (manufactured by Allied Chemical), or the like or any combination thereof), glass fibers, polymeric materials (polyamides, polyimides, polyesters, polyacetals, polycarbonates, modified polyphenylene ethers, polybutylene terephthalates, polyphenylene sulfides, polyether sulfones, polyether imides, polyether ether ketones, liquid crystal polymers, acrylonitrile butadiene styrene, and any compound, composite, or alloy thereof), leather, paper, build-up materials (e.g., ANJINOMOTO Build-up Film, also known as "ABF", etc.), glass-reinforced epoxy laminate (e.g., FR4), prepregs, solder resist, or the like or any composite, laminate, or other combination thereof.

II. System—Overview

FIG. 1 schematically illustrates an apparatus for processing a workpiece, in accordance with one embodiment of the present invention.

Referring to the embodiment shown in FIG. 1, an apparatus 100 for processing a workpiece includes a laser source 104 for generating laser pulses, a first positioner 106, a second positioner 108, a third positioner 110, a scan lens 112 and a controller 114. In view of the description that follows, it should be recognized that inclusion of the first positioner 106 is optional (i.e., the apparatus 100 need not include the first positioner 106), provided that the apparatus 100 includes the second positioner 108 or the third positioner 110. Likewise, it should be recognized that inclusion of the second positioner 108 is optional (i.e., the apparatus 100 need not include the second positioner 108), provided that the apparatus 100 includes the first positioner 106 or the third positioner 110. Lastly, it should similarly be recognized that inclusion of the third positioner 110 is optional (i.e., the apparatus 100 need not include the third positioner 110), provided that the apparatus 100 includes the first positioner 106 or the second positioner 108.

Although not illustrated, the apparatus 100 also includes one or more optical components (e.g., beam expanders, beam shapers, apertures, filters, collimators, lenses, mirrors, polarizers, wave plates, diffractive optical elements, refractive optical elements, or the like or any combination thereof) to focus, expand, collimate, shape, polarize, filter, split, combine, crop, or otherwise modify, condition, direct, monitor or measure laser pulses generated by the laser source 104 along one or more beam paths (e.g., beam path 116) to the scan lens 112. It will further be appreciated that one or more of the aforementioned components may be provided, or that the apparatus 100 may further include one or more additional components, as disclosed in U.S. Pat. Nos. 4,912,487, 5,633,747, 5,638,267, 5,751,585, 5,847,960, 5,917,300, 6,314,473, 6,430,465, 6,700,600, 6,706,998, 6,706,999, 6,816,294, 6,947,454, 7,019,891, 7,027,199, 7,133,182, 7,133,186, 7,133,187, 7,133,188, 7,245,412, 7,259,354, 7,611,745, 7,834,293, 8,026,158, 8,076,605, 8,158,493, 8,288,679, 8,404,998, 8,497,450, 8,648,277, 8,680,430, 8,847,113, 8,896,909, 8,928,853, 9,259,802 or in aforementioned U.S. Patent App. Pub. Nos. 2014/0026351, 2014/0197140, 2014/0263201, 2014/0263212, 2014/0263223, 2014/0312013, or in German Patent No. DE102013201968B4, or in International Patent App. Pub. No. WO2009/087392, or any combination thereof, each of which is incorporated herein by reference in its entirety.

Laser pulses transmitted through the scan lens 112 propagate along a beam axis so as to be delivered to the workpiece 102. Laser pulses delivered to the workpiece 102 may be characterized as having a Gaussian-type spatial intensity profile or a non-Gaussian-type (i.e., "shaped") spatial intensity profile (e.g., a "top-hat" spatial intensity profile). Regardless of the type of spatial intensity profile, the spatial intensity profile can also be characterized as a cross-sectional shape of a laser pulse propagating along the beam axis (or beam path 116), which may be circular, elliptical, rectangular, triangular, hexagonal, ring-shaped, etc., or arbitrarily shaped. Delivered laser pulses can be characterized as impinging the workpiece 102 at a spot size in a range from 2 μm to 200 μm. As used herein, the term "spot size" refers to the diameter or maximum spatial width of a delivered laser pulse at a location where the beam axis traverses a region of the workpiece 102 (also referred to as a "process spot," "spot location" or, more simply, a "spot") that is to be, at least partially, processed by the delivered laser pulse.

For purposes of discussion herein, spot size is measured as a radial or transverse distance from the beam axis to where the optical intensity drops to, at least, $1/e^2$ of the optical intensity at the beam axis. Generally, the spot size of a laser pulse will be at a minimum at the beam waist. It will be appreciated, however, that the spot size can be made smaller than 2 μm or larger than 200 μm. Thus, at least one laser pulse delivered to the workpiece 102 can have a spot size greater than or equal to 2 μm, 3 μm, 5 μm, 7 μm, 10 μm, 15 μm, 30 μm, 35 μm, 40 μm, 45 μm, 50 μm, 55 μm, 80 μm, 100 μm, 150 μm, 200 μm, etc., or between any of these values. Likewise, at least one delivered laser pulse can have a spot size less than 200 μm, 150 μm, 100 μm, 80 μm, 55 μm, 50 μm, 45 μm, 40 μm, 35 μm, 30 μm, 15 μm, 10 μm, 7 μm, 5 μm, 3 μm, 2 μm, etc., or between any of these values. In one embodiment, laser pulses delivered to the workpiece 102 can have a spot size in a range from 25 μm to 60 μm. In another embodiment, laser pulses delivered to the workpiece 102 can have a spot size in a range from 35 μm to 50 μm.

A. Laser Source

Generally, the laser source 104 is operative to generate laser pulses. As such, the laser source 104 may include a pulse laser source, a CW laser source, a QCW laser source, a burst mode laser, or the like or any combination thereof. In the event that the laser source 104 includes a QCW or CW laser source, the laser source 104 may further include a pulse gating unit (e.g., an acousto-optic (AO) modulator (AOM), a beam chopper, etc.) to temporally modulate beam of laser radiation output from the QCW or CW laser source. Although not illustrated, the apparatus 100 may optionally include one or more harmonic generation crystals (also known as "wavelength conversion crystals") configured to convert a wavelength of light output by the laser source 104. Accordingly, laser pulses ultimately delivered to the workpiece 102 may be characterized as having one or more wavelengths in one or more of the ultra-violet (UV), visible (e.g., violet, blue, green, red, etc.), or infrared (IR) (e.g., near-IR (NIR) spanning a wavelength range from 750 nm to 1.4 μm, short-wavelength IR (SWIR) spanning a wavelength range from 1.4 μm to 3 μm, mid-wavelength IR (MWIR) spanning a wavelength range of 3 μm to 8 μm, or long-wavelength IR (LWIR) spanning a wavelength range of 8 μm to 15 μm) ranges of the electromagnetic spectrum, or any combination thereof.

In another embodiment, the laser source 104 may be provided as a QCW or CW laser source and not include a pulse gating unit. In such an embodiment, the laser source 104 may generate a continuous (non-pulsed) laser beam for subsequent propagation along the beam path 116. Thus, the laser source 104 can be broadly characterized as operative to generate a beam of laser energy, which may manifested as a series of laser pulses or as a continuous laser beam, which can thereafter be propagated along the beam path 116. Although many embodiments discussed herein make reference to laser pulses, it should be recognized that continuous beams may alternatively, or additionally, be employed whenever appropriate.

Laser pulses output by the laser source 104 can have a pulse width or pulse duration (i.e., based on the full-width at half-maximum (FWHM) of the optical power in the pulse versus time) that is in a range from 10 fs to 900 ms. It will be appreciated, however, that the pulse duration can be made smaller than 30 fs or larger than 900 ms. Thus, at least one laser pulse output by the laser source 104 can have a pulse duration greater than or equal to 10 fs, 15 fs, 30 fs, 50 fs, 100 fs, 150 fs, 200 fs, 300 fs, 500 fs, 700 fs, 750 fs, 850 fs, 900 fs, 1 ps, 2 ps, 3 ps, 4 ps, 5 ps, 7 ps, 10 ps, 15 ps, 25 ps, 50 ps, 75 ps, 100 ps, 200 ps, 500 ps, 1 ns, 1.5 ns, 2 ns, 5 ns, 10 ns, 20 ns, 50 ns, 100 ns, 200 ns, 400 ns, 800 ns, 1000 ns, 2 μs, 5 μs, 10μs, 50μs, 100 μs, 300 μs, 500 μs, 900 μs, 1 ms, 2 ms, 5 ms, 10 ms, 20 ms, 50 ms, 100 ms, 300 ms, 500 ms, 900 ms, 1 s, etc., or between any of these values. Likewise, at least one laser pulse output by the laser source 104 can have a pulse duration less than 1 s, 900 ms, 500 ms, 300 ms, 100 ms, 50 ms, 20 ms, 10 ms, 5 ms, 2 ms, 1 ms, 300 ms, 900 μs, 500 μs, 300 μs, 100 μs, 50 μs, 10 μs, 5 μs, 1 μs, 800 ns, 400 ns, 200 ns, 100 ns, 50 ns, 20 ns, 10 ns, 5 ns, 2 ns, 1.5 ns, 1 ns, 500 ps, 200 ps, 100 ps, 75 ps, 50 ps, 25 ps, 15 ps, 10 ps, 7 ps, 5 ps, 4 ps, 3 ps, 2 ps, 1 ps, 900 fs, 850 fs, 750 fs, 700 fs, 500 fs, 300 fs, 200 fs, 150 fs, 100 fs, 50 fs, 30 fs, 15 fs, 10 fs, etc., or between any of these values. In one embodiment, laser pulses output by the laser source 104 have a pulse duration in a range from 3 ps to 15 ps. In another embodiment, laser pulses output by the laser source 104 have a pulse duration in a range from 5 ps to 7 ps.

Laser pulses output by the laser source 104 can have an average power in a range from 100 mW to 50 kW. It will be appreciated, however, that the average power can be made smaller than 100 mW or larger than 50 kW. Thus, laser pulses output by the laser source 104 can have an average power greater than or equal to 100 mW, 300 mW, 500 mW, 800 mW, 1 W, 2 W, 3 W, 4 W, 5 W, 6 W, 7 W, 10 W, 15 W, 18 W, 25 W, 30 W, 50 W, 60 W, 100 W, 150 W, 200 W, 250 W, 500 W, 2 kW, 3 kW, 20 kW, 50 kW, etc., or between any of these values. Likewise, laser pulses output by the laser source 104 can have an average power less than 50 kW, 20 kW, 3 kW, 2 kW, 500 W, 250 W, 200 W, 150 W, 100 W, 60 W, 50 W, 30 W, 25 W, 18 W, 15 W, 10 W, 7 W, 6 W, 5 W, 4 W, 3 W, 2 W, 1 W, 800 mW, 500 mW, 300 mW, 100 mW, etc., or between any of these values.

Laser pulses can be output by the laser source 104 at a pulse repetition rate in a range from 5 kHz to 1 GHz. It will be appreciated, however, that the pulse repetition rate can be less than 5 kHz or larger than 1 GHz. Thus, laser pulses can be output by the laser source 104 at a pulse repetition rate greater than or equal to 5 kHz, 50 kHz, 100 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 70 MHz, 100 MHz, 150 MHz, 200 MHz, 250 MHz, 300 MHz, 350 MHz, 500 MHz, 550 MHz, 700 MHz, 900 MHz, 2 GHz, 10 GHz, etc., or between any of these values. Likewise, laser pulses can be output by the laser source 104 at a pulse repetition rate less than 10 GHz, 2 GHz, 1 GHz, 900 MHz, 700 MHz, 550 MHz, 500 MHz, 350 MHz, 300 MHz, 250 MHz, 200 MHz, 150 MHz, 100 MHz, 90 MHz, 70 MHz, 50 MHz, 20 MHz, 10 MHz, 5 MHz, 4 MHz, 3 MHz, 2.5 MHz, 2 MHz, 1.9 MHz, 1.8 MHz, 1.5 MHz, 1 MHz, 900 kHz, 800 kHz, 500 kHz, 275 kHz, 250 kHz, 225 kHz, 175 kHz, 100 kHz, 50 kHz, 5 kHz, etc., or between any of these values.

In addition to wavelength, pulse duration, average power and pulse repetition rate, laser pulses delivered to the workpiece 102 can be characterized by one or more other characteristics such as pulse energy, peak power, etc., which can be selected (e.g., optionally based on one or more other characteristics such as wavelength, pulse duration, average power and pulse repetition rate, etc.) to irradiate the workpiece 102 at the process spot at an optical intensity (measured in W/cm$^2$), fluence (measured in J/cm$^2$), etc., sufficient to process the workpiece 102 (e.g., to form one or more features having one or more desired characteristics, to prevent the workpiece 102 from being undesirably damaged during formation of the feature(s), or the like or any combination thereof).

Examples of types of lasers that the laser source 104 may be characterized as gas lasers (e.g., carbon dioxide lasers, carbon monoxide lasers, excimer lasers, etc.), solid-state lasers (e.g., Nd:YAG lasers, etc.), rod lasers, fiber lasers, photonic crystal rod/fiber lasers, passively mode-locked solid-state bulk or fiber lasers, dye lasers, mode-locked diode lasers, pulsed lasers (e.g., ms-, ns-, ps-, fs-pulsed lasers), CW lasers, QCW lasers, or the like or any combination thereof. Depending upon their configuration, gas lasers (e.g., carbon dioxide lasers, etc.) may be configured to operate in one or more modes (e.g., in CW mode, QCW mode, pulsed mode, or any combination thereof). Specific examples of laser sources that may be provided as the laser source 104 include one or more laser sources such as: the BOREAS, HEGOA, SIROCCO or CHINOOK series of lasers manufactured by EOLITE; the PYROFLEX series of lasers manufactured by PYROPHOTONICS; the PALADIN Advanced 355 or DIAMOND series (e.g., DIAMOND E-, G-, J-2, J-3, J-5 series) of lasers manufactured by COHERENT; the PULSTAR- or FIRESTAR-series lasers manufactured by SYNRAD; the TRUFLOW-series of lasers (e.g., TRUFLOW 2000, 2700, 3000, 3200, 3600, 4000, 5000, 6000, 7000, 8000, 10000, 12000, 15000, 20000), TRU-COAX-series of lasers (e.g., TRUCOAX 1000) or the TRUDISK-, TRUPULSE-, TRUDIODE-, TRUFIBER-, or TRUMICRO-series of lasers, all manufactured by TRUMPF; the FCPA μJEWEL or FEMTOLITE series of lasers manufactured by IMRA AMERICA; the TANGERINE and SATSUMA series lasers (and MIKAN and T-PULSE series oscillators) manufactured by AMPLITUDE SYSTEMS; CL-, CLPF-, CLPN-, CLPNT-, CLT-, ELM-, ELPF-, ELPN-, ELPP-, ELR-, ELS-, FLPN-, FLPNT-, FLT-, GLPF-, GLPN-, GLR-, HLPN-, HLPP-, RFL-, TLM-, TLPN-, TLR-, ULPN-, ULR-, VLM-, VLPN-, YLM-, YLPF-, YLPN-, YLPP-, YLR-, YLS-, FLPM-, FLPMT-, DLM-, BLM-, or DLR-series of lasers manufactured by IPG PHOTONICS (e.g., including the GPLN-100-M, GPLN-500-QCW, GPLN-500-M, GPLN-500-R, GPLN-2000-S, etc.), or the like or any combination thereof.

B. First Positioner

The first positioner 106 is arranged, located or otherwise disposed in the beam path 116 and is operative to diffract, reflect, refract, or the like, or any combination thereof, laser pulses that are generated by the laser source 104 (i.e., to "deflect" the laser pulses) so as to impart movement of the beam path 116 (e.g., relative to the scan lens 112) and, consequently, impart movement of the beam axis relative to the workpiece 102. Generally, the first positioner 106 is configured to impart movement of the beam axis relative to the workpiece 102 along X- and Y-axes (or directions). Although not illustrated, the X-axis (or X-direction) will be understood to refer to an axis (or direction) that is orthogonal to the illustrated Y- and Z-axes (or directions).

Movement of the beam axis relative to the workpiece 102, as imparted by the first positioner 106, is generally limited such that the process spot can be scanned, moved or otherwise positioned within a first scan field or "first scanning range" that extends between 0.01 mm to 4.0 mm in the X- and Y-directions. It will be appreciated, however, that the first scanning range may extend less than 0.01 mm or more than 4.0 mm in any of the X- or Y-directions (e.g., depending upon one or more factors such as the configuration of the first positioner 106, the location of the first positioner 106 along the beam path 116, the beam size of the laser pulses incident upon the first positioner 106, the spot size, etc.). Thus, the first scanning range may extend, in any of the X- and Y-directions a distance that is greater than or equal to 0.04 mm, 0.1 mm, 0.5 mm, 1.0 mm, 1.4 mm, 1.5 mm, 1.8 mm, 2 mm, 2.5 mm, 3.0 mm, 3.5 mm, 4.0 mm, 4.2 mm, etc., or between any of these values. Likewise, the first scanning range may extend, in any of the X- and Y-directions a distance that is less than to 5 mm, 4.2 mm, 4.0 mm, 3.5 mm, 3.0 mm, 2.5 mm, 2.0 mm, 1.8 mm, 1.5 mm, 1.4 mm, 1.0 mm, 0.5 mm, 0.1 mm, 0.04 mm, 0.01 mm, etc., or between any of these values. As used herein, the term "beam size" refers to the diameter or width of a laser pulse, and can be measured as a radial or transverse distance from the beam axis to where the optical intensity drops to 1/e$^2$ of the optical intensity at the axis of propagation along the beam path 116. Thus in some embodiments, a maximum dimension of the first scanning range (e.g., in the X- or Y-directions, or otherwise) may be greater than or equal to a corresponding maximum dimension (as measured in the X-Y plane) of a feature (e.g., an opening, a recess, a via, a trench, etc.) to be formed in the workpiece 102. In another embodiment however, the maximum dimension of the first scanning range may be less than the maximum dimension of the feature to be formed.

Generally, the rate (also referred to as a "positioning rate") with which the first positioner 106 is capable of positioning the process spot at any location within the first scanning range (thus moving the beam axis) is in a range from 50 kHz (or thereabout) to 10 MHz (or thereabout). This range is also referred to herein as the first positioning bandwidth. The inverse of the positioning rate is herein referred to as the "positioning period," and refers to the minimum amount of time necessary to change the position the process spot from one location within the first scanning range to any other location within the first scanning range. Thus, the first positioner 106 can be characterized by a positioning period in a range from 20 μs (or thereabout) to 0.1 μs (or thereabout). In one embodiment, the first positioning bandwidth is in a range from 100 kHz (or thereabout)

to 2 MHz (or thereabout). For example, the first positioning bandwidth of 1 MHz (or thereabout).

The first positioner 106 can be provided as a microelectro-mechanical-system (MEMS) mirror or mirror array, an AO deflector (AOD) system, an electro-optic deflector (EOD) system, a fast-steering mirror (FSM) element incorporating a piezoelectric actuator, electrostrictive actuator, voice-coil actuator, etc., or the like or any combination thereof. In one embodiment, the first positioner 106 is provided as an AOD system including at least one (e.g., one, two, etc.) single-element AOD system, at least one (e.g., one, two, etc.) phased-array AOD system, or the like or any combination thereof. Both AOD systems include an AO cell formed of a material such as crystalline Ge, $PbMoO_4$, or $TeO_2$, glassy $SiO_2$, quartz, $As_2S_3$, etc. As used herein, a "single-element" AOD system refers to an AOD system having only a single ultrasonic transducer element acoustically coupled to the AO cell, whereas a "phased-array" AOD system includes a phased-array of at least two ultrasonic transducer elements acoustically coupled to a common AO cell.

As will be recognized by those of ordinary skill, acousto-optic (AO) technology (e.g., AODs, AOMs, etc.) utilize diffraction effects caused by acoustic waves propagating through the AO cell to modulate one or more characteristics of an optical wave (i.e., a beam of laser energy, in the context of the present application) contemporaneously propagating through the AO cell. Typically the AO cell is capable of supporting both the acoustic wave and the optical wave in the same region. The acoustic wave imparts a perturbation to the index of refraction in the AO cell. Acoustic waves are typically launched into the AO cell by driving the ultrasonic transducer element at one or more RF frequencies. By controlling characteristics of the acoustic wave (e.g., amplitude, frequency, phase, etc.) one or more characteristics of the propagating optic wave may be controllably modulated to impart movement of the beam path 116 (e.g., relative to the scan lens 112). It should also be recognized that characteristics of an acoustic wave launched into an AO cell can be controlled using well-known techniques to attenuate the energy in a beam of laser energy as it transits the AO cell. Accordingly, an AOD system can also be operated to modulate the pulse energy (and, correspondingly, the fluence, peak power, optical intensity, average power, etc.) of laser pulses ultimately delivered to the workpiece 102.

It will be appreciated that the material from which the AO cell is formed will depend upon the wavelength of the laser pulses that propagate along the beam path 116 so as to be incident upon the AO cell. For example, a material such as crystalline Ge can be used where the wavelength of laser pulses to be deflected is in a range from 2 μm (or thereabout) to 12 μm (or thereabout), materials such as quartz and $TeO_2$ can be used where the wavelength of laser pulses to be deflected is in a range from 200 nm (or thereabout) to 5 μm (or thereabout).

It should be recognized that AOD systems are dispersive elements and, consequently, desirably deflect laser pulses having suitably narrow spectral linewidth (e.g., based on the full-width at half-maximum (FWHM) of the optical power spectral density in the pulse). A laser source 104 configured to generate laser pulses having one or more wavelengths in one or more of the ultra-violet, visible, or NIR range will typically produce laser pulses having a suitably narrow spectral linewidth. Laser sources 104 such as high power CW gas lasers (e.g., carbon dioxide or carbon monoxide CW lasers with an average power greater than about 300 W) and other low power CW or pulsed gas lasers (e.g., with an average power less than about 300 W) can similarly generate laser pulses having a suitably narrow spectral linewidth in the SWIR, MWIR or LWIR range. Conventionally, high power pulsed gas lasers (e.g., carbon dioxide or carbon monoxide pulsed lasers with an average power greater than about 300 W) capable of generating laser pulses are based on a Master Oscillator Power Amplifier (MOPA) laser system architecture.

Any of the AOD systems may be provided as single-axis AOD system (e.g., configured impart movement of the beam axis along a single direction) or as a multi-axis AOD system (e.g., configured impart movement of the beam axis along a multiple directions, e.g., X- and Y-directions) by deflecting the beam path 116. Generally, a multi-axis AOD system can be provided as a multi-cell system or a single-cell system. A multi-cell, multi-axis system typically includes multiple AOD systems, each configured to impart movement of the beam axis along a different axis. For example, a multi-cell, multi-axis system can include a first AOD system (e.g., a single-element or phased-array AOD system) configured to impart movement of the beam axis along the X-direction (e.g., an "X-axis AOD system"), and a second AOD system (e.g., a single-element or phased-array AOD system) configured to impart movement of the beam axis along the Y-direction (e.g., a "Y-axis AOD system"). A single-cell, multi-axis system (e.g., an "X/Y-axis AOD system") typically includes a single AOD system configured to impart movement of the beam axis along the X- and Y-directions. For example, a single-cell system can include at least two ultrasonic transducer elements acoustically coupled to different planes, facets, sides, etc., of a common AO cell.

C. Second Positioner

Like the first positioner 106, the second positioner 108 is disposed in the beam path 116 and is operative to diffract, reflect, refract, or the like or any combination thereof, laser pulses that are generated by the laser source 104 and passed by the first positioner 106 so as to impart movement of the beam axis (e.g., along X- and Y-directions) relative to the workpiece 102, via movement of the beam path 116 relative to the scan lens 112. Movement of the beam axis relative to the workpiece 102, as imparted by the second positioner 108, is generally limited such that the process spot can be scanned, moved or otherwise positioned within a second scan field or "scanning range" that extends in the X- and/or Y-directions over an area that is greater than the first scanning range. In view of the configuration described herein, it should be recognized that movement of the beam axis imparted by the first positioner 106 can be superimposed by movement of the beam axis imparted by the second positioner 108. Thus, the second positioner 108 is operative to scan the first scanning range within the second scanning range.

In one embodiment, the second scanning range extends between 1 mm to 50 mm in the X- and/or Y-directions. In another embodiment, the second scanning range extends between 15 mm to 30 mm in the X- and/or Y-directions. It will be appreciated, however, that the second positioner 108 may be configured such that the second scanning range extends less than 1 mm or more than 50 mm in any of the X- or Y-directions. Thus in some embodiments, a maximum dimension of the second scanning range (e.g., in the X- or Y-directions, or otherwise) may be greater than or equal to a corresponding maximum dimension (as measured in the X-Y plane) of a feature (e.g., a via, a trench, a scribe line, a recessed region, a conductive trace, etc.) to be formed in the workpiece 102. In another embodiment however, the maximum dimension of the second scanning range may be less than the maximum dimension of the feature to be formed.

Generally, the positioning rate with which the second positioner 108 is capable of positioning the process spot at any location within the second scanning range (thus moving the beam axis within the second scanning range and/or scanning the first scanning range within the second scanning range) spans a range (also referred to herein as the "second positioning bandwidth") that is less than the first positioning bandwidth. In one embodiment, the second positioning bandwidth is in a range from 900 Hz to 5 kHz. In another embodiment, the first positioning bandwidth is in a range from 2 kHz to 3 kHz (e.g., about 2.5 kHz).

The second positioner 108 can be provided as a galvanometer mirror system including two galvanometer mirror components, where one galvanometer mirror component is arranged to impart movement of the beam axis relative to the workpiece 102 along the X-direction and another galvanometer mirror component is arranged to impart movement of the beam axis relative to the workpiece 102 along the Y-direction. In other embodiments, however, the second positioner 108 may be provided as a rotating polygon mirror system, etc. It will thus be appreciated that, depending on the specific configuration of the second positioner 108 and the first positioner 106, the second positioning bandwidth may be greater than or equal to the first positioning bandwidth.

D. Third Positioner

The third positioner 110 is operative to impart movement of the workpiece 102 relative to the scan lens 112, and, consequently, movement of the workpiece 102 relative to the beam axis. Movement of the workpiece 102 relative to the beam axis is generally limited such that the process spot can be scanned, moved or otherwise positioned within a third scan field or "scanning range" that extends in the X- and/or Y-directions over an area that is greater than the second scanning range. In one embodiment, the third scanning range extends between 25 mm to 2 m in the X- and/or Y-directions. In another embodiment, the third scanning range extends between 0.5 m to 1.5 m in the X- and/or Y-directions. Generally, a maximum dimension of the third scanning range (e.g., in the X- or Y-directions, or otherwise) will be greater than or equal to a corresponding maximum dimension (as measured in the X-Y plane) of any feature to be formed in the workpiece 102. Optionally, the third positioner 110 may be configured to move the workpiece 102 relative to the beam axis within a scanning range that extends in the Z-direction (e.g., over a range between 1 mm and 50 mm). Thus, the third scanning range may extend along the X-, Y- and/or Z-directions.

In view of the configuration described herein, it should be recognized that movement of the beam axis imparted by the first positioner 106 and/or the second positioner 108 can be superimposed by movement of the workpiece 102 imparted by the third positioner 110. Thus, the third positioner 110 is operative to scan the first scanning range and/or second scanning range within the third scanning range. Generally, the positioning rate with which the third positioner 110 is capable of positioning the process spot at any location within the third scanning range (thus moving the workpiece 102, scanning the first scanning range within the third scanning range, and/or scanning the second scanning range within the third scanning range) spans a range (also referred to herein as the "third positioning bandwidth") that is less than the second positioning bandwidth. In one embodiment, the third positioning bandwidth is in a range of 10 Hz (or thereabout), or less.

In one embodiment, the third positioner 110 is provided as one or more linear stages (e.g., each capable of imparting translational movement to the workpiece 102 along the X-, Y- and/or Z-directions), one or more rotational stages (e.g., each capable of imparting rotational movement to the workpiece 102 about an axis parallel to the X-, Y- and/or Z-directions), or the like or any combination thereof. In one embodiment, the third positioner 110 includes an X-stage for moving the workpiece 102 along the X-direction, and a Y-stage supported by the X-stage (and, thus, moveable along the X-direction by the X-stage) for moving the workpiece 102 along the Y-direction. Although not shown, the apparatus 100 may also include an optional base (e.g., a granite block) that supports the third positioner 110.

Although not shown, the apparatus 100 may include an optional chuck coupled to the third positioner 110, to which the workpiece 102 can be mechanically clamped, fixed, held, secured or be otherwise supported. In one embodiment, the workpiece 102 can be clamped, fixed, held, secured or be otherwise supported so as to directly contact a main, typically flat, support surface of the chuck. In another embodiment, the workpiece 102 can be clamped, fixed, held, secured or be otherwise supported so as to be spaced apart from the support surface of the chuck. In another embodiment, the workpiece 102 can be fixed, held, or secured by way of a force (e.g., an electrostatic force, a vacuum force, a magnetic force) applied to the workpiece 102 from the chuck, or otherwise present between the workpiece 102 and the chuck.

As described thus far, the apparatus 100 employs a so-called "stacked" positioning system, in which positions of the components such as the first positioner 106, second positioner 108, scan lens 112, etc., are kept stationary within the apparatus 100 (e.g., via one or more supports, frames, etc., as is known in the art) relative to the workpiece 102, which is moved via the third positioner 110. In another embodiment, the third positioner 110 may be arranged and configured to move one or more components such as the first positioner 106, second positioner 108, scan lens 112, etc., and the workpiece 102 may be kept stationary. In yet another embodiment, the apparatus 100 can employ a split-axis positioning system in which one or more components such as the first positioner 106, second positioner 108, scan lens 112, etc., are carried by one or more linear or rotational stages. In such an embodiment, the third positioner 110 includes one or more linear or rotational stages arranged and configured to move one or more components such as the first positioner 106, second positioner 108, scan lens 112, etc., and one or more linear or rotational stages arranged and configured to move the workpiece 102. Thus, the third positioner 110 imparts movement of the workpiece 102, of the scan lens 112 (or scan head associated with the scan lens 112, as discussed below). Some examples of split-axis positioning systems that may be beneficially or advantageously employed in the apparatus 100 include any of those disclosed in U.S. Pat. Nos. 5,751,585, 5,798,927, 5,847,960, 6,706,999, 7,605,343, 8,680,430, 8,847,113, or in U.S. Patent App. Pub. No. 2014/0083983, or any combination thereof, each of which is incorporated herein by reference in its entirety.

In another embodiment, one or more components such as the first positioner 106, second positioner 108, scan lens 112, etc., may be carried by an articulated, multi-axis robotic arm (e.g., a 2-, 3-, 4-, 5-, or 6-axis arm). In such an embodiment, the second positioner 108 and/or scan lens 112 may, optionally, be carried by an end effector of the robotic arm. In yet another embodiment, the workpiece 102 may be carried directly on an end effector of an articulated, multi-axis robotic arm (i.e., without the third positioner 110). In still another embodiment, the third positioner 110 may be carried on an end effector of an articulated, multi-axis robotic arm.

D. Scan Lens

The scan lens 112 (e.g., provided as either a simple lens, or a compound lens) is generally configured to focus laser pulses directed along the beam path, typically so as to produce a beam waist that can be positioned at the desired process spot. The scan lens 112 may be provided as an f-theta lens, a telecentric lens, an axicon lens (in which case, a series of beam waists are produced, yielding a plurality of process spots displaced from one another along the beam axis), or the like or any combination thereof. In one embodiment, the scan lens 112 is provided as a fixed-focal length lens and is coupled to a lens actuator (not shown) configured to move the scan lens 112 (e.g., so as to change the position of the beam waist along the beam axis). For example, the lens actuator may be provided as a voice coil configured to linearly translate the scan lens 112 along the Z-direction. In another embodiment, the scan lens 112 is provided as a variable-focal length lens (e.g., a zoom lens, or a so-called "liquid lens" incorporating technologies currently offered by COGNEX, VARIOPTIC, etc.) capable of being actuated (e.g., via a lens actuator) to change the position of the beam waist along the beam axis.

In one embodiment, the scan lens 112 and the second positioner 108 are integrated into a common housing or "scan head" 118. Thus, in an embodiment in which the apparatus 100 includes a lens actuator, the lens actuator may be coupled to the scan lens 112 (e.g., so as to enable movement of the scan lens 112 within the scan head 118, relative to the second positioner 108). Alternatively, the lens actuator may be coupled to the scan head 118 (e.g., so as to enable movement of the scan head 118 itself, in which case the scan lens 112 and the second positioner 108 would move together). In another embodiment, the scan lens 112 and the second positioner 108 are integrated into different housings (e.g., such that the housing in which the scan lens 112 is integrated is movable relative to the housing in which the second positioner 108 is integrated). Components of the scan head 118, or the entire scan head 118 itself, may be of a modular assembly, such that a component of the scan head 118 can be simply removed and replaced with another component, such that one scan head 118 can be simply removed and replaced with another scan head, etc.

E. Controller

Generally, the controller 114 is communicatively coupled (e.g., over one or more wired or wireless communications links, such as USB, Ethernet, Firewire, Wi-Fi, RFID, NFC, Bluetooth, Li-Fi, or the like or any combination thereof) to one or more components of the apparatus 100, such as the laser source 104, the first positioner 106, the second positioner 108, third positioner 110, the lens actuator, etc., and are thus operative in response to one or more control signals output by the controller 114.

For example, the controller 114 may control an operation of the first positioner 106, second positioner 108, or third positioner 110, to impart relative movement between the beam axis and the workpiece so as to cause relative movement between the process spot and the workpiece 102 along a path or trajectory (also referred to herein as a "process trajectory") within the workpiece 102. It will be appreciated that any two of these positioners, or all three of these positioners, may be controlled such that two positioners (e.g., the first positioner 106 and the second positioner 108, the first positioner 106 and the third positioner 110, or the second positioner 108 and the third positioner 110), or all three positioners simultaneously impart relative movement between the process spot and the workpiece 102 (thereby imparting a "compound relative movement" between the beam axis and the workpiece). Of course, at any time, it is possible to control only one positioner (e.g., the first positioner 106, the second positioner 108 or the third positioner 110) to impart relative movement between the process spot and the workpiece 102 (thereby imparting a "non-compound relative movement" between the beam axis and the workpiece).

Control signals to command compound or non-compound relative movement may be pre-computed, or otherwise determined in real-time. In another example, the controller 114 may control an operation of the first positioner 106 to change the spot shape or spot size of laser pulses delivered to the process spot (e.g., by chirping an RF signal applied to one or more ultrasonic transducer elements of one or more AOD systems in the first positioner 106, by applying a spectrally-shaped RF signal to one or more ultrasonic transducer elements of one or more AOD systems in the first positioner 106, or the like or any combination thereof).

Some examples of operations that one or more of the aforementioned components can be controlled to perform include any operations, functions, processes, and methods, etc., as disclosed in aforementioned U.S. Pat. Nos. 4,912,487, 5,633,747, 5,638,267, 5,751,585, 5,847,960, 5,917,300, 6,314,473, 6,430,465, 6,700,600, 6,706,998, 6,706,999, 6,816,294, 6,947,454, 7,019,891, 7,027,199, 7,133,182, 7,133,186, 7,133,187, 7,133,188, 7,245,412, 7,259,354, 7,611,745, 7,834,293, 8,026,158, 8,076,605, 8,288,679, 8,404,998, 8,497,450, 8,648,277, 8,680,430, 8,847,113, 8,896,909, 8,928,853, 9,259,802, or in aforementioned U.S. Patent App. Pub. Nos. 2014/0026351, 2014/0197140, 2014/0263201, 2014/0263212, 2014/0263223, 2014/0312013, or in German Patent No. DE102013201968B4, or in International Patent App. No. WO2009/087392, or any combination thereof.

Generally, the controller 114 includes one or more processors configured to generate the aforementioned control signals upon executing instructions. A processor can be provided as a programmable processor (e.g., including one or more general purpose computer processors, microprocessors, digital signal processors, or the like or any combination thereof) configured to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPGAs), application-specific integrated circuits (ASICs)—including digital, analog and mixed analog/digital circuitry—or the like, or any combination thereof. Execution of instructions can be performed on one processor, distributed among processors, made parallel across processors within a device or across a network of devices, or the like or any combination thereof.

In one embodiment, the controller 114 includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tcl, Perl, Scheme, Ruby, etc. Computer software is commonly stored in one or more data structures conveyed by computer memory.

Although not shown, one or more drivers (e.g., RF drivers, servo drivers, line drivers, power sources, etc.) can be communicatively coupled to an input of one or more components such as the laser source 104, the first positioner 106, the second positioner 108, the third positioner 110, the lens actuator, a mechanism for effecting Z-height compensation (see below), etc. In one embodiment, each driver typically includes an input to which the controller 114 is communicatively coupled and the controller 114 is thus operative to generate one or more control signals (e.g., trigger signals, etc.), which can be transmitted to the input(s) of one or more drivers associated with one or more components of the apparatus 100. Thus, components such as the laser source 104, the first positioner 106, the second positioner 108, third positioner 110, the lens actuator, etc., are responsive to control signals generated by the controller 114.

In another embodiment, and although not shown, one or more additional controllers (e.g., component-specific controllers) may, optionally, be communicatively coupled to an input of a driver communicatively coupled to a components (and thus associated with the component) such as the laser source 104, the first positioner 106, the second positioner 108, the third positioner 110, the lens actuator, the mechanism for effecting Z-height compensation, etc. In this embodiment, each component-specific controller can be communicatively coupled and the controller 114 and be operative to generate, in response to one or more control signals received from the controller 114, one or more control signals (e.g., trigger signals, etc.), which can then be transmitted to the input(s) of the driver(s) to which it is communicatively coupled. In this embodiment, a component-specific controller may be configured as similarly described with respect to the controller 114.

In another embodiment in which one or more component-specific controllers are provided, the component-specific controller associated with one component (e.g., the laser source 104) can be communicatively coupled to the component-specific controller associated with one component (e.g., the first positioner 106, etc.). In this embodiment, one or more of the component-specific controllers can be operative to generate one or more control signals (e.g., trigger signals, etc.) in response to one or more control signals received from one or more other component-specific controllers.

III. Embodiments Concerning the Second Positioner

Although particular embodiments in this section concerning the second positioner 108 are discussed in connection with the apparatus 100, it will be appreciated that any one of these embodiments, or any combination thereof, may be implemented in connection with any laser-processing apparatus other than the apparatus 100. In some embodiments, the second positioner 108 is provided as a galvanometer mirror system including a plurality of galvanometer mirror components (e.g., each including a mirror) disposed in the beam path.

Figure 2:
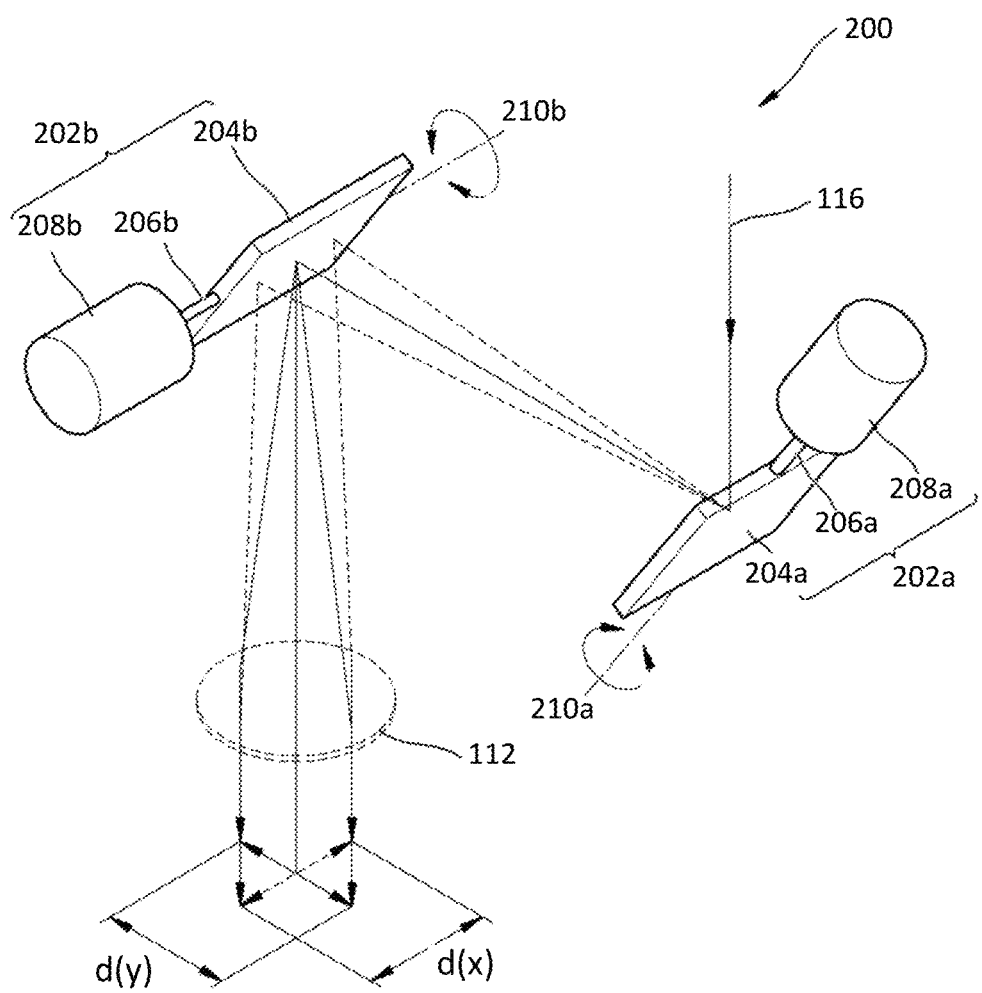
FIG. 2 schematically illustrates a second positioner of the apparatus shown in FIG. 1, according to one embodiment.

For example, and with reference to FIG. 2, the galvanometer mirror system is provided as galvanometer mirror system 200, which includes a first galvanometer mirror component 202a and a second galvanometer mirror component 202b. The first galvanometer mirror component 202a includes a first mirror 204a coupled to a first mount 206a, a first motor 208a for rotating the first mirror 204a via the first mount 206a and, optionally, a position detector (not shown) configured to generate a position signal corresponding to the rotation of the first mount 206a about a first rotational axis 210a, e.g., to enable closed-loop servo control of the first motor 208a. Similarly, the second galvanometer mirror component 202b includes a second mirror 204b, a second mount 206b and a second motor 208b, each of which is configured as described above with respect to the first galvanometer mirror component 202a. The second galvanometer mirror component 202b can, optionally, include a position detector (not shown) configured to generate a position signal corresponding to the rotation of the second mount 206b about a second rotational axis 210b, e.g., to enable closed-loop servo control of the second motor 208b.

As exemplarily illustrated, the first mirror 204a is disposed at a first location in the beam path 116 (e.g., located relatively from the scan lens 112) and the second mirror 204b is disposed at a second location in the beam path 116 (e.g., located relatively close to the scan lens 112). The first mirror 204a is rotatable about the first rotational axis 210a (e.g., the Y-axis) to reflect laser pulses and impart movement of the beam path 116 (thereby imparting movement of the beam axis within the second scanning range extending, for example, by a distance d(x) along the X-direction. Similarly, the second mirror 204b is rotatable about the second rotational axis 210b (e.g., the X-axis) to reflect laser pulses and impart movement of the beam path 116 (thereby imparting movement of the beam axis within the second scanning range extending, for example, by a distance d(y) along the Y-direction. In some embodiments, distances d(x) and d(y) can, as described above, be in a range from 1 mm to 200 mm. It will be appreciated, however, that the distances d(x) and d(y) can be in a range that is less than 1 mm or greater than 200 mm. Thus, the distances d(x) and d(y) can be greater than or equal to 1 mm, 2 mm, 5 mm, 10 mm, 25 mm, 50 mm, 100 mm, 150 mm, 160 mm, 170 mm, 200 mm, etc. Likewise, the distances d(x) and d(y) can be less than greater than 200 mm, 170 mm, 160 mm, 150 mm, 100 mm, 50 mm, 25 mm, 10 mm, 5 mm, 2 mm, 1 mm, etc., or between any of these values.

A. Telecentric Error

In one embodiment, the galvanometer mirror system 200 is configured such that the beam path, as deflected first by the first mirror 204a and next by the second mirror 204b, intersects the pupil of the scan lens 112 (or intersects at location of the scan lens 112 within a vicinity of the pupil) as the beam axis is moved within the second scanning range. However, it has been discovered that some configurations of the galvanometer mirror system 200 cause the beam path, as deflected first by the first mirror 204a and next by the second mirror 204b, to intersect the scan lens 112 at a location that is offset from the pupil thereof (or intersects a location of the scan lens 112 outside the aforementioned vicinity of the pupil), thus creating telecentric errors which result in laser pulses being delivered to locations that are positionally offset from locations of desired process spots. For example, the inventors have discovered that a positional offset of ±0.8 µm (in the X- and Y directions) can be noticed for each 1° angle of deflection at the first mirror 204a, depending upon the worksurface Z-height. Much less positional offset was noticed for each angle of deflection at the second mirror 204b. While not wishing to be bound by any particular theory, it is believed that the distance from the first mirror 204a to the scan lens 112 (which is greater than the distance between the second mirror 204b and the scan lens 112) primarily contributes to the creation of the observed telecentric errors and positional offsets. These positional offsets can ultimately degrade the positional accuracy and precision with features such as vias are drilled.

Figure 3:
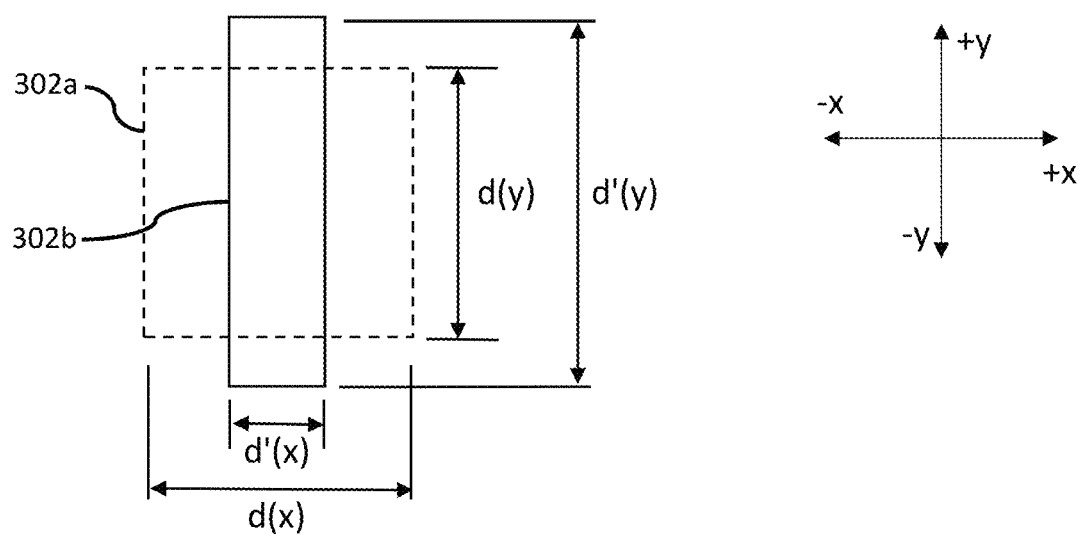
FIG. 3 schematically illustrates second scanning ranges associated with the second positioner shown in FIG. 2, according to some embodiments.

To help maintain the positional accuracy and precision with which features such as vias are drilled, the first galvanometer mirror component 202a can be driven (e.g., in response to one or more control signals output by the controller 114, in response to electric current output by a servo driver connected to the first galvanometer mirror component 202a, etc.) to rotate the first mirror 204a about the first rotational axis 210a to impart movement of the beam path 116 so as to impart movement of the beam axis within the second scanning range extending, for example, by a distance d'(x), less than d(x), along the X-direction. Upon limiting the extent of the second scanning range in the X-direction, the extent of the second scanning range in the Y-direction can be increased to a distance d'(y), which can greater than the distance d(y) as exemplarily described above. See, e.g., FIG. 3, which illustrates second scanning ranges in accordance with two embodiments of the present invention. Second scanning range 302a represents a typical scanning range where distances d(x) and d(y) are equal to each other. Second scanning range 302b represents another scanning range where distances d'(x) and d'(y) are not equal to one another (i.e., distance d'(x) is less than distance d'(y)). In processes such as via drilling processes, distance d'(x) may be in a range from 0.04 mm to 200 mm. It will be appreciated, however, that distance d'(x) may be less than 0.04 mm or greater than 200 mm. For example, distance d'(x) may be greater than 0.04 mm, 0.1 mm, 0.5 mm, 1 mm, 2 mm, 5 mm, 10 mm, 15 mm, 20 mm, 25 mm, 40 mm, 70 mm, 100 mm, 150 mm, etc., or between any of these values, while still being less than distance d'(y) Likewise, distance d'(x) may be less than 30 mm, 25 mm, 20 mm, 15 mm, 10 mm, 5 mm, 2 mm, 1 mm, 0.5 mm, etc., or between any of these values.

To the extent that any undesirable positional offset attributable to telecentric errors created upon rotating the second mirror 204b are detected, the second galvanometer mirror component 202b can be similarly driven to rotate the second mirror 204b about the second rotational axis 210b to impart movement of the beam path 116 so as to impart movement of the beam axis within the second scanning range extending, for example, by a modified distance that is less than d(y) along the Y-direction (where such modified distance is larger than distance d'(x)).

Notwithstanding the above, it will be appreciated that telecentric error can be reduced or eliminated by replacing the galvanometer mirror system 200 with a positioner such as a two-axis FSM element (e.g., capable of deflecting the beam path along the X- and Y-directions) incorporating a piezoelectric actuator, electrostrictive actuator, voice-coil actuator, etc., or the like or any combination thereof.

IV. Embodiments Concerning Z-Height Measurement and Compensation

Often, the length of the portion of the beam path extending from the output of the apparatus 100 (e.g., the scan lens 112, in the illustrated embodiment) to the desired process spot location (i.e., the distance that a laser pulse travels upon exiting the apparatus 100 until it is delivered to the workpiece at the process spot) is referred to as the "Z-height." For many laser-based processes, laser pulses typically yield the best process spot quality (e.g., in terms of size, shape, and uniformity) and highest fluence at the beam waist (i.e., when the spot size of the delivered laser pulse at the process spot is equal (or at least substantially equal) to the spot size at the beam waist). Other laser-based processes, however, do not require the spot size of a delivered laser pulse at the process spot to be equal (or even substantially equal) to the spot size at the beam waist. Nevertheless, deviations in the spot size of a delivered laser pulse at a desired process spot away from a desired spot size can result in undesirably low fluence levels, and change the dimension and intensity distribution of the delivered laser pulse at the desired process spot. These deviations can affect the quality and/or throughput of the laser process.

To ensure that a laser pulse delivered to a desired process spot has a desired spot size, the apparatus 100 can optionally be provided with a Z-height sensor 124 configured to measure a distance between (or a characteristic indicative of the distance between) the scan lens 112 and a region of the worksurface 102a (also referred to as the "sensing range" of the worksurface 102a). As used herein, this measured distance (or measured characteristic indicative of the distance) is also referred to as the "measured worksurface Z-height." In addition, when a Z-height sensor 124 is configured to measure a distance (or a characteristic thereof) between a particular scan lens 112 and a region of the worksurface 102a, the Z-height sensor 124 may also be described as a Z-height sensor that is associated with the particular scan lens 112 (or with a particular scan head incorporating the scan lens) or, more simply, as an "associated Z-height sensor." The Z-height sensor 124 may be provided as any suitable or beneficial displacement sensor, distance sensor, position sensor, or the like or any combination thereof. Examples of sensors that may be used as the Z-height sensor 124 include a laser triangulation sensor, a laser profile sensor, a scanning confocal laser sensor, a confocal interference displacement sensor, an air gauge sensor, or the like or any combination thereof.

In one embodiment, the Z-height sensor 124 is positionally fixed relative to its associated scan lens 112 (e.g., the Z-height sensor 124 is coupled to the scan head 118, scan lens housing, etc., or is coupled to a frame to which the scan head 118 is coupled). In this case, the position of the sensing range relative to the second scanning range (e.g., as measured in the X-Y plane) is fixed. In another embodiment, the apparatus 100 is configured such that the Z-height sensor 124 and the scan lens 112 are moveable relative to one another. For example, the Z-height sensor may be movable (e.g., in the X-, Y- or Z-directions, or the like or any combination thereof) relative to the scan lens 112 (e.g., the Z-height sensor 124 is coupled to a linear or rotational stage that, in turn is coupled to the scan head 118 or to some other frame, bracket, rail, etc., associated with the apparatus 100). In another embodiment, the Z-height sensor 124 may be positionally fixed within the apparatus 100, and the scan lens 112 may be movable (e.g., in the X-, Y- or Z-directions, or the like or any combination thereof) relative to the Z-height sensor 124.

The Z-height sensor 124 can generate one or more signals (e.g., "Z-height signals"), data (e.g., Z-height data), or the like or any combination thereof (generically and collectively referred to as "Z-height information") indicative of the measured worksurface Z-height, and output the same to the controller 114. In its raw form, Z-height information generated or output from the Z-height sensor 124 can be noisy. Sometimes, the noise can be too large to form a reliable basis for determining whether or not the worksurface Z-height is outside a predetermined nominal Z-height process window (e.g., ±60 µm, ±70 µm, ±80 µm, ±90 µm, ±100 µm, or the like) relative to a reference worksurface Z-height. If the "raw" Z-height information is too noisy, then it can be processed (e.g., filtered, smoothed, or the like or any combination thereof) at the Z-height sensor 124, at the controller 114, or the like or any combination thereof, to obtain a "processed" worksurface Z-height, which can form the basis for determining whether or not the worksurface Z-height is outside the predetermined nominal Z-height process window.

In one embodiment, items of raw or processed Z-height information are stored (e.g., in a data structure conveyed by computer memory such as a buffer or cache of the controller 114). Each item of Z-height information may be stored in association with a corresponding item of information indicating a position of the sensing range relative to the third scanning range (also referred to herein as a "sensing position") when a Z-height measurement associated with the item Z-height information was obtained. Information indicative of sensing position can be obtained or derived (e.g., at the controller 114) from one or more signals (e.g., encoder signals) generated and output by the third positioner 110 to the controller 114, and can be given in terms of position along the X-, Y- or Z-directions, or any combination thereof.

Generally, the interval between sensing positions can depend upon one or more factors such as the workpiece 102 to be processed, the type of processing to be performed, the location where a feature is to be formed on or within the workpiece 102, the desired precision or accuracy with which a feature is to be formed on or within the workpiece 102, or the like or any combination thereof. In embodiment, the interval between sensing positions is in range from 0.1 mm to 6 mm (e.g., in a range from 0.2 mm to 5 mm). In another embodiment (e.g., in which the workpiece 102 is a PCB, and the processing involves via drilling), the interval between sensing positions is in a range from 0.5 mm to 1.5 mm (e.g., 1 mm, or thereabout). It will be appreciated, however, that the interval between sensing positions may be less than 0.1 mm or greater than 6 mm. The interval between two pairs of adjacent sensing positions may be constant, or may be variable. In one embodiment, Z-height measurements can be triggered in response to a control signal received from the controller 114 (e.g., that, in turn, is generated and output upon receiving one or more encoder signals output by the third positioner 110, etc.), in response to one or more encoder signals received from the third positioner 110, or the like or any combination thereof.

In another embodiment, an item of Z-height information (and its associated position information) is stored only if it indicates that a worksurface Z-height is outside the predetermined nominal Z-height process window. In this embodiment, the controller 114 can be configured to process the Z-height information to determine whether or not the worksurface Z-height (e.g., either as measured or processed) at a particular position is outside the predetermined nominal Z-height process window (and store the Z-height information and position information when the determination is answered in the affirmative). In another embodiment, the Z-height sensor 124 can be configured to process the Z-height information to determine whether or not the worksurface Z-height (e.g., either as measured or processed) is outside the predetermined nominal Z-height process window (and output the Z-height information to the controller 114 when the determination is answered in the affirmative).

If the worksurface Z-height (e.g., either as measured or processed) is determined (e.g., by the controller 114 or the Z-height sensor 124) to be outside the predetermined nominal Z-height process window, then the controller 114 can generate and output one or more control signals to the lens actuator, the third positioner 110, or the like or any combination thereof to compensate for the detected variation or deviation outside the predetermined nominal Z-height process window (e.g., so that a delivered laser pulse will have a desired spot size at the desired process spot). Z-height compensation can be effected by outputting one or more control signals to actuate one or more mechanisms for effecting Z-height compensation so that a delivered laser pulse will have a desired spot size at the desired process spot. Examples of mechanisms for effecting Z-height compensation, which may be used in embodiments provided herein, are discussed in greater detail below.

It is straightforward to effect realtime Z-height compensation if the worksurface Z-height is already known. However, the worksurface Z height may not be known (or may not be known to the required precision) before the workpiece 102 is processed. In one embodiment, the worksurface Z-height at all positions where the workpiece 102 is to be processed is measured before laser processing of the workpiece 102 begins. However, such "offline" measurement of worksurface Z-height can require too much time or expense when the workpiece 102 is large. This is especially true if the anticipated time required to complete the laser-processing is relatively short, if the sensed range for the Z-height sensor is small relative to the size of the workpiece 102, etc. Also, variation in the worksurface Z-height can be large enough to render intended laser-processes incapable of meeting specified quality requirements. Therefore, it may be preferable to measure the worksurface Z-height in realtime, during workpiece processing, instead of prior to workpiece processing.

To facilitate realtime worksurface Z-height measurement, the Z-height sensor 124 can be arranged and configured such that the sensing range is arranged within the second scanning range 302b (e.g., either partially within or completely within the second scanning range 302b, such that a centroid or other central region of the sensing range is within or outside the second scanning range 302b). Accordingly, compensation for the detected variation or deviation in worksurface Z-height can, in one embodiment, be effected immediately upon determining that the detected variation or deviation is outside the nominal Z-height process window. It is possible, however, that the response time associated with a mechanism for effecting Z-height compensation will be excessively long and, as a result, will need to be compensated for (e.g., by delaying the laser processing sequence until the detected variation or deviation in worksurface Z-height has been compensated). Delays due to response time of mechanisms for effecting Z-height compensation are hereinafter referred to as "response time delays." It is also possible that the processing of raw Z-height information (e.g., to obtain a "processed" worksurface Z-height) can also be a source of delay (also referred to as a "processing delay") that may need to be similarly compensated for. However if response time and processing delays are relatively small compared to the rate with which the second scanning range is moved relative to the workpiece (or vice versa), then such delays need not be compensated for.

In some cases, it may be difficult to obtain accurate worksurface Z-height measurements when the sensing range is arranged within the second scanning range 302b as described above. Therefore, in other embodiments, the Z-height sensor 124 can be arranged and configured such that the sensing range lies completely outside the second scanning range 302b. For example, and with reference to FIGS. 4 to 6, the Z-height sensor 124 is arranged and configured such that the sensing range 402 is offset from the second scanning range 302b along the Y-direction (e.g., as shown in FIG. 4), along the X-direction (e.g., as shown in FIG. 5), or along X- and Y-directions (e.g., as shown in FIG.

6.). Although FIGS. 4 to 6 illustrate the sensing range 402 is offset from the second scanning range 302b in the −X-direction, the −Y-direction, or the −X and −Y-directions, it will be appreciated that the sensing range 402 can be offset from the second scanning range 302b in any of the −X, +X, −Y, or +Y-directions, or any combination thereof. In the embodiments illustrated in FIGS. 4 and 6, the distance or pitch p(y) between the second scanning range 302b and the sensing range 402 along the Y-direction (i.e., as measured from the centers of each of these regions along the Y-direction) is equal to the distance d'(y) of the second scanning range 302b. Likewise, in the embodiments illustrated in FIGS. 5 and 6, the distance or pitch p(x) between the second scanning range 302b and the sensing range 402 along the X-direction (i.e., as measured from the centers of each of these regions along the X-direction) is equal to the distance d'(x) of the second scanning range 302b. In other embodiments however, the distances p(y) and p(x) may be greater than, or less than, corresponding distances d'(y) and d'(x), respectively.

In the examples discussed with respect to FIGS. 4 to 6, the sensing range 402 is, generally, circular in dimension, with a diameter of in a range from 1 mm to 3 mm. In one embodiment, the sensing range 402 has a diameter in a range from 1.5 mm to 2 mm. It will be appreciated, however, that the sensing range 402 may have a diameter that is less than 1 mm or greater than 3 mm. For example, the sensing range 402 may have a diameter equal to, or greater than, any of aforementioned distances d(x), d'(x), d(y) or d'(y). In other example embodiments however, instead of having a circular shape, the shape of the sensing range 402 may, generally, be triangular, square, rectangular, elliptical, etc. In yet another example embodiment, the shape and size of the sensing range 402 may, generally, be same as the shape and size of the second scanning range 302b. In one embodiment, the Z-height sensor 124 is configured to generate Z-height information indicative of the average or mean worksurface Z-height measured within the sensing range 402. In another embodiment, the Z-height sensor 124 is configured to generate Z-height information indicative of the actual, average or mean worksurface Z-height measured at a plurality of points within the sensing range 402.

In view of the above, placement of the sensing range 402 relative to the second scanning range 302b (e.g., which can be characterized by the direction in which the sensing range 402 is offset from the second scanning range 302b, by the pitch between the sensing range 402 and the second scanning range 302b, or the like or any combination thereof) can be flexible. For example, placement of the sensing range 402 relative to the second scanning range 302b can correspond to the relative motion of the second scanning range 302b and the workpiece 102 during laser processing. Such relative motion can be characterized by parameters such as speed of movement, direction of movement—which may proceed along the X- or Y-directions, or one or more directions other than the X- and Y-directions, or any combination thereof, etc.

Thus in one embodiment, the sensing range 402 may be offset relative to the second scanning range 302b in a direction that is different from the direction in which the second scanning range 302b is caused to move relative to the workpiece 102 (e.g., upon moving the scan lens 112, the workpiece 102, or a combination thereof, by actuating the third positioner 110). For example, the sensing range 402 may be offset from the second scanning range 302b in the −X-direction (e.g., as shown in FIG. 5 or 6) or in the +X-direction if, during the intended laser processing, the second scanning range 302b is caused to move relative to the workpiece 102 in the +Y or −Y-directions. Offsetting the sensing range 402 in this manner can provide for realtime worksurface Z-height measurement but is also susceptible to the same response time and processing delays discussed above. Also, offsetting the sensing range 402 as described above can problematic if laser processing is performed at an edge of the workpiece 102 and the sensing range 402 is either not located on the workpiece 102, or is located only partially on the workpiece 102. However these problems (or susceptibility to problems) can be ameliorated or avoided by implementing, when processing the workpiece 102, a scanning technique according to one or more embodiments exemplarily described below.

In another embodiment, the sensing range 402 may be offset relative to the second scanning range 302b in a direction that is the same as the direction in which the second scanning range 302b is caused to move relative to the workpiece 102 (e.g., upon moving the scan lens 112, the workpiece 102, or a combination thereof, by actuating the third positioner 110). For example, the sensing range 402 may be offset from the second scanning range 302b in the −Y-direction (e.g., as shown in FIG. 4 or 6) if, during the intended laser processing, the second scanning range 302b is caused to move relative to the workpiece 102 in the −Y-direction. Offsetting the sensing range 402 in this manner can provide for realtime worksurface Z-height measurement but is also susceptible to the same delays discussed above. Also, and depending on the workpiece 102 being processed, offsetting the sensing range 402 as described above will often (though, not necessarily always) only be effective if the sensing range 402 is offset in the same direction in which the second scanning range 302b is caused to move relative to the workpiece 102. This problem, however, can be mitigated by providing multiple Z-height sensors (e.g., configured and arranged so as to yield multiple sensing ranges, each disposed on opposite sides of the second scanning range 302b). This problem, can also be mitigated by implementing, when processing the workpiece 102, a scanning technique according to one or more embodiments exemplarily described below.

In embodiments in which the centroid or other central region of the sensing range 402 is arranged completely outside the second scanning range 302b, the controller 114 compensates for the detected variation or deviation indicated by an item of Z-height information when a processing position is the same as the sensing position associated with that item of Z-height information. In another embodiment, compensation for the detected variation or deviation is effected when the processing position is within a specified distance (e.g., within 400 µm, 200 µm, 100 µm, 80 µm, 60 µm, 50 µm, 30 µm, 15 µm, or the like, etc.) of the sensing position. The specified distance may be fixed, or may be variable depending upon factors such as the rate with which the second scanning range 302b is scanned, the response time associated with the mechanism for effecting Z-height compensation, or the like or any combination thereof. Such compensation may likewise be effected in embodiments in which the centroid or other central region of the sensing range 402 is within the second scanning range 302b, or in which the sensing range 402 is arranged partially within the second scanning range 302b but the centroid or other central region of the sensing range 402 is outside the second scanning range 302b.

The processing position can be a position (e.g., determined relative to the third scanning range) where a current laser pulse is to be delivered to a process spot during processing of the workpiece, a centroid position corresponding to positions where a series of laser pulses to be sequentially-delivered to a plurality of spatially distributed process spots during processing of the workpiece, a portion of the second scanning range 302b (e.g., an edge thereof, a centroid or other interior region thereof), a portion of the first scanning range (e.g., an edge thereof, a centroid or other interior region thereof), or the like or any combination thereof. Information indicative of the processing position can be obtained or derived (e.g., at the controller 114) from one or more signals (e.g., encoder signals) generated and output to the controller 114 by the first positioner 106, the second positioner 108, the third positioner 110, or any combination thereof, from information describing the process trajectory, or the like or any combination thereof.

Although particular embodiments in this section concerning the placement of the sensing range 402 have been discussed in relation to the second scanning range 302b, it will be appreciated that the Z-height sensor 124 may, in other embodiments, be arranged and configured such that the sensing range 402 is similarly offset from other scanning ranges such as second scanning range 302a. Further, although particular embodiments in this section concerning Z-height have been discussed in connection with the apparatus 100, it will be appreciated that any one of these embodiments, or any combination thereof, may be implemented in connection with any laser-processing apparatus other than the apparatus 100. Further, although particular embodiments in this section concerning Z-height measurement and Z-height compensation, etc., have been discussed in connection with laser-processing apparatus and laser-based processes, it will be appreciated that any one of these embodiments or any combination thereof, may be implemented in connection with any other suitable apparatus such as a mechanical drill, water-cutting or drilling apparatus, electron-beam cutting machines, abrasive blasting machines, etc. configured to process a workpiece.

A. Example Embodiments of Mechanisms for Effecting Z-Height Compensation i. Lens Actuator In one embodiment, a mechanism for effecting Z-height compensation may include the aforementioned lens actuator. For example, the lens actuator can be actuated to adjust the location of the beam waist along the beam axis (also referred to herein as the "focus Z-height," as measured from the exit pupil of the scan lens 112), so that a delivered laser pulse will have a desired spot size at the desired process spot.

ii. First Positioner

In one embodiment, the first positioner 106 may include a MEMS mirror or mirror array, as exemplarily described above, which can be actuated to effect Z-height compensation by changing the spot shape or spot size of laser pulses delivered to the workpiece 102. In another embodiment, the first positioner 106 may include one or more AOD systems, as exemplarily described above, which can be driven (e.g., upon the application of one or more RF signals to one or more ultrasonic transducer elements, each acoustically coupled to one or more AO cells) to effect Z-height compensation. Example embodiments of driving an AOD system are described in greater detail below. Although these example embodiments are discussed in relation to an AOD system incorporated within an apparatus such as apparatus 100 or 700, it will be appreciated that the example embodiments may be suitably implemented with any laser-based apparatus incorporating an AOD system, regardless of whether the laser-based apparatus is a laser-processing apparatus.

a. Chirped RF Signals

In one embodiment, when the first positioner 106 includes an AOD system (e.g., a multi-axis AOD system), the AOD system can be driven by chirping an RF signal applied to one or more ultrasonic transducer elements of the AOD system when laser pulses transit through an AO cell acoustically coupled thereto. Chirping an applied RF signal has the effect of creating a change in the focal length of the beam of laser pulses exiting the AOD system. Upon changing the focal length, the effective spot size of laser pulses delivered to the workpiece 102 changes in a corresponding manner. The degree to which the focal length is changed can be characterized by the following:

$$F=v^2/(\lambda*df/dt),$$

where F is the effective focal length produced by the chirping, v is the acoustic velocity within the AO cell, $\lambda$ is the wavelength of laser pulses and df/dt is the rate of change in the RF frequency applied to the ultrasonic transducer element. As will be appreciated, the direction in which the focal length is changed (i.e., toward or away from the workpiece 102) is given by the sign of F (i.e., which may be positive or negative, depending on whether the frequency is modulated to increase or decrease with time).

Generally, chirping an applied RF signal works well for laser pulses that are shorter than the transit time of the acoustic wave through the aperture illuminated by the beam of laser pulses. It can be difficult to effectively change the focal length of a beam of laser pulses generated by a laser source 104 such as a QCW laser, essentially because QCW lasers have (effectively) no laser-off time between pulses during which the chirp frequency can be reset to a starting value. Accordingly, it can be easier to implement a chirping technique with discretely-pulsed lasers, such that the chirp sweep (about center AOD frequencies required for spot positioning) can be set up properly as the laser pulse passes through the AOD. Nevertheless, chirping techniques can be used with CW or QCW lasers if a pulse gating unit is also provided.

The extent to which an AOD system can impart movement to the beam axis is proportional to the frequency of the applied RF signal. When the applied RF frequency is chirped, the acoustic wave frequency will vary across the width of a laser pulse (i.e., measured transverse to the beam path 116) transiting through the AO cell, and deflection of the beam path 116 will be proportional to the mean frequency across the transiting laser pulse. The mean frequency can be properly set up or calibrated to impart desired movement of the beam axis. However, variations in laser pulse and/or AOD control signal timing can cause a shift in this mean frequency, and thus create a spot position error (i.e., resulting in a laser pulse being delivered to a position at the workpiece 102 that is different from the desired spot location). For example, an AOD system have a first scanning range of 150 µm (e.g., over a 30 MHz bandwidth). Thus the amount of beam path deflection per MHz would be 150 µm/30 Mhz, or 5 µm/MHz. If a desired chirp rate is 30 MHz/µs, a timing variation of 10 ns would produce a beam path deflection error of 1.5 µm (i.e., (5 µm/MHz)*(30 MHz/µs)*(10 ns)).

The variation in laser pulse and/or AOD control signal timing typically arises from circuitry or operations within the controller 114 (as it may be variously embodied), variations in drivers, generation of laser pulses from the laser source 104, etc. In some laser sources (such as diode-pulsed fiber lasers), the jitter between an input laser trigger signal and the corresponding laser pulse ultimately generated may be relatively low (<10 ns). In other laser sources (e.g. Q-switched diode-pump lasers), the variation may be larger (e.g., due to random synchronization of internal Q switch activity and laser cavity dynamics). For instance, a typical UV Q-switched laser can exhibit approximately ±15 ns of timing uncertainty between the input laser trigger signal and the corresponding laser pulse ultimately generated. Further, a typical FPGA may have a fundamental clock running at a 20 ns clock period. Thus a controller 114 including such an FPGA would introduce an additional ±10 ns of timing uncertainty. These timing uncertainties can result in a positioning error for laser pulses ultimately delivered to the workpiece 102 (i.e., a variation or deviation of the actual location of where the laser pulse is ultimately delivered away from the desired process spot). Depending on the particular features to be formed during processing, this positioning error may or may not be significant.

When effecting Z-height compensation, the above-described positioning error may be significant. In such situations, synchronization between the output of a trigger signal to the laser source 104 (e.g., to generate a laser pulse), the output of a trigger signal to the AOD system (e.g., to apply one or more chirped RF signals), and generation of laser pulses by the laser source 104 may be improved. For example, in an embodiment in which the laser source 104 relies on an internal clock to trigger the output of laser pulses, the internal clock could be synchronized (e.g., through a PLL, gating logic, etc.) to the internal clock of the controller 114 that initiates the trigger signal to the AOD system. Further, any clock involved in generating the chirp sequence itself (e.g., a clock used by a direct digital synthesizer (DDS) circuit, etc.) may be similarly synchronized. This synchronization can reduce the timing uncertainty to only the timing uncertainty due to random laser cavity effects.

b. Spectrally-Shaped RF Signals

In one embodiment, when the first positioner 106 includes an AOD system (e.g., a multi-axis AOD system), the AOD system can be driven by applying a spectrally-shaped RF signal to one or more ultrasonic transducer elements when laser pulses transit through an AO cell acoustically coupled thereto. In this embodiment, the shape of the spectrum in the applied RF signal is selected to change the $M^2$ factor (also known in the art as the "beam quality factor" or "beam propagation factor") of the beam of laser pulses exiting the AOD system. Upon changing the $M^2$ factor, the effective spot size of laser pulses delivered to the workpiece 102 changes in a corresponding manner. The degree to which the $M^2$ factor can be changed corresponds to the breadth of the spectrum in the applied RF signal (e.g., a relatively broad spectrum will have a stronger impact on the $M^2$ factor than a relatively narrow spectrum). Generally, shaping the spectral content of an applied RF signal—as described herein— works well for laser pulses that are longer than the transit time of the acoustic wave through the aperture illuminated by the beam of laser pulses.

In embodiments in which laser pulses having a radially-symmetric, Gaussian spatial intensity profile are to be delivered to the workpiece 102 (and assuming that laser pulses output by the laser source 104 have a Gaussian spatial intensity profile), then the spectrum of the applied RF signal can also have a Gaussian shape. In one embodiment, therefore, a first type of RF signal that may be applied can characterized as a relatively narrow signal spiking in the time domain (i.e., implying a constant, or substantially constant, phase between all frequencies in the applied signal spectrum). This type of signal has the potential to negatively affect the overall diffraction efficiency of the AOD cell. Accordingly, in another embodiment, a second type of RF signal that may be applied can be characterized as a relatively smooth signal, looking almost like a single frequency oscillation (e.g., a signal where the amplitude of one oscillatory peak is approximately the same as the amplitude of every other oscillatory peak). Such an RF signal can include a quasiperiodic signal. Unlike spiked RF signals, these spectrally-shaped RF signals can be constructed to not noticeably impact the diffraction efficiency of the AO cell.

Suitable spectrally-shaped RF signals can be created using any suitable technique. In one embodiment, a spectrally-shaped RF signal can be created by a process that includes selecting a desired center frequency, $\omega_o$, to set the centroid position of the modulated beam, selecting the desired spectral width, $\sigma_\omega$, to set the effective laser pulse spot size at the workpiece 102, selecting a desired frequency resolution, $r_\omega$, to set the spacing of discrete frequencies to be driven, and inputting the selected center frequency, $\omega_o$, spectral width, $\sigma_\omega$, and frequency resolution, $r_\omega$, to an algorithm such as the Gerchberg-Saxton algorithm, to approximate, the desired spectral properties for an RF signal to be applied, through determination of the phases needed for each frequency. In this embodiment, the AOD system can be designed such that the beam of laser pulses incident upon AO cell illuminates a relatively large number of grating periods of the AO cell (e.g., a 6 mm beam size incident upon a quartz AO cell at a pulse repetition rate of 100 MHz illuminates more than 100 periods), thereby achieving a suitable approximation to a Gaussian spectrum for most practical cases. The approximation can then be applied (e.g., at the controller 114) to generate one or more appropriate spectrally-shaped RF signals to be applied to the AOD system. By varying the spectral width, $\sigma_\omega$, input to the approximation algorithm, the spectrum of the applied RF signal can be varied to vary the width of the spectrum in the applied RF signal. Further, the beam path 116 can be deflected by varying the center frequency, $\omega_o$, input to the approximation algorithm. It will thus be appreciated that the spectral width, $\sigma_\omega$, center frequency, $\omega_o$, and frequency resolution, $r_\omega$, or any combination thereof can be varied either together or separately.

iii. Third Positioner

In another embodiment, a mechanism for effecting Z-height compensation may include the third positioner 110. For example, the third positioner 110 can be actuated to move the workpiece 102 so that the worksurface Z-height is within the predetermined nominal Z-height process window (thereby enabling the beam waist of a delivered laser pulse to be present at the desired process spot).

iv. Other Example Embodiments of Mechanisms for Effecting Z-Height Compensation

In one embodiment, a mechanism for effecting Z-height compensation may include a component such as a lens, a MEMS mirror or mirror array, or the like or any combination thereof. In this embodiment, such a mechanism may be provided (e.g., in addition to the first positioner 106, the third positioner 110, the scan lens 112 or any combination thereof), and may be disposed in the beam path 116 at any location optically "upstream" or "downstream" of the first positioner 106, the second positioner 108, the third positioner 110, the scan lens 112, or any combination thereof. When provided as a lens, the lens may be provided as a fixed-focal length lens coupled to a lens actuator (e.g., a voice coil, etc.) configured to translate the lens along the beam path 116, thereby effecting a change in position of the beam waist along the beam axis. In another embodiment, the lens may be provided as a variable-focal length lens (e.g., a zoom lens, or a so-called "liquid lens" incorporating technologies currently offered by COGNEX, VARIOPTIC, etc.) capable of being actuated (e.g., via a lens actuator) to change the position of the beam waist along the beam axis.

V. Embodiments Concerning Scan Head Configurations

In the embodiment shown in FIG. 1, the apparatus 100 includes a single scan head 118. In another embodiment, however, the apparatus 100 may be provided with multiple (e.g., 2, 3, 4, 5, 6, 8, etc.) scan heads, each of which may or may not be provided in the manner described with respect to scan head 118. Providing an apparatus 100 with multiple scan heads (i.e., as a "multi-head apparatus") may improve the throughput of laser processes applied by the apparatus 100. Different scan heads of such a multi-head apparatus can be identically or differently mounted, configured, driven, actuated, or the like or any combination thereof.

For example, in one embodiment, one or more characteristics of scan lenses of different scan heads can be the same or different. Example characteristics of a scan lens can include type (e.g., f-theta, telecentric, axicon, etc.), focal length, numerical aperture, material composition, presence/absence of coatings, coating composition, etc.

In another example, a positioner (e.g., the aforementioned second positioner 108) may be incorporated within a scan head, while another scan head may or may not have a positioner incorporated therein or otherwise associated therewith. Moreover, one or more characteristics of positioners of different scan heads can be the same or different. Example characteristics of positioners can include the number of positioners (e.g., 1, 2, 3, etc.) of a scan head 702, the type (e.g., a mechanical-type positioner such as a galvanometer mirror, MEMS mirror or mirror array, a piezoelectric actuator, an electrostrictive actuator, a voice-coil actuator, etc., a solid-state positioner such as an AOD, an EOD, etc.) of each positioner of a scan head, positioning bandwidth, size of scanning range, shape of scanning range, manufacturer, software control, etc. Likewise, a positioner of one scan head 702 can be driven according to the same control signal(s) as a positioner of one or more other scan heads 702. Alternatively, a positioner of one scan head 702 can be driven according to a different control signal as a positioner of one or more other scan heads 702.

In one embodiment, different scan heads can be mounted within the apparatus in the same way, or in different ways. For example, at least one (or all) scan heads can be fixed (e.g., to a frame incorporated within the apparatus) so as to remain stationary within the apparatus. In another example, at least one (or all) scan head can be moveable within the apparatus. When moveable, at least two (or all) scan heads may be moveable (e.g., linearly translated, rotated, etc.) in or along the same direction, in or along different directions, or the like or any combination thereof. When configured to be moveable in the same direction, the at least two (or all) scan heads may be moveable at the same speed (e.g., such that no relative movement occurs as between those scan heads) or at different speeds (e.g., such that relative movement occurs as between those scan heads). To facilitate movement, the apparatus may include one or more gantries, linear stages, rotational stages, articulated robotic arms, or the like or any combination thereof, beneficially coupled to one or more of the scan heads. Such stages may be part of the aforementioned third positioner 110 (and thus driven according to one or more control signals intended to impart relative movement between the beam axis and the workpiece 102, as discussed above), or may be separate from the third positioner 110 (and thus driven according to one or more control signals intended for some purpose other than impart relative movement between the beam axis and the workpiece 102, e.g., to ensure adjust an alignment between each scan head and one or more workpieces to be processed by the multi-head apparatus).

In some embodiments, the multi-head apparatus can include a single Z-height sensor, such as the aforementioned Z-height sensor 124, or may include multiples of such Z-height sensors. In some embodiments, a Z-height sensor may be associated with a single scan head, or may be associated with multiple (e.g., 2, 3, 4, 5, 6, 8, etc.) scan heads. In one embodiment, the number of Z-height sensors included is the same as the number of scan heads in the multi-head apparatus, and each Z-height sensor is associated with a single scan head.

Having described certain features of a multi-head apparatus above, configurations associated with the multi-head apparatus according to some embodiments will be exemplarily described in greater detail with reference to FIG. 7.

When provided as a multi-head apparatus, the apparatus 100 (referred to with respect to FIG. 7 as a multi-head apparatus 700) may include four scan heads, such as first scan head 702a, second scan head 702b, third scan head 702c and fourth scan head 702d (each generically referred to as a scan head 702 or, collectively, scan heads 702). Groups of scan heads 702 can be supported by a common rail. For example, first scan head 702a and third scan head 702c can be commonly supported by a first rail 704a and the second scan head 702b and fourth scan head 702d can be commonly supported by a second rail 704b. As used herein, the first rail 704a and the second rail 704b are also generically referred to as a rail 704 or, collectively, as rails 704.

Generally, each rail 704 can be fixed within the apparatus 100 so as to be stationary or moveable (e.g., linearly translated along the X-direction, along the Y-direction, or along some other direction, or about an axis parallel to the X- or Y-directions, or rotated about an axis parallel to some other direction, or the like, or any combination thereof). For example, in the illustrated embodiment, the first rail 704a may be coupled to a stage (not shown) configured to move the first rail 704a along the X-direction (e.g., as indicated by arrow 706), and the second rail 704b fixed within the multi-head apparatus 700 so as to be stationary.

Generally, scan heads 702 carried by a rail 704 can be coupled to the rail 704 so as to be stationary or moveable (e.g., linearly translated along the X-direction, along the Y-direction, or along some other direction, or about an axis parallel to the X- or Y-directions, or rotated about an axis parallel to some other direction, or the like, or any combination thereof). For example, in the illustrated embodiment, the third scan head 702c and the fourth scan head 702d are fixed so as to be stationary with respect to the first rail 704a and the second rail 704b, respectively, whereas the first scan head 702a is coupled to a first Y-stage 708a (which may also be carried by the first rail 704a) so as to be movable along the Y-direction (e.g., as indicated by arrow 710) and the second scan head 702b is coupled to a second Y-stage 708b (which may also be carried by the second rail 704b) so as to be moveable along the Y-direction (either independently of, or in unison with, the first scan head 702a). Alternatively, the first scan head 702a and second scan head 702b may be coupled to a common Y-stage (not shown) that moveably coupled to the first rail 704a and/or second rail 704b (e.g., via any suitable or beneficial mechanical linkage spanning the first rail 704a and second rail 704b). Thus, constructed as described above, the first scan head 702a is moveable along the X- and Y-directions, the second scan head 702b is moveable along the Y-direction (e.g., in unison with the first scan head 702a), the third scan head 702c is moveable along the X-direction (e.g., in unison with the first scan head 702a), and the fourth scan head 702d is fixed so as to remain stationary.

Generally, each scan head 702 is adapted to receive laser pulses that propagate along one or more beam paths, such as aforementioned beam path 116, from one or more laser sources such as such as aforementioned laser source 104. For example, in the illustrated embodiment, the laser pulses are generated from a single laser source 104, and are modified (e.g., focused, expanded, collimated, shaped, polarized, filtered, split, or otherwise modified, conditioned or directed, etc.) by an optional optical system 712. The optical system 712 may include one or more optical components including a beam expander, a beam shaper, an aperture, a harmonic generation crystal, a filter, a collimator, a lens, a mirror, a polarizer, a diffractive optical element, a refractive optical element, or the like or any combination thereof. In one embodiment, the optional optical system 712 may include any configuration of optical components as exemplarily described in the context of modular imaging optical rails in U.S. Pat. No. 6,433,301, which is incorporated herein by reference in its entirety.

In the illustrated embodiment, the laser pulses generated by the laser source 104 (and, optionally, passed by the optical system 712) are propagated through a primary beam distributor 714 to direct, simultaneously and/or alternately, laser pulses along a first primary beam path 116a1 and a second primary beam path 116a2 (each generically referred to as a primary beam path 116a or, collectively, primary beam paths 116a). In one embodiment, the primary beam distributor 714 is provided as an AOM, and the primary beam paths 116a are provided as zeroth- and first-order beam paths associated with the AOM (e.g., as exemplarily discussed in aforementioned U.S. Pat. No. 7,133,187). Generally, diffraction efficiency of an AOM is not 100%. Therefore, at least some energy will always be transmitted along a primary beam path 116a, even when the AOM is driven to select the first-order beam path. Accordingly, and in an optional embodiment, energy transmitted along the zeroth-order beam path can be blocked or otherwise prevented from reaching the worksurface 102a by suitably operating the first positioner 106, the second positioner 108, or the like or any combination thereof. In another embodiment, however, one of the primary beam paths 116a may be provided as a positive first-order beam path associated with the AOM and the other of the primary beam paths 116a may be provided as a negative first-order beam path associated with the AOM. In this embodiment, a beam dump (not shown) may be provided to receive energy transmitted along the zeroth-order beam of the AOM.

When provided as an AOM, the primary beam distributor 714 may, optionally, be operated (e.g., in response to one or more control signals output by the controller 114, by another controller, or the like or any combination thereof), to temporally chop or slice the laser pulses generated by the laser source 104 (and, optionally, passed by the optical system 712), to block, dump or otherwise attenuate one or more laser pulses (in their entirety) generated by the laser source 104 (and, optionally, passed by the optical system 712), or the like or any combination thereof. For example, the AOM may be operated to block, dump or otherwise attenuate at least one portion of one or more (or all) laser pulses generated by the laser source 104 (and, optionally, passed by the optical system 712). One or more portions of a laser pulse may be blocked, dumped or otherwise attenuated to generate one or more laser pulses having a relatively reduced pulse duration, shorter or longer rise time, shorter or longer fall time, or the like or any combination thereof.

Blocking or dumping one or more laser pulses in a series of sequentially-generated laser pulses is also known as "pulse picking." Pulse picking may be implemented whenever suitable or otherwise desired. For example, if a processing trajectory required to form a plurality of features (e.g., vias) specifies that at least some of the feature-to-feature moves to be traversed by the process spot will take the same amount of time, Tm, then laser pulses can be generated by the laser source 104 at a pulse repetition rate of 1/Tm. Then, for any feature-to-feature moves that are to be traversed by the process spot over an amount of time that is an integer multiple, k, of Tm (e.g., k*Tm), then the primary beam distributor 714 (e.g., when provided as an AOM) can be operated to block any pulses generated during the period of k*Tm.

In some cases, a change in the pulse repetition rate with which laser pulses are generated by the laser source 104 ends up changing the temporal intensity profile of the generated laser pulses in a measurable way. Such changes can be characterized (e.g., during a pre-processing calibration step, etc.) and the primary beam distributor 714 (e.g., when provided as an AOM) can be operated to compensate for those pre-characterized changes (e.g., by blocking, dumping or otherwise attenuating at least one portion of one or more (or all) laser pulses generated by the laser source 104). As a result, laser pulses propagating along the primary beam paths 116a can have uniform (or at least substantially uniform) temporal intensity profiles, regardless of a change in pulse repetition rate with which the laser pulses are generated.

In other embodiments, the primary beam distributor 714 may be provided as one or more polarizers, beam splitters, spinning chopper mirrors, rotating polygon mirrors, resonant galvanometer mirror systems, electro-optic modulators (EOMs), or the like or any combination thereof. The use of EOMs for controlling alternative beam paths and/or combining beam paths is discussed in detail in U.S. Pat. No. 8,374,206, which is incorporated herein by reference in its entirety. It also will be appreciated that the optional optical system 712 may be commonly disposed along the primary beam paths 116a at a location downstream of the primary beam distributor 714, instead of upstream of the primary beam distributor 714 as illustrated. In other embodiment, a plurality of optional optical systems 712 may be provided downstream of the primary beam distributor 714, with each optional optical system 712 being positioned along a different primary beam path 116.

Laser pulses directed along the primary beam path 116a are further distributed by a first secondary beam distributor 716a and a second secondary beam distributor 716b (each generically referred to as a secondary beam distributor 716 or, collectively, secondary beam distributors 716). The first secondary beam distributor 716a is configured to direct, simultaneously and/or alternately, laser pulses propagating along the first secondary beam path 116a1 to a first secondary beam path 116b1 and a second secondary beam path 116b2. Likewise, the second secondary beam distributor 716b is configured to direct, simultaneously and/or alternately, laser pulses propagating along the second secondary beam path 116a2 to a third secondary beam path 116b3 and a fourth secondary beam path 116b4. In the illustrated embodiment, each secondary beam distributor 716 is provided as system comprising a beam splitter and a mirror. For example, the first secondary beam distributor 716a includes a beam splitter 718 and a mirror 720. In other embodiments, however, any secondary beam distributor 716 can be provided as an AOM, one or more polarizers, beam splitters, spinning chopper mirrors, rotating polygon mirrors, electro-optic modulators (EOMs), or the like or any combination thereof.

The first secondary beam path 116b1, second secondary beam path 116b2, third secondary beam path 116b3 and fourth secondary beam path 116b4 (each generically referred to as a secondary beam path 116b or, collectively, secondary beam paths 116b, each propagate to a different scan head 702. For example, in the illustrated embodiment, the first primary optical path 116a1 is split by a beam splitter 718 of the first secondary beam distributor 716a to form the first secondary beam path 116b1 and the third secondary beam path 116b3, and the second primary optical path 116a2 is split by a beam splitter 718 of the first secondary beam distributor 716b to form the second secondary beam path 116b2 and the fourth secondary beam path 116b4. The first secondary beam path 116b1 is directed to the first scan head 702a, the second secondary beam path 116b2 is directed to the second scan head 702b, the third secondary beam path 116b3 is directed to the third scan head 702c and the fourth secondary beam path 116b4 is directed to the fourth scan head 702d. In the illustrated embodiment, each secondary beam path 116b serves a set of scan heads 702 on only a single rail 704. It will be appreciated, however, that any primary beam path 116a may be split such that its associated secondary beam paths 116b may be delivered to scan heads 702 on different rails 704.

In the illustrated embodiment, optics assemblies, such as first optics assembly 722a, second optics assembly 722b, third optics assembly 722c and fourth optics assembly 722d (each generically referred to as an optics assembly 722 or, collectively, optics assemblies 722), are disposed within the secondary beam paths 116b, such that an optics assembly 722 is disposed in a secondary beam path 116b at a location upstream of a scan head 702 disposed in the same secondary beam path 116b. Thus, in the illustrated embodiment, the first secondary beam path 116b1 propagates through first optics assembly 722a to first scan head 702a, the second secondary beam path 116b2 propagates through second optics assembly 722b to second scan head 702b, the third secondary beam path 116b3 propagates through third optics assembly 722c to third scan head 702c and the fourth secondary beam path 116b4 propagates through fourth optics assembly 722d to fourth scan head 702d. It will be appreciated, however, that there may be fewer optics assemblies 722 than scan heads 702.

Although not shown, an optical bypass system (e.g., comprising one or more mirrors, AOMs, positioners (e.g., galvanometer mirror systems, fast-steering mirrors, etc.), beam splitters, optical switches, or the like or any combination thereof) may be disposed in any secondary beam path 116b to bypass a corresponding optics assembly 722. Thus, when an optical bypass system is disposed in any particular secondary beam path 116b, an optics assembly 722 can be functionally removed from the particular secondary beam path 116b. Alternatively, one or more (or all) of the optics assemblies 722 can be omitted entirely from the apparatus 700.

Each optics assembly 722 can include one or more positioners, such as aforementioned first positioner 106 and, optionally, one or more half-wave plates, apertures, relay lenses, mirrors, or the like or any combination thereof (e.g., all disposed within a common housing having optical input and output ports, fixed to a common frame, or the like or any combination thereof). Different optics assemblies 722 can be identically or differently configured, driven, actuated, or the like or any combination thereof. Thus, a positioner of one optics assembly 722 can be of the same or different type as (or be of the same type, but have a different characteristic as), a positioner of one or more other optics assemblies 722. Example characteristics of positioners can include the number of positioners (e.g., 1, 2, 3, etc.) of an optics assembly 722, the type of each positioner of an optical assembly 722, positioning bandwidth, size of scanning range, shape of scanning range, manufacturer, software control, etc. Likewise, a positioner of one optics assembly 722 can be driven according to the same control signal(s) as a positioner of one or more other optics assemblies 722. Alternatively, a positioner of one optics assembly 722 can be driven according to a different control signal as a positioner of one or more other optics assemblies 722. Positioners of different optics assemblies 722 can be driven simultaneously, sequentially, randomly, or the like or any combination thereof. Each optics assembly 722 can be individually packaged as a modular assembly, so it can be selectively removed or replaced relative to another optics assembly 722.

Although not illustrated, the housing, frame, etc., of one or more of the optics assemblies 722 may include a registration feature configured to facilitate optical alignment of a corresponding secondary beam path 116b within a multi-head apparatus 700 with at least one component of the optics assembly 722 (e.g., with a positioner, an aperture, a relay lens, a mirror, an optical input port, an optical output port, or the like or any combination thereof). Thus, the multi-head apparatus 700 may further include a frame, latch, etc., configured to be engaged with the registration feature of an optics assembly 722.

Figure 7:
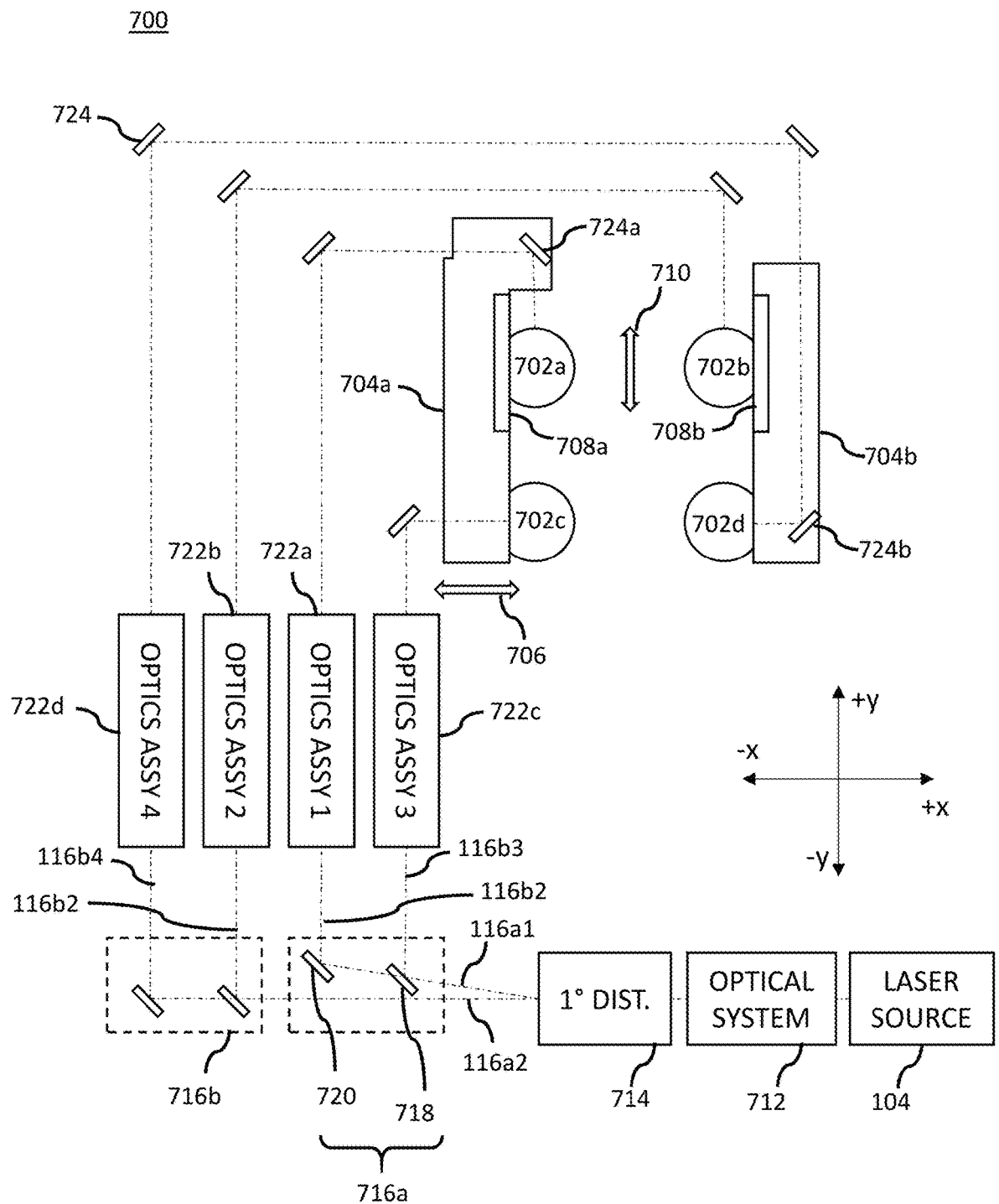
FIG. 7 schematically illustrates a multi-head apparatus for processing a workpiece, according to one embodiment.

As exemplarily shown in FIG. 7, the primary beam distributor 714 distributes an incoming train of laser pulses across a set of primary beam path 116a (e.g., two primary beam path 116a), and the secondary beam distributors 716 distribute incoming trains of laser pulses across a set of secondary beam paths 116b (e.g., four secondary beam paths 116b). In another embodiment, however, one of the secondary beam distributors 716 disposed along a selected primary beam path 116a may be omitted (e.g., along with a corresponding optics assembly 722 disposed along a secondary beam path 116b downstream therefrom), and laser pulses propagating along the selected primary beam path 116a may be directed to a scan head 702 (e.g., with the aid of one or more mirrors, etc.).

Generally, and constructed as described above, one or more components of the multi-head apparatus 700 (e.g., the first beam distributor 714, the second beam distributors 716, first positioners 106 in the optics assemblies 722, second positioners 108 in the scan heads 702, etc.) can be operated (e.g., in response to one or more control signals output by the controller 114 (see FIG. 1) such that laser pulses (or bursts of laser pulses) are transmitted from one scan head 702 to the workpiece (not shown) simultaneously with laser pulses (or bursts of laser pulses) from at least one other scan head 702 (or all other scan heads 702) to the workpiece. In one embodiment, operation of the multi-head apparatus 700 is controlled such that laser pulses (or bursts of laser pulses) are delivered from one scan head 702 supported by a rail 704 simultaneously with laser pulses (or bursts of laser pulses) delivered from another scan head 702 (or all other scan heads 702) supported by the same rail 704. In another embodiment, laser pulses (or bursts of laser pulses) are delivered from different scan heads 702 supported by a common rail 704 (e.g., commonly supported by first rail 704a or second rail 704b) at a different times.

It will be appreciated that the overall design of the multi-head apparatus 700, including optically desirable distances between components, may influence the relative positioning of the optional optical system 712 and/or its components, the primary beam distributor 714, the secondary beam distributors 716, the optics assemblies 722 and their components, and the scan heads 702 and/or their components. A number of fold mirrors 724 may be employed to facilitate folding the various beam paths (e.g., primary beam path 116a, the secondary beam paths 116b, etc., each generically referred to as a beam path 116 or, collectively, as beam paths 116) along which laser pulses propagate, e.g., to avoid obstacles, to provide desirable segment lengths, to improve alignment, or the like or any combination thereof. Some of these fold mirrors 724, such as first fold mirror 724a and second fold mirror 724b may be supported by the first rail 704a and the second rail 704b, respectively. Alternatively or additionally, one or both of the first fold mirror 724a and second fold mirror 724b may be directly or indirectly supported by one or more linear or rotational stages to which a rail 704 is supported.

Constructed as described above, multiple scan heads 702 of the multi-head apparatus 700 may be used to simultaneously and/or sequentially process multiple, separate workpieces, or may be used to simultaneously and/or sequentially process a single workpiece. When multiple scan heads 702 are used to process multiple workpieces (e.g., simultaneously), the apparatus 100 may be provided with multiple third positioners 110, each of which may be operative to move a respective workpiece relative to a scan head. In this case, the third positioners may be operated to move the workpieces relative to one another, in unison (i.e., so no relative movement between workpieces occurs), or the like or any combination thereof.

VI. Embodiments Concerning Workpiece Handling System

To facilitate loading or unloading of workpieces into and out of an apparatus such as apparatus 100 or multi-head apparatus 700 (each generically referred to as an apparatus), a workpiece handling system, operative to transfer workpieces onto or off from the third positioner 110 (e.g., in response to one or more control signals output by the controller 114, by another controller, or the like or any combination thereof), may be provided.

Figure 8:
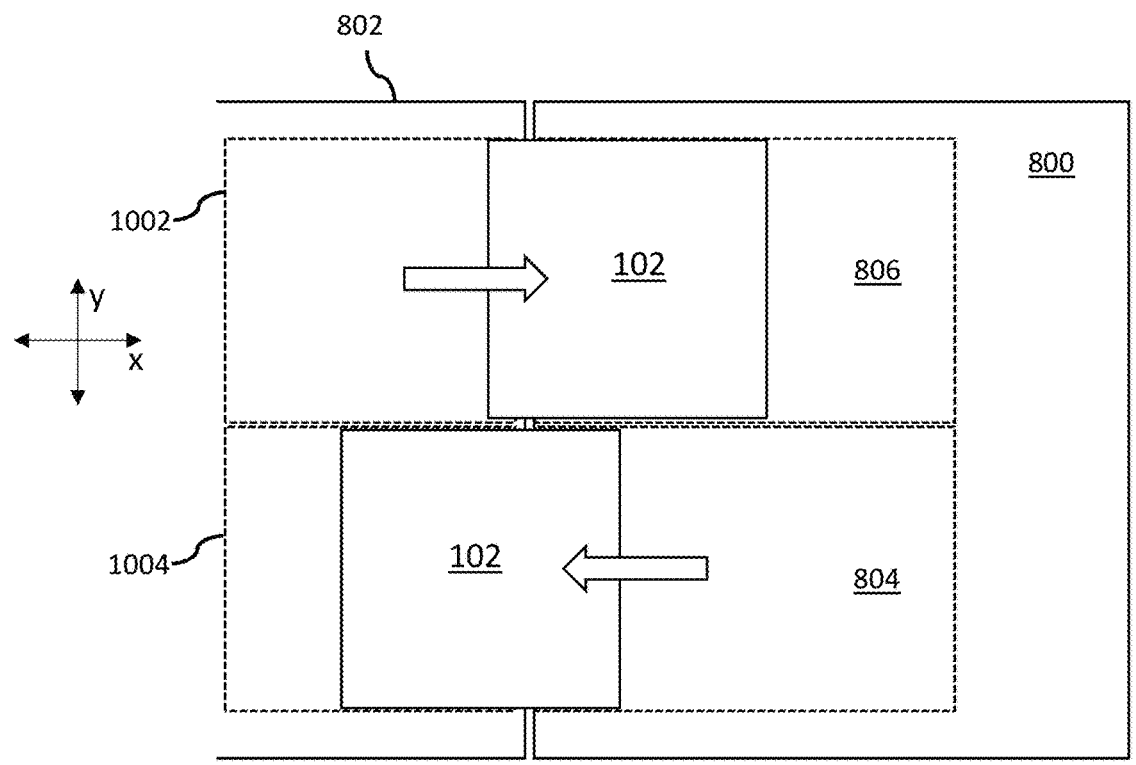
FIGS. 8 and 9 schematically illustrates top and side views of a workpiece handling system, for use with an apparatus such as those shown in FIGS. 1 and 7, according to one embodiment.
Figure 9:
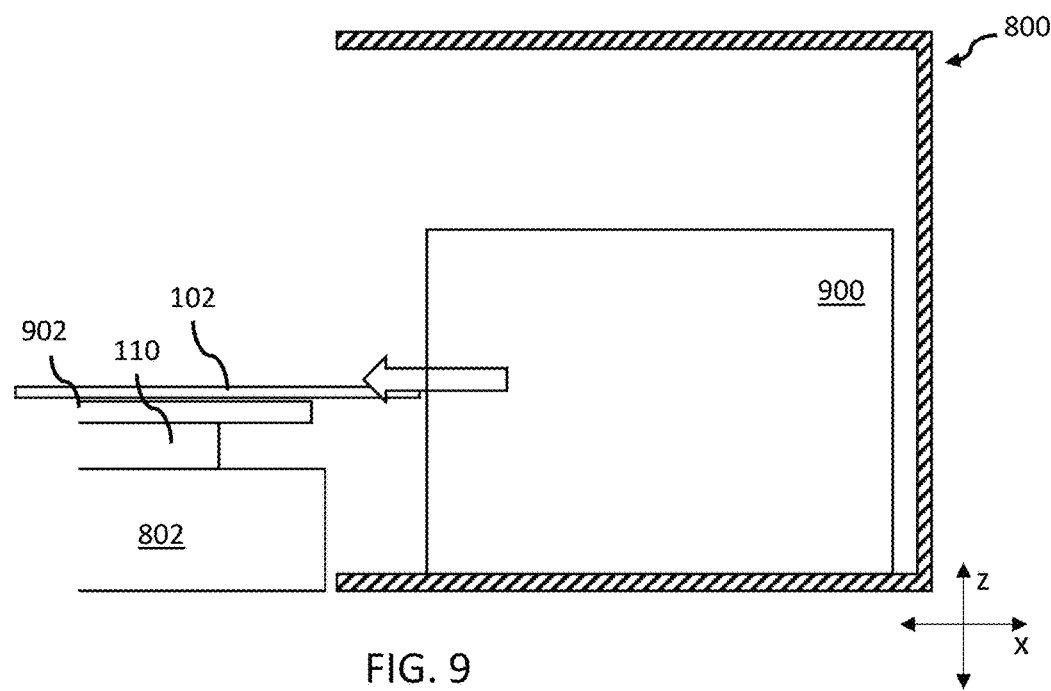

In one embodiment, and with reference to FIGS. 8 and 9, the workpiece handling system may be provided as workpiece handling system 800 including a storage bay configured to hold one or more workpieces, which may be unprocessed by the apparatus, partially processed by the apparatus, fully processed by the apparatus, or any combination thereof. The workpiece handling system 800 can be arranged next to the apparatus to facilitate transfer of workpieces. For example, as shown in FIG. 9, the workpiece handling system 800 can be arranged next to the aforementioned base (e.g., base 802) that supports the third positioner 110 (which may optionally, in turn, support a chuck 902). The workpiece handling system 800 can include a first transfer mechanism 900 operative to transfer a workpiece 102 from a first handling zone 804 of the workpiece handling system 800 to the apparatus. The workpiece handling system 800 can also include a second transfer mechanism (not shown) operative to transfer a workpiece 102 to a second handling zone 806 of the workpiece handling system 800 from the apparatus. The first transfer mechanism 900 and the second transfer mechanism may be provided as a robotic arm (e.g., having an end effector at an end thereof to engage with the workpiece, etc.), a roll-to-roll handling system such as the ROLL MASTER system manufactured by NORTHFIELD AUTOMATION SYSTEMS, or the like or any combination thereof.

In one embodiment, workpieces to be transferred by the first transfer mechanism 900 are pre-aligned in the first handling zone 804 so that, when the first transfer mechanism 900 transfers a workpiece from the first handling zone 804 to the apparatus, the workpiece will be disposed at a predetermined location and/or orientation on or over the third positioner 110. In another embodiment, workpieces to be transferred by the first transfer mechanism 900 are not pre-aligned in the first handling zone 804 and, as a result, the first transfer mechanism 900 may align the workpiece at a predetermined location and/or orientation on or over the third positioner 110 according to any suitable or beneficial technique (e.g., as exemplarily disclosed in aforementioned U.S. Pat. No. 7,834,293).

Figure 10:
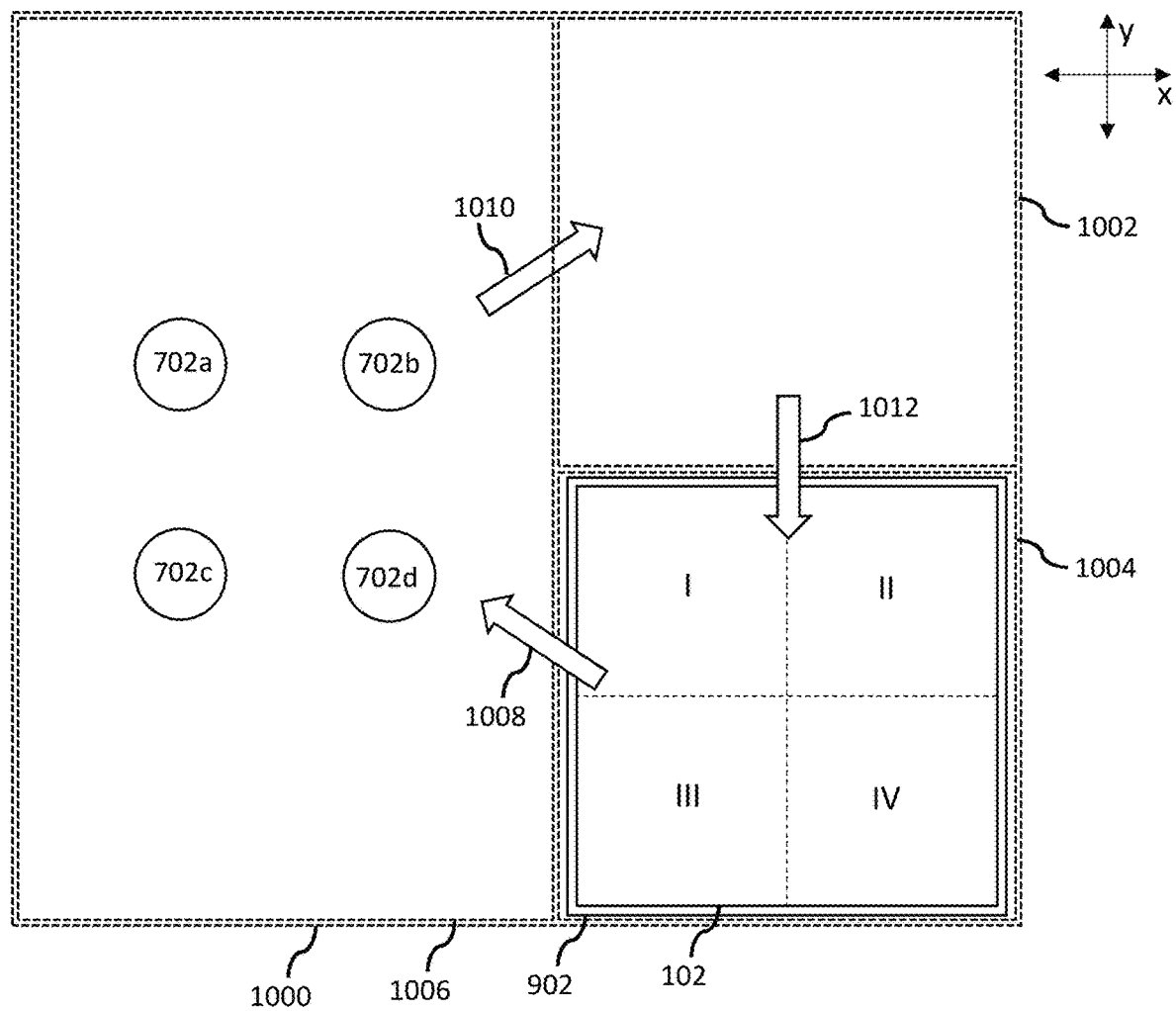
FIG. 10 schematically illustrates a process flow associated with the multi-head apparatus shown in FIG. 7, according to one embodiment.

In one embodiment, the apparatus may be configured to facilitate transfer of workpieces to and from the workpiece handling system 800. For example, and with reference to FIG. 10, the multi-head apparatus 700 may include a third positioner (not shown) configured to move a workpiece 102 (which may be optionally supported by a chuck 902) within a workpiece movement zone 1000. As shown in FIG. 10, the workpiece movement zone 1000 encompasses a workpiece loading zone 1002, a workpiece unloading zone 1004 and a workpiece processing zone 1006. The workpiece loading zone 1002 is aligned with the first transfer mechanism 900 of the workpiece handling system 800, the workpiece unloading zone 1004 is aligned with the second transfer mechanism of the workpiece handling system 800, and the workpiece processing zone 1006 is aligned with the scan heads 702 of the multi-head apparatus 700.

Constructed as described above, an example sequence for processing workpieces using the multi-head apparatus 700 can proceed as follows. If the chuck 902 is not already in the workpiece loading zone 1002, the third positioner is initially operated to move the chuck 902 into the workpiece loading zone 1002 and the first robot is operated to transfer a workpiece 102 from the first handling zone 804 onto the chuck 902. Next, the third positioner is operated to move the chuck 902, on which the transferred workpiece 102 is now supported, (e.g., in the X-, direction, in the Y-direction, or a combination thereof such as along arrow 1008) from the workpiece loading zone 1002 to the workpiece processing zone 1006 (e.g., in alignment with one or more of the scan heads 702). One or more laser pulses are delivered onto the workpiece 102 through one or more of the scan heads 702 to process the workpiece 102. After processing is complete, the third positioner is operated to move the chuck 902 (e.g., in the X-, direction, in the Y-direction, or a combination thereof such as along arrow 1010) from the workpiece processing zone 1006 into the workpiece unloading zone 1004 and the second transfer mechanism is operated to transfer the processed workpiece 102 from the chuck 902 into the second handling zone 806. Thereafter, the third positioner can be operated to move the chuck 902 (e.g., only in the Y-direction such as along arrow 1012) from the workpiece unloading zone 1004 into the workpiece loading zone 1002 and above-described sequence may be repeated as necessary.

In one embodiment, the third positioner 110 can be operated to move the chuck 902 faster along one direction than the other. For example, the third positioner 110 can be operated to move the chuck 902 faster along the Y-direction than the X-direction. In one particular embodiment, the third positioner 110 includes an X-stage and a Y-stage (e.g., provided in a stacked arrangement). The X-stage is configured to impart movement of the chuck along the X-direction at a first speed, and the Y-stage is configured to impart movement of the chuck along the Y-direction a second speed that is greater than the first speed.

As shown in FIG. 10, the workpiece 102 can be conceptually divided into four regions (e.g., first region I, second region II, third region III and fourth region IV) that correspond to the positions of the scan heads 702 within the multi-head apparatus 700. Accordingly, when the workpiece 102 is disposed within the workpiece processing zone 1006, the multi-head apparatus 700 may be operated to impart relative movement between the workpiece 102 and the scan heads 702 from which laser pulses are delivered during processing (i.e., to impinge upon the workpiece 102). As a result, the first region I may be processed by laser pulses delivered from the first scan head 702a, the second region II may be processed by laser pulses delivered from the second scan head 702b, the third region III may be processed by laser pulses delivered from the third scan head 702c and the fourth region IV may be processed by laser pulses delivered from the fourth scan head 702d. It will be appreciated, that the multi-head apparatus 700 may also be operated to impart the aforementioned relative movement such that multiple regions of the workpiece 102 can be processed (e.g., sequentially or alternately) by laser pulses delivered from a common scan head 702.

In one embodiment, the relative positions of the scan heads 702 in the multi-head apparatus 700 may be adjusted as exemplarily described above to correspond to dimensions of the particular workpiece 102 to be processed, to correspond to dimensions of regions within the particular workpiece 102 to be processed, or the like or any combination thereof.

Although particular embodiments in this section concerning the workpiece handling system 800 are discussed in connection with the multi-head apparatus 700, it will be appreciated that any one of these embodiments, or any combination thereof, may be implemented in connection with the apparatus 100 or any other laser-processing apparatus other than the apparatus 100, or any other apparatus (e.g., mechanical drills, water-cutting or drilling apparatus, electron-beam cutting machines, abrasive blasting machines, etc.) beneficially or suitably configured to machine the workpiece 102.

VII. Embodiments Concerning Scanning Techniques

As used herein, the term "scanning technique" can refer to the manner in which a process spot is scanned (e.g., within the first scanning range, the second scanning range, the third scanning range, or the like or any combination thereof) relative to the workpiece 102, the manner in which the first scanning range is scanned within the second scanning range, the manner in which any of the first or second scanning ranges is scanned within the third scanning range, or the like or any combination thereof. Generally, a scanning technique can be characterized by one or more parameters such as the process trajectory along which a process spot is to be scanned, direction (i.e., direction along which the process spot, first scanning range, second scanning range, or the like or any combination thereof, is to be scanned), scan rate (i.e., speed with which the process spot, first scanning range, second scanning range, or the like or any combination thereof, is to be scanned), or the like or any combination thereof.

A. Facilitating Z-Height Measurement, Compensation, etc.

In the embodiments discussed in this section, the apparatus 100 includes a Z-height sensor, such as Z-height sensor 124, which is positionally fixed relative to the scan lens 112. As a result, whenever relative movement between the second scanning range 302b and the workpiece 102 is imparted (i.e., whenever the second scanning range is "scanned," which may be accomplished by operating the third positioner 110), the sensing range 402 is also scanned in unison (e.g., in the same direction and at the same speed) with the second scanning range 302b. The second scanning range 302b (and, thus, the sensing range 402) can be scanned at a scan rate in a range from 25 mm/sec to 200 mm/sec. In one embodiment, the scan rate is in a range from 50 mm to 100 mm/sec. Depending upon factors such as processing speed, speed and/or accuracy with which Z-height measurements can be made, variation in surface topology of the worksurface 102a, etc., the scan rate can be less than 25 mm/sec or greater 200 mm/sec.

As mentioned above, offsetting the sensing range 402 relative to the second scanning range 320b as discussed above with respect to FIGS. 4 to 6 can lead to certain problems during processing of the workpiece 102. However these problems (or susceptibility to problems) can be ameliorated or avoided by raster-scanning the second scanning range 302b (and, thus, the sensing range 402) along a process trajectory defining a scan pattern that includes a plurality of strips or segments (e.g., which may be straight, curved, or a combination thereof) which are parallel or non-parallel with each other. Raster scanning may be performed according to a unidirectional scanning technique, a bidirectional raster-scanning technique, or the like or any combination thereof, examples of each of which are described in greater detail below. It will be appreciated that the scanning range 302b (and, thus, the sensing range 402) may be vector-scanned, arranged according to a step-and-repeat technique, or the like or any combination thereof, in addition to (or as an alternative to) being raster-scanned.

For purposes of facilitating discussion of the raster-scanning techniques discussed herein, each portion of a workpiece that coincides with a segment of a raster-scan pattern will also be referred to herein as a "segment" of the workpiece or, more simply, a "workpiece segment." Generally, each workpiece segment includes a portion of the workpiece that is to be processed by the apparatus 100 (e.g., to form one or more or features, etc.). In one embodiment however, at least one workpiece segment does not include any portion of the workpiece that is to be processed by the apparatus 100.

Any two workpiece segments may overlap one another, adjoin one another, or be spaced apart from one another. As used herein, two parallel workpiece segments are considered to be "adjacent" to one another if there is no intervening workpiece segment (either parallel or non-parallel) therebetween. Thus, two workpiece segments can be adjacent if they adjoin or are spaced apart from one another. In embodiments in which multiple pairs of parallel, spaced-apart workpiece segments exist, the distances between workpiece segments of at least two pairs of workpiece segments may be the same or different. Further, the distance between any pair of adjacent workpiece segments may be set manually (e.g., by the user) or automatically (e.g., at the controller 114), or the like or a combination thereof. When set automatically, the distance between any pair of adjacent workpiece segments may be set according to the length (or width) of the second scanning range 302b (e.g., as measured along a direction that is perpendicular to the scan direction), according to the placement of the sensing range 402 relative to the second scanning range 302b, according to the size and/or shape of the sensing range 402, according to optimization of a cost function representing, for example, the total amount of time necessary to process all of the workpiece segments), or the like or any combination thereof.

As used herein, the direction in which the second scanning range 302b is raster-scanned while laser pulses are delivered to the workpiece (thus forming a process spot) is referred to as the "scan direction." Likewise, the scan direction also refers to the direction in which the sensing range 402 is scanned while Z-height measurements are obtained. In the embodiments described below, the width of a workpiece segment (e.g., as measured along a direction that is perpendicular to the scan direction) is equal to the length (or width) of the second scanning range 302b (e.g., as measured along a direction that is perpendicular to the scan direction). In another embodiment, however, the width of a workpiece segment is less than, or greater than, the length (or width) of the second scanning range 302b (e.g., as measured along a direction that is perpendicular to the scan direction). Also in the embodiments described below, all workpiece segments of the same workpiece may have the same width (e.g., as measured along a direction that is perpendicular to the scan direction). In other embodiments, at least two of the workpiece segments may have different widths (e.g., wherein at least of the widths is less than, equal to, or greater than a length (or width) of the second scanning range 302b, as measured along a direction that is perpendicular to the scan direction). Further, the width of any workpiece segment may be set manually (e.g., by the user), automatically (e.g., at the controller 114), or the like or a combination thereof. When set automatically, the width of a workpiece segment may be set according to the length (or width) of the second scanning range 302b (e.g., as measured along a direction that is perpendicular to the scan direction), according to the placement of the sensing range 402 relative to the second scanning range 302b, according to the size and/or shape of the sensing range 402, according to optimization of a cost function representing, for example, the total amount of time necessary to process all of the workpiece segments), or the like or any combination thereof.

Although particular embodiments concerning certain scanning techniques, Z-height measurements, Z-height compensation, etc., are discussed in this section in connection with apparatus 100, it will be appreciated that any one of these embodiments or any combination thereof, may be implemented in connection with the multi-head apparatus 700. It will be further appreciated that the embodiments discussed in this section may be implemented with any suitably-equipped single- or multi-head laser-processing apparatus other than those discussed herein, or any other apparatus (e.g., mechanical drill, water-cutting or drilling apparatus, electron-beam cutting machines, abrasive blasting machines, etc.) beneficially or suitably configured to machine the workpiece 102.

i. Unidirectional Scanning

According to a unidirectional raster-scanning technique, the sensing range 402 and the second scanning range 302b are sequentially scanned along a common workpiece segment in a single scan direction. The sensing range 402 and the second scanning range 302b are also scanned along adjacent workpiece segments in a single scan direction.

To facilitate unidirectional raster-scanning, the apparatus 100 may include a Z-height sensor arranged and configured to project a sensing range 402 that is offset from the second scanning range 302b in a direction that is the same as the scan direction. For example, and with reference to FIG. 4 or 6, if the scan direction is the −Y-direction, then the sensing range 402 may also be offset from the second scanning range 302b in the −Y-direction. In another example, and with reference to FIG. 5 or 6, if the scan direction is the −X-direction, then the sensing range 402 may also be offset from the second scanning range 302b in the −X-direction.

Prior to processing, the relative position between the workpiece and the sensing range 402 is initially set such that the sensing range 402 is aligned at or near an end of the workpiece segment of the workpiece to be processed. For example, as illustrated in FIG. 11, the sensing range 402 (offset from the second scanning range as discussed with respect to FIG. 4) is aligned at an end of a current workpiece segment 1102 to be processed. Likewise, as illustrated in FIG. 15, the sensing range 402 (offset from the second scanning range as discussed with respect to FIG. 5) is aligned at an end of a current workpiece segment 1502 to be processed.

After the sensing range 402 is aligned with the current workpiece segment, the second scanning range 302b and sensing range 402 are scanned, in unison, along the segment in a scanning direction (e.g., in the −Y- or −X-directions, as shown in FIGS. 12 and 16, respectively). Accordingly, the sensing range 402 is scanned along the current workpiece segment to be processed, ahead of the second scanning range 302b. During scanning of the sensing range 402, Z-height measurements at various sensing positions are obtained and optionally stored (and, further optionally, processed as discussed above).

During scanning of the second scanning range 302b, laser pulses may be delivered to the portions of the current workpiece segment to be processed. If worksurface Z-height (e.g., either as previously measured or processed, and stored) at a particular sensing position is determined to be outside the predetermined nominal Z-height process window, then Z-height compensation can be effected (e.g., as discussed above) when the processing position is the same as (or is within a specified distance of) the particular sensing position.

After processing the current workpiece segment (e.g., when the second scanning range 302b is at or near the end of the current workpiece segment, as shown in FIG. 13 or 17), the relative position between the workpiece and the sensing range 402 is indexed such that the sensing range 402 is aligned at or near an end of a next workpiece segment to be processed (e.g., segment 1104 or segment 1504, as shown in FIGS. 14 and 18, respectively) and the above-described process may be repeated.

ii. Bidirectional Scanning

According to a bidirectional raster-scanning technique, the sensing range 402 and the second scanning range 302b are sequentially scanned along a common workpiece segment in opposite scan directions. Each of the sensing range 402 and the second scanning range 302b are also scanned along adjacent workpiece segments in opposite scan directions.

To facilitate bidirectional raster-scanning, the apparatus 100 may include a Z-height sensor arranged and configured to project a sensing range 402 that is offset from the second scanning range 302b in a direction that is different from the scan direction. For example, and with reference to FIG. 4 or 6, if the scan direction is the +X or −X-direction, then the sensing range 402 may be offset from the second scanning range 302b in the +Y- or −Y-direction. In another example, and with reference to FIG. 5 or 6, if the scan direction is the +Y- or −Y-direction, then the sensing range 402 may be offset from the second scanning range 302b in the +X or −X-direction.

Prior to processing, the relative position between the workpiece and the sensing range 402 is initially set such that the sensing range 402 is aligned at or near an end of a workpiece segment to be processed. For example, as illustrated in FIG. 19, the sensing range 402 (offset from the second scanning range as discussed with respect to FIG. 5) is aligned at an end of aforementioned workpiece segment 1100a1. Likewise, as illustrated in FIG. 22, the sensing range 402 (offset from the second scanning range as discussed with respect to FIG. 4) is aligned at an end of aforementioned workpiece segment 1502.

After the sensing range 402 is aligned with a workpiece segment to be processed, the second scanning range 302b and sensing range 402 are scanned, in unison, such that the sensing range 402 is scanned in a first scanning direction (e.g., in the −Y- or −X-direction as shown by the arrow in FIG. 20 or 23, respectively) along the workpiece segment to be processed (e.g., segment 1100a1 or segment 1502, as shown in FIGS. 21 and 24, respectively). During scanning of the sensing range 402 in the first scanning direction, Z-height measurements at various sensing positions along the workpiece segment are obtained and optionally stored (and, further optionally, processed as discussed above).

After measuring a workpiece segment to be processed with the Z-height sensor 124 (e.g., when the sensing range 402 is at or near an end of the workpiece segment 1100a1 or 1502 to be processed, as shown in FIG. 20 or 23), the relative position between the workpiece and the sensing range 402 is indexed such that the sensing range 402 is aligned at or near an end of another workpiece segment to be processed (e.g., segment 1104 or segment 1504, as shown in FIGS. 21 and 24, respectively). Since, in the embodiments discussed herein, the Z-height sensor 124 is positionally fixed relative to the scan lens 112, the second scanning range 302b also becomes aligned at or near an end of a workpiece segment that was previously measured by the Z-height sensor 124 (e.g., previously-measured segment 1100a1 or segment 1502, as shown in FIGS. 21 and 24, respectively).

After indexing the sensing range 402 and second scanning range 302b as discussed above, the second scanning range 302b and sensing range 402 are scanned, in unison, in a second scanning direction opposite the first scanning direction (e.g., in the +Y- or +X-direction as shown by the arrows in FIG. 21 or 24, respectively). As a result, the sensing range 402 is scanned along another workpiece segment to be processed (e.g., along segment 1104 or segment 1504, as shown in FIGS. 21 and 24, respectively) while the second scanning range 302b is scanned along a previously-measured workpiece segment (i.e., along segment 1100a1 or segment 1502, as shown in FIGS. 21 and 24, respectively).

During scanning of the sensing range 402 in the second scanning direction, Z-height measurements at various sensing positions are obtained and optionally stored (and, further optionally, processed as discussed above). During scanning of the second scanning range 302b in the second scanning direction, laser pulses may be delivered to portions of the previously-measured workpiece segment (i.e., segment 1100a1 or segment 1502, as shown in FIGS. 21 and 24, respectively). If the worksurface Z-height (e.g., either as measured or processed) at a particular sensing position is determined to be outside the predetermined nominal Z-height process window, then Z-height compensation can be effected (e.g., as discussed above) when the processing position is the same as (or is within a specified distance of) the particular sensing position.

After a previously-measured workpiece segment (e.g., workpiece segment 1100a1 or 1502) has been processed and another (e.g., unprocessed) workpiece segment (e.g., workpiece segment 1104 or 1504) has been measured, indexing may again be performed to align the sensing range 402 at or near an end of another workpiece segment (not shown) to be measured and to align the second scanning range 302b at or near the end of a previously-measured workpiece segment (e.g., segment 1104 or segment 1504). After alignment, the sensing range 402 and the second scanning range 302b are scanned, in unison, in the first scanning direction as and the above-described processes involving measuring, processing, Z-height compensation, etc., may be repeated.

B. Facilitating Feature Formation

As mentioned above, the first positioner 106 has a first positioning bandwidth in a range from 50 kHz to 10 MHz, and thus can be used to rapidly scan the process spot within the first scanning range to form one or more features (e.g., one or more openings, vias, trenches, slots, scribe lines, recessed regions, etc.) in the workpiece 102. As also mentioned above, the maximum dimension of the feature to be formed in the workpiece 102 (e.g., as measured in the X-Y plane) may be less than or equal to the maximum dimension first scanning range (e.g., in the X- or Y-directions). In another embodiment however, the maximum dimension of the feature may be greater than the maximum dimension of the first scanning range.

Generally, the first positioner 106 can be operated to scan the process spot along the X-direction (e.g., in the +X or −X direction) and/or along the Y-direction (e.g., in the +Y or −Y direction) while the second positioner 108 scans the first scanning range along the X-direction (e.g., in the +X or −X direction), while the second positioner 108 scans the first scanning range along the Y-direction (e.g., in the +Y or −Y direction), while the third positioner 110 scans the first and/or second scanning ranges along the X-direction (e.g., in the +X or −X direction), while the third positioner 110 scans the first and/or second scanning ranges along the Y-direction (e.g., in the +Y or −Y direction), or any combination thereof. Nevertheless, it should be recognized that the first positioner 106 can be operated to scan the process spot along the X-direction (e.g., in the +X or −X direction) and/or along the Y-direction (e.g., in the +Y or −Y direction) when the second positioner 108 is not scanning the first scanning range, when the third positioner 110 is not scanning the first or second scanning ranges, or any combination thereof. It should also be recognized that, at any point in time, the direction along which (or in which) the process spot is scanned by the first positioner 106 can the same as, or different from, the direction along which (or in which) the first scanning range is scanned within the second scanning range by the second positioner 108, the direction along which (or in which) the first scanning range is scanned within the third scanning range by the third positioner 110, or any combination thereof.

In some embodiments, the workpiece 102 is provided as a PCB panel, a PCB, an FPC, an IC, an ICP, a semiconductor device, etc. Thus, the workpiece 102 may include one or more constituent structures such as an electrical conductor structure (e.g., such as a film, foil, etc., which may be formed of copper, a copper alloy, an interconnect or wiring structure comprising one or more metals such as copper, titanium, titanium nitride, tantalum, etc., or the like or any combination thereof), a dielectric structure (e.g., a build-up film, a glass-reinforced epoxy laminate, an interlayer dielectric material, a low-k dielectric material, solder resist, or the like or any combination thereof. When provided as a PCB panel or PCB, the workpiece 102 may include a dielectric structure (e.g., a glass-reinforced epoxy laminate) adhered to a first conductor (e.g., a copper or copper alloy foil, which may have an exposed surface that is either darkened—e.g., by a chemical reaction, by a laser-darkening process, etc.—or that is not darkened) at a first side thereof and, optionally, to a second conductor (e.g., a pad, a trace, foil, etc., formed of copper or a copper alloy) at a second side thereof that is opposite the first side. One or more features (e.g., one or more openings, slots, grooves, blind vias, through vias, slot vias, etc.) may be formed in or on one or more components of the workpiece 102 by removing material therefrom (e.g., as during a cutting process, a drilling process, an engraving process, a routing process, or the like or any combination thereof) due to ablation of the material. As used herein, the term "feature region" refers to a region of a workpiece 102 that is to be processed to form a feature.

Generally, and unless explicitly stated otherwise, the term "ablation" can refer to "direct ablation," "indirect ablation" or any combination thereof. Direct ablation of a material in the workpiece 102 occurs when the dominant cause of ablation is decomposition of the material due to absorption (e.g., linear absorption, nonlinear absorption, or any combination thereof) of energy within the beam of delivered laser energy by the material. Indirect ablation (also known as "lift-off") of a material in the workpiece 102 occurs when the dominant cause of ablation is melting and vaporization due to heat generated in, and transported from, an adjacent material which absorbs the energy within the beam of delivered laser energy.

In one embodiment, the feature may be formed to extend, completely or partially, through one or more components of the workpiece 102 (e.g., one or more electrical conductor structures, one or more dielectric structures, or the like or any combination thereof). In one embodiment, the electrical conductor structure or dielectric structure can have a thickness in a range from 5 μm to 500 μm. It will be appreciated, however, that an electrical conductor structure or a dielectric structure can have a thickness smaller than 5 μm or larger than 500 μm. Thus, a thickness of an electrical conductor structure or dielectric structure can be greater than or equal to 1 μm, 3 μm, 5 μm, 10 μm, 15 μm, 18 μm, 20 μm, 25 μm, 30 μm, 35 μm, 40 μm, 50 μm, 70 μm, 80 μm, 100 μm, 110 μm, 120 μm, 250 μm, 300 μm, 350 μm, 400 μm, 450 μm, 550 μm, 600 μm, etc., or between any of these values. Likewise, the thickness can be less than 550 μm, 450 μm, 400 μm, 350 μm, 300 μm, 250 μm, 120 μm, 110 μm, 100 μm, 80 μm, 70 μm, 50 μm, 40 μm, 35 μm, 25 μm, 20 μm, 18 μm, 15 μm, 10 μm, 5 μm, 3 μm, 1 μm, 0.5 μm, 0.1 μm, etc., or between any of these values.

Generally, the top portion of the feature may have a diameter (i.e., a "top diameter") in a range from 5 μm to 300 μm. It will be appreciated, however, that the top diameter can be smaller than 5 μm or larger than 300 μm. Thus, the top diameter may be greater than or equal to 5 μm, 10 μm, 20 μm, 30 μm, 40 μm, 50 μm, 80 μm, 100 μm, 120 μm, 150 μm, 200 μm, 250 μm, 150 μm, 200 μm, 250 μm, 300 μm, 320 μm, etc., or between any of these values. Likewise, the top diameter can be less than 350 μm, 300 μm, 250 μm, 200 μm, 150 μm, 120 μm, 100 μm, 80 μm, 50 μm, 40 μm, 30 μm, 20 μm, 10 μm, 5 μm, etc., or between any of these values.

Generally, the bottom portion of the feature may have a diameter (i.e., a "bottom diameter") that is less than or equal to the top diameter. The difference between the top and bottom diameters is herein referred to as the "taper" of the feature, or simply the "feature taper." Feature taper is indicative of the slope of a sidewall of the feature within the workpiece 102. Often it is desirable to form features having a relatively small taper (e.g., to facilitate formation of a large number of features within a relatively small region of the workpiece 102). If the feature is a via, then a relatively small taper can facilitate reliable plating or filling thereof. One factor affecting taper is the depth of the feature that is formed; features with relatively small depths tend to have either zero taper, or smaller tapers than features with relatively large depths. In the present example, the taper of a feature formed in the workpiece 102 can be less than or equal to 20 μm. For example, the taper can be less than or equal to 18 μm, 15 μm, 12 μm, 10 μm, 9 μm, 8 μm, 7.5 μm, 7 μm, 6 μm, 5 μm, 4 μm, 3 μm, 2 μm, 1 μm, 0.5 μm, etc., or between any of these values.

Generally, the depth of the feature is measured along an axis (also referred to herein as a "feature axis") that extends through the top and bottom portions of the feature. In one embodiment, the depth of the feature corresponds to the thickness of the one or more structures in which it is formed (in which case, the feature extends completely through one or more structures). In another embodiment, the depth of the feature does not correspond to the thickness of the structure in which it is formed (in which case, the feature extends only partially through a structure). Thus, the feature may have a depth in a range from 5 μm to 250 μm (or smaller than 5 μm or larger than 250 μm). For example, the feature may have a depth greater than or equal to 1 μm, 3 μm, 5 μm, 10 μm, 15 μm, 18 μm, 20 μm, 25 μm, 30 μm, 35 μm, 40 μm, 50 μm, 70 μm, 80 μm, 100 μm, 110 μm, 120 μm, 250 μm, 300 μm, etc., or between any of these values. Likewise, the depth can be less than 300 μm, 250 μm, 120 μm, 110 μm, 100 μm, 80 μm, 70 μm, 50 μm, 40 μm, 35 μm, 25 μm, 20 μm, 18 μm, 15 μm, 10 μm, 5 μm, 3 μm, 1 μm, 0.5 μm, 0.1 μm, etc., or between any of these values.

Generally, feature formation may be performed by scanning a process spot along a process trajectory that defines one or more scan patterns (e.g., by controlling the first positioner 106 to scan a process spot according to one or more corresponding scan patterns within the first scanning range). Depending upon one or more factors such as the desired depth of the feature to be formed, the material(s) to be removed during feature formation, one or more parameters of the beam of laser pulses to be delivered during feature formation, or the like or any combination thereof, the feature may be formed by scanning a process spot along a scan pattern (also referred to as a "feature-forming" scan pattern) only once, or multiple times. When a process spot is scanned along a scan pattern multiple times, scanned along a scan pattern multiple times, the process spot can be repeatedly scanned along the same scan pattern (i.e., the same scan pattern can be repeatedly used). In another embodiment, at least two different scan patterns can be used during feature formation. In the event that the same scan pattern is repeatedly used, a subsequently-used scan pattern can have the same orientation (e.g., measured relative to the feature axis) as, or a different orientation from, the orientation of a previously-used scan pattern.

Although particular embodiments concerning certain scanning techniques are discussed in this section in connection with apparatus 100, it will be appreciated that any of these embodiments or any combination thereof, may be implemented in connection with the multi-head apparatus 700. It will be further appreciated that the embodiments discussed in this section may be implemented with any suitably-equipped single- or multi-head laser-processing apparatus other than those discussed herein, or any other suitable apparatus (e.g., mechanical drill, water-cutting or drilling apparatus, electron-beam cutting machines, abrasive blasting machines, etc.) beneficially or suitably configured to process the workpiece 102.

i. Example Embodiments of Scan Patterns

Figure 28:
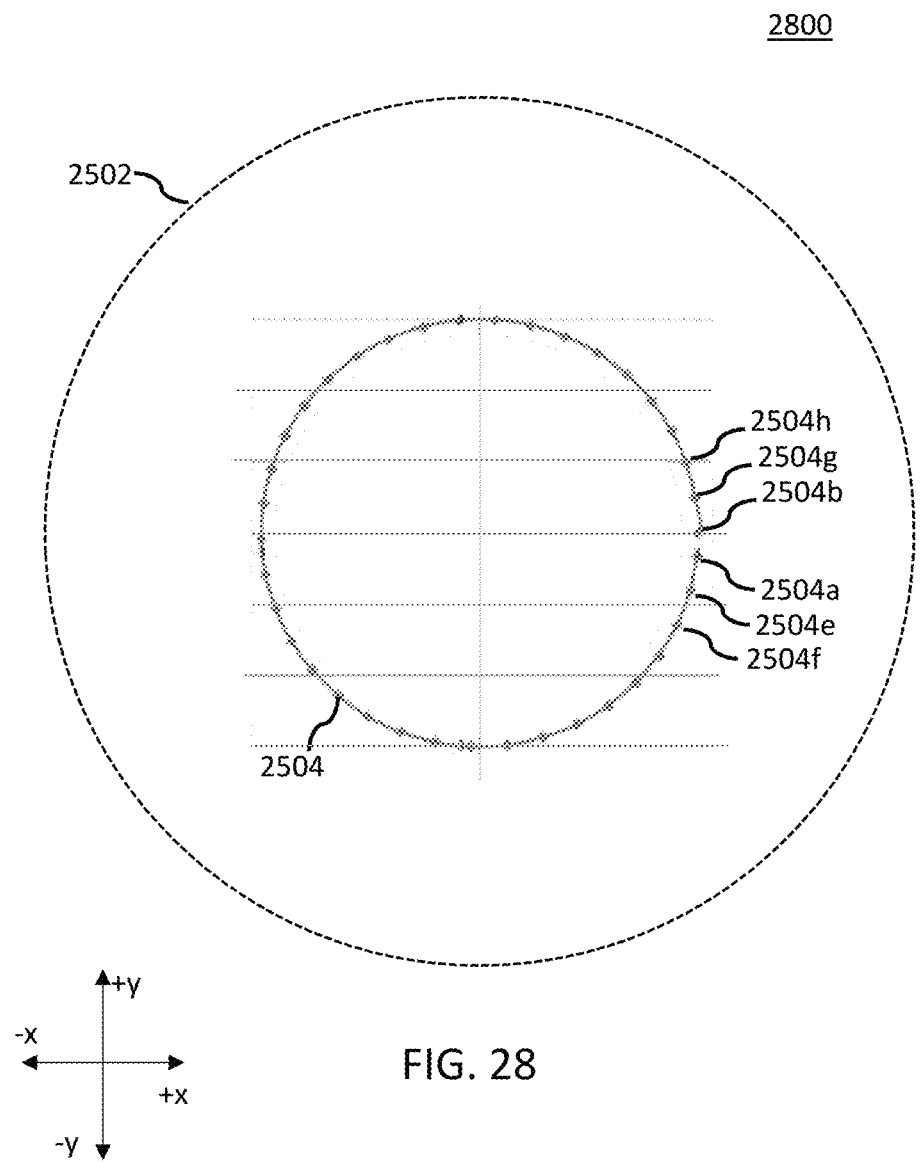

Examples of scan patterns for forming features such as vias or other holes, openings, recesses, trenches, etc., include scan patterns 2500, 2600, 2700 and 2800, shown in FIGS. 25, 26, 27 and 28, respectively, or the like or any combination thereof. Generally, the scan pattern may resemble or otherwise delineate a raster pattern (e.g., as illustrated in FIG. 25), a star polygon or a star-shaped polygon (e.g., as illustrated in FIG. 26), a spiral or a set of arcs or circles (concentrically arranged or otherwise, e.g., as illustrated in FIG. 27), a circle (e.g., as illustrated in FIG. 28), a set of circles, or one or more shapes (e.g., ellipses, triangles, squares, rectangles, or other regular or irregular shapes, etc.), or the like or any combination thereof. In one embodiment, one or more scan patterns (e.g., one or more scan patterns 2500, 2600, 2700 or 2800, or any combination thereof) may be used to remove material (e.g., by direct ablation, indirect ablation, or any combination thereof) from one or more electrical conductor structures, one or more dielectric structures, or the like or any combination thereof, during formation of a feature such as a circular opening, a via, etc.

In FIGS. 25 to 28, the dashed line 2502 represents the desired boundary, at the worksurface 102a, for a feature (e.g., a circular opening or via, in the present example) to be formed an electrical conductor structure or dielectric structure of the workpiece 102. For purposes of discussion with the present example, once formed in the workpiece 102, the feature can be characterized as including a "top portion" formed at the worksurface 102a and extending along an axis into the workpiece 102 (e.g., to either terminate within the workpiece 102, or extend completely through the workpiece 102). The portion of the feature thus terminating within the workpiece 102 or present at the other side of the workpiece 102 may herein be referred to as a "bottom portion" of the feature.

Although FIGS. 25 to 28 illustrate the boundary 2502 of the feature to be formed (also referred to herein as a "feature boundary") as being circular, it will be appreciated that the boundary may have any suitable or desired shape (e.g., elliptical, square, rectangular, triangular, hexagonal, irregular, or the like or any combination thereof. In the embodiments discussed herein, the shape of the boundary 2502 at the top and bottom portions of the feature is the same or similar (e.g., circular). In other embodiments (e.g., in which removal of a material occurs by direct ablation, and multiple scan patterns are scanned during processing of the material), the boundary 2502 at the top portion of the feature may be different from the shape of the boundary 2502 at the bottom portion of the feature. For example, the top portion of the feature may have a boundary 2502 that is circular while the top portion of the feature may have a boundary 2502 that is elliptical, rectangular, etc.).

The centers of locations for process spots within a scan pattern (each generically referred to as a "spot location" or, collectively, "spot locations") are indicated by diamonds 2504. Although scan patterns 2500, 2600, 2700 and 2800 are illustrated as having the particular arrangement of spot locations 2504 shown, it will be appreciated that any scan pattern may include more or fewer spot locations, in any suitable or desired arrangement. The arrangement of spot locations 2504 (i.e., which can be characterized by the number of spot locations, the positions of the spot locations, the pitch between adjacent spot locations, or the like or any combination thereof), within a scan pattern or disposed along a common scan line, can vary depending upon factors such as the thermal conductivity, thermal diffusivity, specific heat capacity, optical absorptivity, etc., of material at or near the spot location, the viscosity of material at or near the spot location during the formation of the feature, the optical absorptivity (relative to the beam of delivered laser energy) of material at or near the spot location, the presence or absence of any electrical conductor or dielectric structures near the spot location, the geometrical configuration of any electrical conductor or dielectric structures near the spot location, the spot size, type and shape of spatial intensity profile, pulse duration, fluence, pulse repetition rate, scan rate, the size and shape of the feature to be formed, or the like or any combination thereof. Generally, the arrangement of spot locations commonly disposed along one scan line of a particular scan pattern can be the same as, or different from, the arrangement of spot locations commonly disposed along another scan line of the particular scan pattern.

Among the spot locations 2504, spot location 2504a represents the first spot location in the scan pattern to be irradiated with a laser pulse and spot location 2504b represents the last spot in the scan pattern to be irradiated with a laser pulse. Accordingly, the solid line connecting the spot locations 2504 indicates the sequence in which the spot locations 2504 are addressed (e.g., by one or more delivered laser pulses). It should be recognized, however, that spot locations 2504 within a scan pattern may be addressed in any other desired sequence (thus changing the configuration of the solid line), and may even be addressed randomly. At any time during processing, a spot location 2540 in a scan pattern can be characterized as a previously-addressed spot location (i.e., a spot location to which laser pulses were delivered), a currently-addressed spot location (i.e., a spot location to which laser pulses are being delivered) and a to-be-addressed spot location (i.e., a spot location to which laser pulses will be delivered).

In one embodiment, the arrangement of spot locations 2504 and the sequence with which spot locations 2504 are addressed is, optionally, selected to reduce or avoid undesirable accumulation of heat (e.g., which can result in undesirable cracking, melting, vaporization, ablation, crystallization, annealing, carbonization, oxidation, etc.) within the workpiece 102 during feature formation. In another embodiment (and as described in greater detail below), the arrangement of spot locations 2504 and the sequence with which spot locations 2504 are addressed is, optionally, selected to affect (e.g., reduce) the taper of a feature that is ultimately formed. In another embodiment, the arrangement of spot locations 2504 and the sequence with which spot locations 2504 are addressed is, optionally, selected to promote heating of the workpiece 102 in a manner that facilitates efficient formation of one or more features on or within the workpiece 102.

Depending upon one or more factors such as pulse repetition rate, the first positioning bandwidth, the scan pattern to be scanned, etc., at least two temporally-sequential laser pulses (e.g., 2 laser pulses, 3, laser pulses, 5 laser pulses, 8 laser pulses, 10 laser pulses, 20 laser pulses, etc.) may be delivered to the same spot location 2504, or to different spot locations 2504. In this case, the pulse repetition rate can be generally characterized as being greater than the first positioning bandwidth. In another embodiment, however, the pulse repetition rate can be less than or equal to the first positioning bandwidth. The period of time during which temporally-sequential laser pulses are delivered to the same spot location 2504 (or otherwise delivered within a local vicinity of a common spot location 2504) is herein referred to as a "dwell time" associated with that spot location 2504. For purposes of discussion, a laser pulse is considered to be delivered to a local vicinity of a spot location 2504 if it is delivered to within 1 µm of the spot location 2504. In one embodiment, a laser pulse is considered to be delivered to a local vicinity of a spot location 2504 if it is delivered to within 10.0 µm, 8.0 µm, 7.0 µm, 6.0 µm, 5.0 µm, 4.0 µm, 3.5 µm, 3.0 µm, 2.5 µm, 2.0 µm, 1.5 µm, 1.0 µm, 0.9 µm, 0.8 µm, 0.75 µm, 0.7 µm, 0.65 µm, 0.6 µm, 0.5 µm, 0.4 µm, 0.3 µm, 0.25 µm, 0.2 µm, 0.15 µm, 0.1 µm, 0.08 µm, 0.05 µm, 0.01 µm, or less than 0.01 µm, of the spot location 2504.

In the illustrated embodiments, a scan pattern can be characterized as including one or more series of sequentially-addressed spot locations 2504. Each such series of spot locations 2504 can generally be characterized as being disposed along a common scan line. Generally, sequentially-addressed spot locations disposed on a common scan line are closer to one another than sequentially-addressed spot locations disposed on different scan lines. A scan line may be straight (e.g., as illustrated in FIG. 25 or 26), curved (e.g., as illustrated in FIG. 27 or 28), or the like or any combination thereof. For example, the scan pattern 2500 shown in FIG. 25 includes a plurality of straight, parallel scan lines whereas the scan pattern 2600 shown in FIG. 26 includes a plurality of straight scan lines that are oblique relative to one another. The scan lines in scan pattern 2600 extend along axes which, in turn, extend radially (or generally radially) from a center of the feature boundary 2502 (or from a central region encompassing the center of the feature boundary 2502) toward the feature boundary 2502. The scan pattern 2700 shown in FIG. 27 includes a plurality of concentrically-arranged arcuate scan lines (the radially-outermost one of which extends along the desired feature boundary 2502). The scan pattern 2800 shown in FIG. 28 includes a single arcuate scan line (e.g., extending along the desired feature boundary 2502).

At least one laser pulse is delivered to each spot location 2504. In one embodiment, multiple laser pulses are delivered to one or more spot locations 2504 (or otherwise delivered within a local vicinity of a common spot location 2504). Generally, the same number of laser pulses are delivered to at least two spot locations 2504 of a scan pattern, or different numbers of laser pulses can be delivered to at least two spot locations 2504 of a scan pattern.

Generally, the pitch between adjacent spot locations 2504 is considered to be greater than the distance encompassed within the local vicinity of a spot location 2504. In one embodiment, a pitch between adjacent spot locations within a scan pattern can be in a range from 0.1 µm to 50 µm. Likewise, a pitch between adjacent spot locations 2504 disposed along a common scan line may be in a range from 0.1 µm to 50 µm. Thus, a pitch between adjacent spot locations 2504 (either within the scan pattern, generally, or disposed along a common scan line) may be greater than or equal to 0.1 µm, 0.2 µm, 0.3 µm, 0.4 µm, 0.5 µm, 1 µm, 1.5 µm, 2 µm, 3 µm, 3.5 µm, 4.5 µm, 5 µm, 10 µm, 15 µm, 20 µm, 30 µm, 40 µm, 55 µm, 60 µm, 80 µm, etc., or between any of these values, or less than 50 µm, 40 µm, 30 µm, 20 µm, 15 µm, 10 µm, 5 µm, 4.5 µm, 3.5 µm, 3 µm, 2 µm, 1.5 µm, 1 µm, 0.5 µm, 0.4 µm, 0.3 µm, 0.2 µm, 0.1 µm, 0.08 µm, 0.05 µm, 0.01 µm, etc., or between any of these values. For purposes of discussion herein, the pitch between spot locations is measured as the distance between the centers of two adjacent spot locations. Two spot locations are considered to be adjacent to one another if no intervening spot location exists therebetween.

Among pairs of adjacent spot locations 2504 (either within the scan pattern, generally, or disposed along a common scan line), the pitch therebetween can be constant, variable, or any combination thereof. In one embodiment, the pitch between adjacent spot locations disposed along a common scan line can increase or decrease in a direction extending from a spot location where one laser pulse is delivered and another spot location where a laser pulse is subsequently delivered. Thus, the pitch between adjacent spot locations disposed along a common scan line can be constant, can increase, or can decrease, or any combination thereof, while moving along the scan line. Generally, the spot size of the delivered laser pulses, and the pitch between pairs of adjacent spot locations 2504, can be selected or otherwise set such that spot areas irradiated by laser pulses delivered to the pair of adjacent spot locations 2504 overlap one another, or do not overlap one another.

In one embodiment, the arrangement of scan lines (i.e., which can be characterized by the number of scan lines, the orientation of a scan line relative to another scan line, the orientation of a scan line relative to the boundary 2502, the length of a scan line, the pitch between adjacent scan lines, etc.) within the scan pattern is not limited to the arrangements shown in FIGS. 25 to 28, and can vary depending upon one or more factors such as those described above with respect to the arrangement of spot locations 2504. Thus, a scan pattern can have an odd number of scan lines or an even number of scan lines. In one embodiment, the number of scan lines in a scan pattern can be in a range from 1 to 64. For example, the number of scan lines in a scan pattern be greater than or equal to 2, 4, 8, 16, 32, 50, 60, etc., or less than 64, 32, 16, 8, 4, 2. It should also be recognized that scan pattern can have more than 64 scan lines. Within a scan pattern, at least some of the scan lines can be arranged symmetrically (or at least substantially symmetrically) or be arranged asymmetrically. Examples of symmetrical arrangements include rotationally symmetrical arrangements (i.e., n-fold rotational symmetry, where n is any integer greater than 1, such as 2, 3, 4, 5, 6, 7, 8, 9, 10, 12, 15, 20, 50, etc.) and reflective symmetrical arrangements.

ii. Considerations Regarding Anisotropic Material Removal a. Theory

Figure 29:
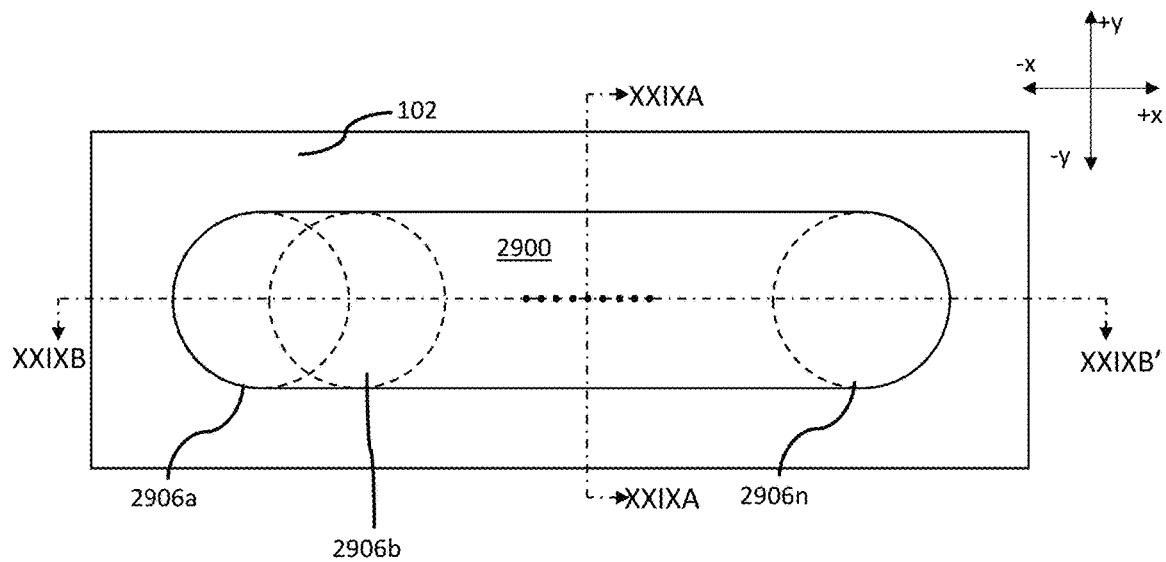
FIGS. 29, 29A and 29B schematically illustrate a scanning technique facilitating anisotropic material removal, according to one embodiment. Specifically.
Figure 29A:
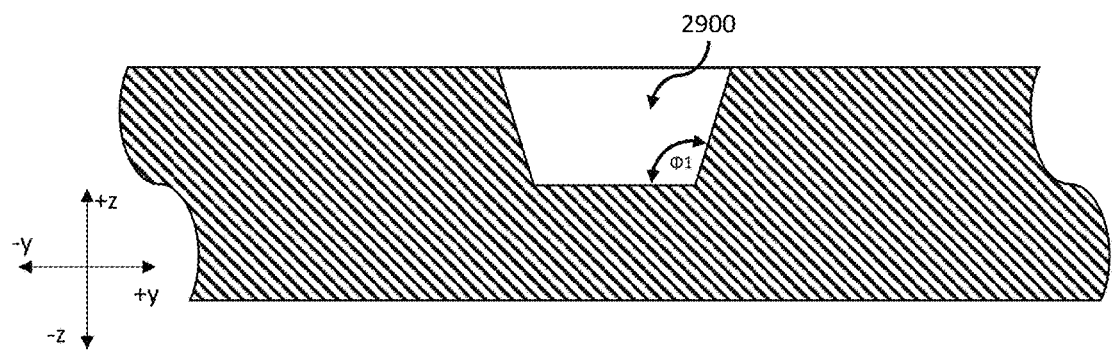
Figure 29B:
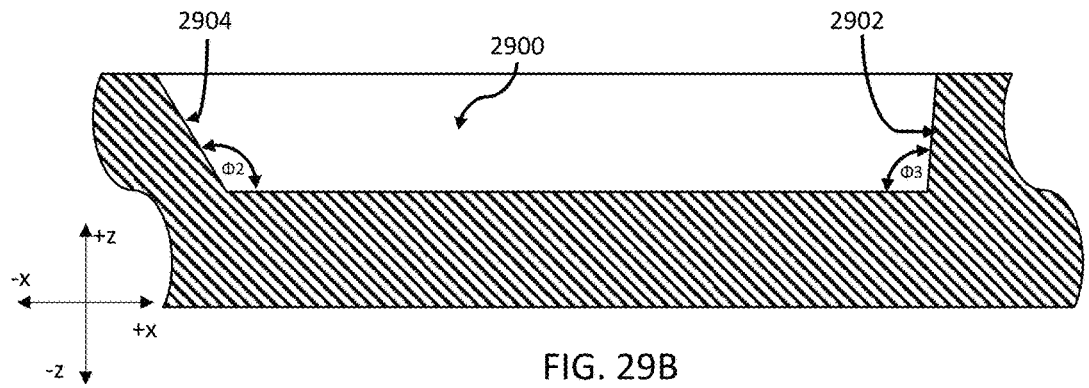

Through experiments and multi-physics modeling, the inventors directed laser pulses along a beam axis that was scanned (with minimal or no change in angle of incidence of the beam axis at the worksurface 102a) along a scan line (e.g., extending in the +X-direction, as shown in FIG. 29), and delivered such laser pulses to directly ablate a workpiece 102 (e.g., a dielectric structure such as ABF, solder resist, glass-reinforced epoxy laminate, etc.) to form a plurality of trenches therein, such as trench 2900 which is schematically shown in FIGS. 29, 29A and 29B. In FIG. 29, the scan line along which the beam of laser pulses is scanned includes a plurality of spot locations (i.e., "n" spot locations, where n is 2, 3, 4, 5, etc.), and the spot area irradiated by one or more laser pulses delivered to the first spot location is denoted at 2906a, the spot area irradiated by one or more laser pulses delivered to the second spot location is denoted at 2906b, etc., and the spot area irradiated by one or more laser pulses delivered to the final spot location (also referred to herein as a "terminal spot location") is denoted at 2906n. During experiments, trenches having a length in a range from a few tens of µm to a few millimeters were formed.

FIGS. 29A and 29B are cross-sectional views of the trench shown in FIG. 29, taken along lines XXIXA-XXIXA and XXIXB-XXIXB', respectively, shown in FIG. 29. As used herein the scan line along which these spot locations are disposed is referred to as an "anisotropic material removal scan line." When formed as discussed above, the terminal end 2902 of the trench 2900 was discovered to have less taper than the beginning end 2904 of the trench 2900 (see FIG. 29B) when the laser pulses were delivered at a sufficiently high pulse repetition rate, and were characterized by other parameters such as spot size, average power, etc., sufficient to directly ablate the workpiece 102). Thus the trench-formation process described above appears to exhibit anisotropic material removal properties. While not necessarily wishing to be bound by any particular theory, simulations appear to indicate that this anisotropic material removal phenomenon is (at least partly) attributable to at least one of two factors.

One of the aforementioned factors relates to the temperature of a region of the workpiece 102 before it is irradiated with laser pulses. Initially, the workpiece 102 is relatively cool when a first spot location along the scan line is irradiated with laser pulses and, as a result, a material removal mechanism at the first spot location is relatively inefficient. Consequently, after a number of laser pulses have been delivered, the taper of the resultant sidewall formed in the workpiece 102 at the first spot location is relatively large. After a few laser pulses have been delivered, however, heat begins to accumulate within the workpiece 102 around the irradiated spot location as a result of thermal diffusion within the workpiece 102. Thus by the time the final spot location on the scan line is irradiated with one or more laser pulses, a significant amount of heat will have been accumulated at the final spot location. This thermal energy is believed to increase the efficiency with which material is removed from the workpiece 102. As a result, after a number of laser pulses have been delivered along the scan line, the taper of the resultant sidewall formed in the workpiece 102 at the final spot location on the scan line is relatively small.

The other of the factors relates to the temperature and pressure associated with the vapor plume generated at a process spot when material is directly ablated from the workpiece 102. As the beam of laser pulses is scanned along the scan line, the high temperature and pressure within the vapor plume can act to vaporize, melt or otherwise erode material in the workpiece around the irradiated process spot. It is suspected that this erosion is more vigorous if material around the irradiated process spot has already accumulated heat (e.g., generated by one or more previously-delivered laser pulses). The high pressure created by the resultant vapor plume acts to induce a hydrodynamic motion to the eroded material, transporting the eroded material away from the area within and around the irradiated process spot, thus creating a sidewall within the workpiece 102 that has a relatively small taper. Furthermore, when laser pulses are delivered to one or more other subsequently-irradiated spot locations along the scan line, eroded material located within the trench can be advected or otherwise transported towards a previously-irradiated spot location, possibly increasing the taper of a sidewall formed in the workpiece 102 at the previously-irradiated spot location. In FIG. 29B, sidewall 2902 having a relatively small taper can be characterized as being inclined (relative to the bottom of trench 2900) at an angle $\Phi 3$ that is less than angle $\Phi 2$, which is the angle with which the sidewall 2904 (having a relatively large taper) can be characterized as being inclined relative to the bottom of trench 2900. The taper of the intermediate sidewall of the trench 2900 (e.g., shown in cross-section in FIG. 29A), may vary from the beginning end to the terminal end of the trench 2900, as the location where the taper measurement moves from the beginning end to the terminal end. Thus, angle $\Phi 1$ may be equal to or less than angle $\Phi 2$. In some embodiments, angle $\Phi 1$ may be greater than angle $\Phi 2$.

b. Sidewall Taper

The anisotropic material removal properties associated with the trench-formation process discussed above, can be adapted to selected to affect (e.g., reduce) the sidewall taper of a feature (e.g., an opening or via, as described above) or a trench, scribe line, recessed region, etc. For example, feature formation may be performed by scanning a process spot along one or more scan patterns as described above. In the present embodiment, however, the scan pattern includes one or more anisotropic material removal scan lines. As a result, for a given spot size, and depending upon one or more factors such as the depth of the feature to be formed, the structure(s) in which the feature is formed, etc., the sidewall taper of a feature (e.g., a via, trench, scribe line, recessed region, etc.) that is formed by scanning a process spot according to a scan pattern having one or more anisotropic material removal scan lines (e.g., in the manner described with respect to scan pattern 2600) can be reduced relative to the sidewall taper of a feature formed simply by scanning a beam of laser pulses along a scan line that merely extends along a desired feature boundary (e.g., in the manner described with respect to scan patterns 2700 and 2800).

Conversely, and depending upon one or more factors such as the depth of the feature to be formed, the structure(s) in which the feature is formed, etc., the same sidewall taper obtained by scanning a beam of laser pulses having a relatively small spot size along a scan line extending along a desired feature boundary (e.g., in the manner described with respect to scan patterns 2700 and 2800) can be obtained by scanning a beam of laser pulses having a relatively large spot size according to a scan pattern having one or more anisotropic material removal scan lines. When possible, it can be desirable to form features using relatively larger spot sizes when: a) relatively large spot sizes are easier to form than relatively small spot sizes; b) relatively large spots are more tolerant to variations or deviations of worksurface Z-height outside nominal Z-height process windows (e.g., due to a relatively large Rayleigh range); and c) the deflection range of positioners such as AOD systems can be increased with relatively larger spot sizes (since AOD deflection, for a given update rate and positioning bandwidth, is proportional to the spot size of laser pulses delivered to the workpiece 102).

As used herein, an anisotropic material removal scan line is a scan line (i.e., extending in a scanning plane which, in the embodiment illustrated in FIG. 29, is the X-Y plane) having an axis that intersects the desired feature boundary at an angle that, when measured within the scanning plane, is in a range from 60° to 120°. It should be recognized that the angle at which the axis of the anisotropic material removal scan line intersects the desired feature boundary can depend upon factors such as spot size, type and shape of spatial intensity profile, the thermal conductivity, thermal diffusivity, specific heat capacity, etc., of the workpiece material at or near the spot locations to be irradiated with delivered laser pulses, the viscosity of the workpiece material at or near the spot locations to be irradiated with delivered laser pulses, pulse duration, fluence, pulse repetition rate, rate with which the process spot is moved along a process trajectory defining the scan pattern, or the like or any combination thereof. Thus, the angle at which the axis of the anisotropic material removal scan line can intersect the desired feature boundary can be less than 60° or greater than 120°. For example, the axis of a scan line can intersect the desired boundary at an angle that is greater than or equal to 50°, 60°, 65°, 70°, 75°, 80°, 85°, 87°, 88.5°, 90°, 91.5°, 93°, 95°, 100°, 105°, 110°, 115°, 120°, etc., or between any of these values. Likewise, the axis of the scan line can intersect the desired boundary at an angle that is less than 130° 120°, 115°, 110°, 105°, 100°, 95°, 93°, 91.5°, 90°, 88.5°, 87°, 85°, 80°, 75°, 70°, 65°, 60°, etc., or between any of these values.

In one embodiment, a pitch between adjacent terminal spot locations of a pair of scan lines in a scan pattern is in a range from 0.5 μm to 50 μm, or may be less than 0.5 μm or greater than 50 μm. Thus, a pitch between adjacent spot locations 2504 (either within the scan pattern, generally, or disposed along a common scan line) may be greater than or equal to 0.5 μm, 1 μm, 1.5 μm, 2 μm, 3 μm, 3.5 μm, 4.5 μm, 5 μm, 10 μm, 15 μm, 20 μm, 30 μm, 40 μm, 55 μm, etc., or between any of these values, or less than 60 μm, 55 μm, 40 μm, 30 μm, 20 μm, 15 μm, 10 μm, 5 μm, 4.5 μm, 3.5 μm, 3 μm, 2 μm, 1.5 μm, 1 μm, 0.5 μm, 0.1 μm, etc., or between any of these values. Two scan lines are considered to be adjacent to one another if no intervening scan line exists therebetween.

Scan pattern 2600, shown in FIG. 26, is an example of a scan pattern containing a plurality of anisotropic material removal scan lines. In the scan pattern 2600, the scan line in region 2602 is an example of an anisotropic material removal scan line, and the spot location 2504c is a terminal spot location of the anisotropic material removal scan line. Although FIG. 26 illustrates the scan pattern 2600 as including 27 anisotropic material removal scan lines, it should be recognized that scan patterns such as scan pattern 2600 can have more or fewer than 27 anisotropic material removal scan lines (e.g., depending upon one or more factors such as the shape of the desired boundary, the relative size difference between the desired boundary and the spot size, the type and shape of spatial intensity profile of delivered laser pulses, or the like or any combination thereof).

Although FIG. 26 illustrates wherein each anisotropic material removal scan line includes the same arrangement of spot locations, it should be recognized that the arrangement of spot locations for one or more (or all) of the anisotropic material removal scan lines may be different from the illustrated embodiment. Further the arrangement of spot locations for one or more anisotropic material removal scan lines in a scan pattern may be the same as, or different from, the arrangement of spot locations for at least one other anisotropic material removal scan line in the scan pattern. Thus, although FIG. 26 illustrates wherein each anisotropic material removal scan line includes 4 spot locations, it should be recognized that any anisotropic material removal scan line have more or fewer than 4 spot locations. For example, the number of spot locations that an anisotropic material removal scan line (such as the anisotropic material removal scan line shown in region 2602) can have can be 2, 3, 5, 6, 7, 8, 9, 10, or more.

iii. Considerations Regarding Localized Heat Accumulation

Depending upon one or more factors such as the wavelength, pulse duration, pulse repetition rate, average power, etc., of the laser pulses delivered to the workpiece 102, the linear absorption of a material at a spot location (e.g., relative to the wavelength of a laser pulse delivered to the spot location), the thermal conductivity, thermal diffusivity, specific heat capacity, etc., of the material at or near a spot location, the scan pattern along which a process spot is to be scanned, or the like or any combination thereof, the heat generated as a result of delivering laser pulses to one or more spot locations can diffuse from irradiated spot location and accumulate within regions of the workpiece 102 outside the process spot, thereby increasing the temperature of the workpiece 102 at regions outside the process spot.

If the accumulated heat results in an increased temperature at a region of workpiece 102 located at or near a to-be-addressed process spot, and if the increased temperature is above a threshold temperature (i.e., a "processing threshold temperature"), then the efficiency with which the workpiece 102 can be subsequently processed (e.g., by direct ablation, indirect ablation, or any combination thereof) can be positively affected. Generally, the processing threshold temperature associated with a material to be processed is greater than or equal to the melting point or glass-transition temperature of the material to be processed. In another embodiment, however, the processing threshold temperature may be less than (e.g., 98%, 95%, 93%, 90%, 89%, 87%, 85%, 80%, 75%, 70%, 65%, or 50% of) the melting point or glass-transition temperature of the material to be processed.

In some cases, the accumulated heat can increase the temperature within regions of the workpiece 102 that are not intended to be processed (each also referred to herein as a "non-feature region" of the workpiece 102). If the temperature is high enough, a non-feature region of the workpiece 102 can become undesirably damaged (e.g., to become undesirably cracked, melted, delaminated, annealed, etc.). Thus it may be preferable to process the workpiece 102 in such a way that avoids undesirable accumulation of heat within non-feature regions of the workpiece 102. As used herein, the temperature at which a region of the workpiece 102 will become undesirably damaged is referred to as a "damage threshold temperature." It should be recognized that the damage threshold temperature of any non-feature region of the workpiece 102 may depend upon one or more factors such as the thickness, thermal conductivity, thermal diffusivity, specific heat capacity, etc., optical absorptivity (relative to the beam of delivered laser energy), etc., of any material at or near the spot location or in the non-feature region, as well as the thermal conductivity, thermal diffusivity, specific heat capacity, size and shape of structures located within the vicinity of the non-feature region, or the like or any combination thereof.

a. Leveraging Localized Heat Accumulation: Indirect Ablation

While considerations concerning the accumulation of heat can be generally relevant depending upon characteristics of the workpiece 102, the manner in which the workpiece 102 is processed, etc., such considerations can be particularly relevant when workpiece 102 is processed by indirect ablation. For example, when the workpiece 102 is provided as a PCB including a dielectric structure (e.g., a glass-reinforced epoxy laminate) adhered to a first conductor (e.g., a copper or copper alloy foil) at a first side thereof and, optionally, to a second conductor (e.g., a pad, a trace, foil, etc., formed of copper or a copper alloy) at a second side thereof that is opposite the first side, the workpiece 102 can be processed (e.g., by directing a beam of laser pulses along the beam axis so as to deliver the laser pulses to the workpiece 102) to indirectly ablate the first conductor, thereby forming an opening that exposes the dielectric structure.

In this example embodiment, the first conductor can have a thickness in a range from about 5 μm (or thereabout) to about 50 μm (or thereabout). For example, the first conductor can have a thickness equal (or about equal) to 7 μm, 8

μm, 9 μm, 10 μm, 12 μm, 15 μm, 17 μm, 18 μm, 20 μm, 25 μm, 30 μm, 35 μm, 40 μm, etc., or between any of these values. The dielectric structure can have a thickness in a range from 30 μm (or thereabout) to 200 μm (or thereabout). For example, the dielectric structure can have a thickness equal (or about equal) to 50 μm, 60 μm, 70 μm, 80 μm, 90 μm, 100 μm, 110 μm, 120 μm, 140 μm, 180 μm, etc., or between any of these values. The opening formed by indirect ablation may have a top or bottom diameter in a range from 30 μm (or thereabout) to 350 μm (or thereabout). For example, the top or bottom diameter of the opening may have a diameter equal (or about equal) to 30 μm, 40 μm, 50 μm, 60 μm, 70 μm, 80 μm, 90 μm, 100 μm, 110 μm, 120 μm, 150 μm, 200 μm, etc., or between any of these values.

According to one embodiment, the beam of laser pulses delivered to the worksurface 102a (i.e., the first conductor) has a wavelength in the visible green range of the electromagnetic spectrum, a Gaussian-type or non-Gaussian-type spatial intensity profile, a pulse duration of greater than or equal to 1 ns (e.g., greater than or equal to 1 ns, 1.5 ns, 2 ns, 2.5 ns, 5 ns, 7 ns, 10 ns, etc., or between any of these values), a spot size smaller than the top or bottom diameters of the opening to be formed (e.g., a spot size less than or equal to 30 μm, 25 μm, 20 μm, 15 μm, 12 μm, 10 μm, 9 μm, 8 μm, 5 μm, etc., or between any of these values), an average power greater than or equal to 100 W (e.g., greater than or equal to 120 W, 150 W, 180 W, 200 W, 225 W, 250 W, 275 W, 300 W, 350 W, 500 W, etc., or between any of these values), and is delivered to the worksurface 102a at a pulse repetition rate greater than or equal to 100 MHz (e.g., greater than or equal to 125 MHz, 150 MHz, 175 MHz, 200 MHz, 250 MHz, 300 MHz, 350 MHz, 500 MHz, etc., or between any of these values). Laser pulses having the above-described characteristics can typically be generated by, or derived from, laser sources such as CW laser sources, QCW laser sources, etc. Materials typically used to form the first conductor (i.e. copper or a copper alloy) tend to absorb green light fairly efficiently. Accordingly, in the example given above, darkening of the exposed surface of the first conductor (i.e., the surface of the first conductor facing away from the dielectric structure)—a process typically used when indirectly ablating the first conductor using laser pulses having a wavelength in the LWIR range of the electromagnetic spectrum—may be omitted if desired.

The beam axis can be moved (e.g., upon operation of the first positioner 106) so as to scan the process spot along a scan pattern, such as scan pattern 2800, at a scan rate greater than or equal to 10 m/sec. (e.g., greater than or equal to 12 m/sec., 13 m/sec., 14 m/sec., 15 m/sec., 16 m/sec., 18 m/sec., 20 m/sec., etc., or between any of these values). In one embodiment, the scan pattern 2800 fits entirely within the first scanning range of the first positioner 106, but it will be appreciated that the scan pattern 2800 can be larger than the first scanning range. In this example, the pitch between adjacent spot locations 2504 in the scan pattern is constant, and the dwell time associated with each spot position 2504 is the same as the dwell time associated with any other spot position 2504 (e.g., greater than or equal to 1 μm, or thereabout).

Given the parameters in the above-described example, the first conductor can be indirectly ablated to form an opening therein. During indirect ablation, spot locations 2504 of the scan pattern 2800 are sequentially addressed (i.e., by delivering one or more laser pulses thereto) to generate and accumulate heat within the first conductor. The heat dissipates or is transferred from regions of the first conductor 102 at previously—and currently—addressed spot locations 2504 and accumulates within regions of the first conductor at one or more to-be-addressed spot locations 2504. Heat accumulating within a region of the first conductor at a to-be-processed spot location acts to increase the temperature of the first conductor at that region, and is also transferred into a region of the dielectric structure therebeneath. Heat can also accumulate within other regions of the first conductor, such as at previously-addressed spot locations 2504 (e.g., in the event that a region of the first conductor at a previously-addressed spot location 2504 has not already been indirectly ablated). During processing, heat transferred into the dielectric structure accumulates, and acts to vaporize a region of the dielectric structure below and adjoining a region of the first conductor. If a region of the first conductor has not attained a temperature greater than or equal to its processing threshold temperature before a region of the dielectric structure therebelow has been vaporized, then vaporization of the region of the dielectric structure acts to create a pocket or space (e.g., a high-pressure region containing pressurized heated gas, particles, etc., generated upon vaporization of the dielectric structure) beneath the first conductor. Then, when the region of the first conductor above the pocket attains a temperature greater than or equal to its processing threshold temperature, pressure built up within the pocket acts to push or eject the region of the first conductor from the workpiece 102 so as to expose the underlying dielectric structure.

A region of the first conductor above a pocket can be at a to-be-addressed spot location. In this case, when such region is ultimately irradiated by one or more laser pulses, it can attain a temperature that is greater than or equal to the processing threshold temperature of the first conductor. In some cases, during processing, a region of the first conductor above a pocket at a to-be-addressed spot location can attain a temperature that is greater than or equal to the processing threshold temperature of the first conductor after that region has accumulated heat dissipated from other previously- or currently-addressed spot locations. Also, in some cases during processing, a region of the first conductor above a pocket can be at a previously-addressed spot location. In this case, such a region can attain a temperature greater than or equal to the processing threshold temperature of the first conductor when it has accumulated heat dissipated from any other previously-addressed spot location, from a currently-addressed spot location, or any combination thereof. For example, a pocket can be formed beneath a region of the first conductor at the first spot location 2504a of scan pattern 2800, but such a region of the first conductor might not attain a temperature greater than or equal to its processing threshold temperature until one or more spot locations such as spot locations 2504e, 2504f, etc., are subsequently addressed.

In developing a process for indirectly ablating the first conductor by scanning the process spot along scan pattern 2800, it should be recognized that the minimum and maximum achievable diameter of the opening (at either the top or bottom of the first conductor) will depend upon one or more factors such as spot size, pulse duration, pulse repetition rate, average power, etc. of the delivered laser pulses, scan rate, thickness of the first conductor, thermal characteristics of the first conductor and the dielectric structure, the arrangement of spot locations in scan pattern 2800, etc. For example, the minimum achievable diameter of an opening formed using delivered laser pulses of a particular spot size will typically be limited to a range from 1.5 times (or thereabout) to 2 times (or thereabout) the particular spot size. The maximum achievable diameter of an opening formed using delivered laser pulses of a particular spot size will typically correspond to the maximum diameter that can be obtained before any region within the feature boundary 2502 (e.g., a central region thereof) cannot accumulate a sufficient amount of heat during processing to enable indirect ablation. Thus, and depending upon one or more of the aforementioned factors, scanning a beam of delivered laser pulses having a spot size of 15 µm (or thereabout) along scan pattern 2800 can produce an opening in the first conductor having a diameter in a range from 25 µm (or thereabout) to 80 µm (or thereabout). Likewise, if a spot size of 30 µm (or thereabout) is used, an opening having a diameter in a range from 60 µm (or thereabout) to 200 µm (or thereabout). It should be recognized that an opening may be formed to have any diameter (e.g., regardless of spot size used) by adding one or more additional spot locations to scan pattern 2800 (e.g., at a central region thereof) to ensure that all regions encompassed by a desired feature boundary 2502 accumulate a sufficient amount of heat during processing to enable indirect ablation.

In the example embodiment described above, the first conductor is processed by scanning a process spot along scan pattern 2800 such that the pitch between adjacent spot locations 2504 is constant and the dwell time associated with each spot position 2504 is the same as the dwell time associated with any other spot position 2504. In other embodiments, however, parameters such as the dwell time, pitch, or the like or any combination thereof, may be adjusted to control the manner with which heat is accumulated within the first conductor. It should be recognized that the selection of such parameters (such as dwell time and pitch) in any scan pattern (including, but not limited to, scan pattern 2800) may be dependent upon one or more factors such as the diameter of the desired feature boundary 2502, the thickness of the first conductor, the thickness of the dielectric structure, the geometric configuration of the second conductor, the desired throughput of the process for forming the opening in the first conductor, etc., the pulse duration, spot size, average power, etc., of laser pulses delivered to the first conductor, or the like or any combination thereof. Example embodiments concerning adjustment of some scanning technique parameters are discussed in greater detail below. It should be recognized that these example embodiments may be implemented to control the manner with which heat is accumulated within the workpiece 102, regardless of the type of workpiece 102 being processed or the feature(s) to be formed during processing.

b. Controlling Localized Heat Accumulation: Dwell Time

In one embodiment, the dwell time associated with each spot location in a scan pattern (e.g., scan pattern 2500, 2600, 2700, 2800, or the like) is the same. In another embodiment, however, the dwell time associated with at least one spot location in a scan pattern is different from the dwell time associated with at least one spot location in the same scan pattern. Dwell time may be controlled by controlling an operation of the first positioner 106 (e.g., to scan the process spot within the first scanning range), the second positioner 108 (e.g., to scan the process spot or the first scanning range within the second scanning range), by suspending delivery of laser pulses to the workpiece 102 (e.g., using a pulse gating unit, not shown), or the like or any combination thereof.

Differences in dwell time, as between different spot locations in a common scan pattern or along a common scan line, can be selected, modulated or otherwise set to ensure that the temperature of the workpiece 102 at one or more (or all) process spots of a scan pattern will be at or above the processing threshold temperature during processing. For example, the dwell time associated with the first spot location of a scan pattern to be irradiated may be longer than the dwell time associated with one or more (or all) other spot locations of the same scan pattern. In another example, the dwell time associated with the first spot location along a scan line to be irradiated (where such spot location is not the first spot location in the scan pattern to be irradiated) may be equal to or longer than the dwell time associated with one or more (or all) other spot locations disposed along same scan line. In yet another example, the dwell time associated with any spot location along a scan line to be irradiated (where such spot location is not the first spot location in the scan pattern to be irradiated) may be equal to or greater than the dwell time associated with an adjacent spot location (or any other spot location) disposed along same scan line to be subsequently irradiated. In still another example, the dwell time associated with the first spot location along a particular scan line to be irradiated (where such spot location is not the first spot location in the scan pattern to be irradiated) may be equal to or longer than the dwell time associated with the first spot location along another scan line (which may or may not be adjacent to the first spot location of the particular scan line) to be subsequently irradiated.

Differences in dwell time, as between different spot locations in a common scan pattern or along a common scan line, can also be selected, modulated or otherwise set to ensure that the temperature of a non-feature region of the workpiece 102 will be at or below the damage threshold temperature during processing of the workpiece 102. For example, the dwell time associated with the last spot location of a scan pattern to be irradiated may be shorter than the dwell time associated with one or more (or all) other spot locations of the same scan pattern. In another example, the dwell time associated with the last spot location along a scan line to be irradiated (where such spot location is not the last spot location in the scan pattern to be irradiated) may be equal to or shorter than the dwell time associated with one or more (or all) other spot locations disposed along same scan line. In yet another example, the dwell time associated with any to-be-addressed spot location along a scan line (where such spot location is not the first spot location in the scan pattern) may be equal to or less than the dwell time associated with any other previously-addressed spot location disposed along same scan line. In still another example, the dwell time associated with the first spot location along one scan line to be irradiated (where such spot location is not the first spot location in the scan pattern to be irradiated) may be equal to or longer than the dwell time associated with the first spot location along another scan line to be subsequently irradiated.

By lengthening the dwell time associated with one spot location relative to one or more other spot locations in a scan pattern (or disposed along a common scan line), the manner in which a region of the workpiece (e.g., at a previously-addressed, a currently-addressed, a to-be-addressed spot location, or the like or any combination thereof) accumulates heat (e.g., that was generated as a result of delivering laser pulses to one or more previously-addressed spot locations, as a result of delivering laser pulses to a currently-addressed spot location, or any combination thereof) can be controlled to enable efficient ablation or other processing, while avoiding undesirable damage to non-feature regions of the workpiece 102.

In view of the above, and continuing with the above-described example embodiment (i.e., in which an opening is formed in the first conductor of a PCB by indirect ablation), it should be recognized that the dwell time associated with one or more spot locations 2504 of the scan pattern 2800 may be different from any of the other the spot location 2504 of the scan pattern 2800. For example, the process spot can be scanned along scan pattern 2800 such that the dwell time associated with first spot location 2504a of scan pattern 2800 is longer than the dwell time associated with all other spot locations 2504 of scan pattern 2800. Generally, the dwell time associated with first spot location 2504a is set for a duration sufficient to ensure that the portion of the first conductor at one or more spot locations 2504 to be addressed after the first spot location 2504a (e.g., one or more of the second spot location 2504e, the third spot location 2504f, etc., in the scan pattern 2800) can be indirectly ablated when one or more of such to-be-addressed spot locations 2504 are ultimately addressed. Optionally, the dwell time associated with the first spot location 2504a may be set such that the region of the first conductor at the first spot location 2504a is indirectly when the first spot location 2504a is addressed. In general, however, the dwell time associated with each of the spot locations 2504 can be set such that the temperature of a non-feature region of the workpiece 102 (e.g., any region within the dielectric structure adjoining or otherwise near the second conductor) remains below the damage threshold temperature during processing of the first conductor. In one embodiment, within scan pattern 2800, the dwell time associated with the first spot location 2504a, or any other spot location 2504 of scan pattern 2800, may be greater than or equal to the aforementioned positioning period of the first positioner 106. In one embodiment, the dwell time associated with the first spot location 2504a may be in a range in a range from 2 µs (or thereabout) to 9 µs (or thereabout) (e.g., the dwell time associated with the first spot location 2504a may be equal (or about equal) to 2 µs, 3 µs, 4 µs, 5 µs, 6 µs, 7 µs, 8 µs, 9 µs, etc., or between any of these values). In another embodiment, the dwell time associated with spot locations 2504 other than the first spot location 2504a may be equal to 1 µs (or thereabout).

c. Controlling Localized Heat Accumulation: Pitch

In one embodiment, the pitch between adjacent spot locations in a scan pattern, between adjacent spot locations along a common scan line, or any combination thereof, is the same. In another embodiment, however, the pitch between one pair of adjacent spot locations and another pair of adjacent spot locations (i.e., in the same scan pattern, along a common scan line, or any combination thereof) can be different. Pitch may be controlled by controlling an operation of the first positioner 106 (e.g., to scan the process spot within the first scanning range), the second positioner 108 (e.g., to scan the process spot or the first scanning range within the second scanning range), the third positioner 110 (e.g., to scan the first scanning range or the second scanning range within the third scanning range), or the like or any combination thereof.

Differences in pitch, as between different spot locations in a common scan pattern or along a common scan line, can be selected, modulated or otherwise set to ensure that the temperature of the workpiece 102 at one or more (or all) process spots of a scan pattern will be at or above the processing threshold temperature during processing. For example, the pitch between the first pair of adjacent spot locations in a scan pattern to be irradiated may be less than the pitch between one or more (or all) other pairs of adjacent spot locations of the same scan pattern. In another example, the pitch between the first pair of adjacent spot locations along a scan line to be irradiated (where such pair of adjacent spot locations is not the first pair of adjacent spot location in the scan pattern to be irradiated) may be equal to or shorter than the pitch between one or more (or all) other pairs of adjacent spot locations disposed along same scan line. In yet another example, the pitch between any pair of adjacent spot locations along a scan line to be irradiated (where such pair of adjacent spot locations is not the first pair of adjacent spot locations in the scan pattern to be irradiated) may be equal to or less than the pitch between any other pair of adjacent spot locations disposed along same scan line to be subsequently irradiated. In still another example, the pitch between the first pair of adjacent spot locations along a particular scan line to be irradiated (where such pair of adjacent spot locations is not the first pair of adjacent spot locations in the scan pattern to be irradiated) may be equal to or shorter than the pitch between another first pair of adjacent spot locations along another scan line (which may or may not be adjacent to the first spot location of the particular scan line) to be subsequently irradiated.

Differences in pitch, as between different pairs of adjacent spot locations in a common scan pattern or along a common scan line, can be selected, modulated or otherwise set to ensure that the temperature of a non-feature region of the workpiece 102 will be at or below the damage threshold temperature during processing of the workpiece 102. For example, the pitch between a last pair of adjacent spot locations of a scan pattern to be irradiated may be longer than the pitch between one or more (or all) other pairs of adjacent spot locations of the same scan pattern. In another example, the pitch between a last pair of adjacent spot locations along a scan line to be irradiated (where such pair of adjacent spot locations is not the last pair spot location in the scan pattern to be irradiated) may be equal to or longer than the dwell time associated with one or more (or all) other spot locations disposed along same scan line. In yet another example, the pitch between any pair of adjacent spot locations along a scan line to be irradiated (where such spot location is not the first spot location in the scan pattern) may be equal to or longer than the pitch between any pair of adjacent previously-addressed spot locations disposed along same scan line. In still another example, the pitch between the first pair of adjacent spot locations along one scan line to be irradiated (where such pairs of adjacent spot location is not the first pair of adjacent spot locations in the scan pattern) may be equal to or shorter than the pitch between the first pair of adjacent spot locations along another scan line of the scan pattern to be subsequently irradiated.

By shortening the pitch between with one pair of adjacent spot locations relative to one or more other pairs of adjacent spot locations in a scan pattern (or disposed along a common scan line), the manner in which a region of the workpiece (e.g., at a previously-addressed, a currently-addressed, a to-be-addressed spot location, or the like or any combination thereof) accumulates heat (e.g., that was generated as a result of delivering laser pulses to one or more previously-addressed spot locations, as a result of delivering laser pulses to a currently-addressed spot location, or any combination thereof) can be controlled to enable efficient ablation or other processing, while avoiding undesirable damage to non-feature regions of the workpiece 102.

In view of the above, and continuing with the above-described example embodiment (i.e., in which an opening is formed in the first conductor of a PCB by indirect ablation), it should be recognized that the pitch between one or more pairs of adjacent spot locations 2504 of the scan pattern 2800 may be different from, or the same as, the pitch between any of the other pairs of adjacent spot location 2504 of the scan pattern 2800. For example, in one embodiment, the pitch between pairs of adjacent spot locations in scan pattern 2800 can increase (e.g., linearly or non-linearly, uniformly or non-uniformly, continuously or non-continuously, etc.) from the first spot location 2504*a* to the last spot location 2504*b*. In another embodiment, the pitch between pairs of adjacent spot locations in one group of sequentially-addressable spot locations in scan pattern 2800 can be different from the pitch between pairs of adjacent spot locations in any other group of sequentially-addressable spot locations in scan pattern 2800. For example, the pitch between each of the pairs of adjacent spot locations in a first group of sequentially-addressable spot locations in scan pattern 2800 can be less than the pitch between each of the pairs of adjacent spot locations in a second group of sequentially-addressable spot locations in scan pattern 2800. Generally, spot locations in the first group of sequentially-addressable spot locations are addressed before spot locations in the second group of spot locations. Thus, the first group of sequentially-addressable spot locations includes, at least, spot locations 2504*a*, 2504*e* and 2504*f*, and the second group of sequentially-addressable spot locations includes, at least spot locations 2504*b*, 2504*g* and 2504*h*. In one embodiment, the number of spot locations in the first group of sequentially-addressable spot locations is in a range from 1% to 95% of the total number of spot locations of scan pattern 2800, and any spot locations not included in the first group of sequentially-addressable spot locations are included in the second group of sequentially-addressable spot locations.

In one embodiment, the pitch between each of the pairs of adjacent spot locations in the first group of sequentially-addressable spot locations is constant, and the number of spot locations in the first group of sequentially-addressable spot locations is in a range from 1% to 95% of the total number of spot locations of scan pattern 2800. In this embodiment, the number of spot locations in the first group of sequentially-addressable spot locations is equal (or about equal) to 3%, 5%, 10%, 15%, 20%, 30%, 40%, 50%, 60%, 70%, 80%, 90%, etc., or between any of these values).

iv. Other Considerations Concerning Scan Patterns a. Single-Spot Location Scan Pattern In the embodiments discussed above, a scan pattern has been described as including a plurality of sequentially-addressed spot locations, and the workpiece 102 may be processed to form a feature by scanning a process spot along a scan pattern to irradiate the various spot locations. In another embodiment, however, a scan pattern may consist of only a single spot location, and the workpiece 102 may be processed (e.g., ablated, marked, melted, etc.) simply by directing one or more laser pulses to the single spot location (or otherwise delivered within a local vicinity of the single spot location). Such a scan pattern is herein referred to as a "single-spot location scan pattern." For example, a single spot location of a scan pattern may be repeatedly irradiated with a plurality of laser pulses to directly ablate the workpiece 102 (e.g., to form a feature such as a blind via, a through via, or other recess, hole or opening in the workpiece 102). This type of direct ablation process is often referred to as a "punch" process.

In another example, when the workpiece 102 is provided as a PCB such as that described above in the section "Leveraging Localized Heat Accumulation: Indirect Ablation," the workpiece 102 can be processed to directly or indirectly ablate the first conductor, thereby forming an opening that exposes a region of the dielectric structure. In one embodiment, the laser pulses delivered to the single spot location can have a wavelength in the UV range of the electromagnetic spectrum, and have one or more other characteristics suitable to directly ablate the first conductor. In another embodiment, laser pulses delivered to the single spot location can have a wavelength in the long-wavelength IR (LWIR) range of the electromagnetic spectrum (i.e., such laser pulses being typically generated from a carbon dioxide laser as laser source 104), and have one or more other characteristics suitable to indirectly ablate the first conductor. In yet another embodiment, laser pulses delivered to the single spot location can have a wavelength in the visible green range of the electromagnetic spectrum, and have one or more other characteristics suitable to indirectly ablate the first conductor.

Laser pulses having a wavelength in the visible green range of the electromagnetic spectrum can often be produced at much higher average powers than corresponding laser pulses having a wavelength in the UV range of the electromagnetic spectrum, enabling the workpiece 102 to be processed at a higher-throughput. Also, laser pulses having a wavelength in the visible green range of the electromagnetic spectrum can be focused to a much smaller spot size than laser pulses having a wavelength in the LWIR range of the electromagnetic spectrum, enabling smaller features to be formed in the workpiece 102. Furthermore, and as noted above, materials typically used to form the first conductor (i.e. copper or a copper alloy) tend to absorb green light fairly efficiently. Accordingly, darkening of an exposed surface of the first conductor (i.e., the surface of the first conductor facing away from the dielectric structure)—a process typically used when indirectly ablating the first conductor using laser pulses having a wavelength in the LWIR range of the electromagnetic spectrum—may be omitted if desired.

Generally, the beam of laser pulses delivered to the worksurface 102*a* (i.e., the first conductor) has a wavelength in the visible green range of the electromagnetic spectrum, a Gaussian-type or non-Gaussian-type spatial intensity profile, a pulse duration of greater than or equal to 1 ns (e.g., greater than or equal to 1 ns, 1.5 ns, 2 ns, 2.5 ns, 5 ns, 7 ns, 10 ns, etc., or between any of these values), a spot size smaller than the top or bottom diameters of the opening to be formed (e.g., a spot size less than or equal to 30 µm, 25 µm, 20 µm, 15 µm, 12 µm, 10 µm, 9 µm, 8 µm, 5 µm, etc., or between any of these values), an average power greater than or equal to 100 W (e.g., greater than or equal to 120 W, 150 W, 180 W, 200 W, 225 W, 250 W, 275 W, 300 W, 350 W, 500 W, etc., or between any of these values).

In one embodiment, the above-described green-wavelength laser pulses are delivered to the worksurface 102*a* (i.e., the first conductor) at a pulse repetition rate greater than or equal to 100 MHz (e.g., greater than or equal to 125 MHz, 150 MHz, 175 MHz, 200 MHz, 250 MHz, 300 MHz, 350 MHz, 500 MHz, etc., or between any of these values). Laser pulses having the above-described characteristics can typically be generated by, or derived from, laser sources such as CW laser sources, QCW laser sources, etc. In other embodiments, however, other laser sources capable of producing green-wavelength laser pulses having pulse energies in the range from 100 µJ (or thereabout) to 50 mJ (or thereabout) over a time scale of one or more microseconds (e.g., a burst mode of ns or ps pulses over multiple microseconds, or a burst mode where the burst is repeated itself every microsecond or less, etc.) may also be used to form an opening in the first conductor.

It should be recognized that the dwell time associated with the single spot location may be in a range from 1 µs (or thereabout) to 30 µs (or thereabout), depending upon one or more factors such as thickness of the first conductor, surface absorption properties, certain laser parameters (e.g. pulse energy, pulse duration, pulse repetition rate, spot size and spot shape, etc.), and the like.

b. Sequential vs. Concurrent Feature Formation

In one embodiment, a beam of delivered laser pulses can be used to form multiple features in or on a workpiece 102 in a sequential manner. That is, a beam axis along which a plurality of laser pulses are delivered to the workpiece 102 is moved so as to scan a resultant process spot along a first scan pattern, such as any of the scan patterns discussed above or any other scan pattern (or first set of such scan patterns) until a first feature is formed. After the first feature is formed, the beam axis is moved to another region of the workpiece 102 so as to scan a resultant process spot along a second scan, such as any of the scan patterns discussed above or any other scan pattern (or second set of such scan patterns) until a second feature is formed. One or more additional features may thereafter be sequentially formed in like fashion.

In another embodiment, a beam of delivered laser pulses can be used to form multiple features in or on a workpiece 102 in a concurrent manner. That is, a beam axis, along which a plurality of laser pulses are delivered to the workpiece 102, is moved so as to alternately scan a resultant process spot along a multiple scan patterns. For example, the beam axis may be moved such that one or more laser pulses are delivered to one or more (but not all) spot locations of a first scan pattern and, thereafter, the beam axis is scanned such that one or more laser pulses are delivered to one or more (but not all) spot locations of a second scan pattern. The beam axis may then be moved such that one or more laser pulses are delivered to one or more to-be-addressed spot locations of the first scan pattern (or of the first set of scan patterns) or to one or more (but not all) spot locations of a third scan pattern (or of a third set of scan patterns), etc. The process of moving the beam axis and alternately delivering laser pulses to one or more spot locations of the various scan patterns may be repeated until all spot locations of the first scan pattern (or first set of scan patterns) have been addressed (i.e., to form a first feature), until all spot locations of the second scan pattern (or second set of scan patterns) have been addressed (i.e., to form a second feature), etc. Forming multiple features in a concurrent manner can be helpful in preventing non-feature regions of the workpiece 102 from becoming undesirably damaged due to heat that would otherwise accumulate during formation of a single feature or during sequential formation of multiple features.

Features which are either sequentially or concurrently formed as described in the embodiments above may be the same or different from one another. At least some of the sequentially- or concurrently-formed features may be spatially arranged relative to one another in or on the workpiece 102 so as to be simultaneously arrangeable within the first scanning range, within the second scanning range, or any combination thereof. Thus, depending upon the size of the features ultimately formed and the distance between such features, the first scanning range or the second scanning range may encompass at least two sequentially- or concurrently-formed features.

In one embodiment (e.g., when the workpiece 102 is provided as a PCB such as that described above in the section "Leveraging Localized Heat Accumulation: Indirect Ablation"), the workpiece 102 can be processed to sequentially or concurrently form multiple features, such as openings, in the first conductor by scanning the delivered laser pulses (e.g., having characteristics as described in the section "Single-Spot Location Scan Pattern," or having one or more other characteristics suitable to facilitate indirect ablation of the first conductor) among different single-spot location scan patterns. In another embodiment (e.g., when the workpiece 102 is provided as a dielectric structure such as a build-up film, a glass-reinforced epoxy laminate, an interlayer dielectric material, a low-k dielectric material, a solder resist, or the like or any combination thereof), the workpiece 102 can be processed to sequentially or concurrently form multiple features, such as one or more vias (e.g., one or more blind vias or through vias), recesses, holes, openings, or the like or any combination thereof, by scanning a beam of delivered laser pulses (e.g., having one or more other characteristics suitable to facilitate direct ablation of the dielectric structure) among different single-spot location scan patterns. Generally, laser pulses generated by burst mode lasers (or other lasers operating in burst mode) will typically be generated at a pulse repetition rate lower than 100 MHz (i.e., often at or below 10 kHz). Accordingly, if laser pulses in either of the embodiments discussed above are delivered to the worksurface 102a at a pulse repetition rate greater than or equal to (or less than) 100 MHz, then multiple features may be formed (i.e., either in the first conductor or in the dielectric structure) by operating the first positioner 106 to scan the delivered laser pulses to different single-spot location scan patterns that are simultaneously encompassed by the first scanning range. If laser pulses are delivered to the worksurface 102a at a pulse repetition rate of 10 kHz or less, then multiple features may be formed by operating the second positioner 108 to scan the delivered laser pulses to different single-spot location scan patterns that are simultaneously encompassed by the second scanning range.

VIII. Embodiments Concerning Modulation of Beam Characteristics

As mentioned above, a beam of laser energy (whether continuous or pulsed) delivered to the workpiece 102 during processing of the workpiece 102 can characterized by one or more characteristics such as wavelength, average power, spatial intensity profile type, $M^2$ factor, spatial intensity profile shape, spot size, optical intensity, fluence, etc. When the beam of laser energy includes a one or more laser pulses, the beam can also be characterized by one or more characteristics such as pulse repetition rate, pulse duration, pulse energy, peak power, etc. All of these characteristics of the beam of laser energy (whether continuous or pulsed) are herein generically and collectively referred to as "characteristics" of the beam of laser energy, or simply "beam characteristics." Beam characteristics of laser pulses delivered to a common spot location (or delivered to within the vicinity of a common spot location) may be the same or different. For example, one or more characteristics such as spot size, pulse energy, pulse repetition rate, etc., of sequentially-delivered laser pulses delivered to a common spot location (or delivered to within the vicinity of a common spot location may be constant, may increase, may decrease, or any combination thereof. Likewise, beam characteristics of laser pulses delivered to different spot locations of a common scan pattern may be the same or different.

Characteristics such as spot size may be adjusted by operating one or more of the mechanisms for effecting Z-height compensation, described above. Characteristics such as $M^2$ factor and spatial intensity profile shape may be adjusted by operating one or more AOD systems (e.g., whether provided as the first positioner 106, or otherwise) in the manner described above. Further, techniques discussed above with respect to operating an AOD system to change the M² factor can be modified to adjust the spatial intensity profile type of a beam of laser pulses, in the manner discussed above. For example, the spectrum of an RF signal to be applied to one or more transducers of an AOD system (e.g., whether provided as the first positioner 106, or otherwise) can be shaped to have a non-Gaussian spectral profile (e.g., a rectangular or "top-hat" spectral profile). When such an RF signal is applied to one or more transducers of an AOD system (e.g., whether provided as the first positioner 106, or otherwise), a laser pulse exiting the AOD system can be changed in a manner that results in the generation of a laser pulse having a corresponding non-Gaussian spatial intensity profile type (e.g., a rectangular or "top-hat" spatial intensity profile). In one embodiment, the spectrally-shaped RF signal is not chirped. In another embodiment, the spectrally-shaped RF signal may be chirped. Thus, depending upon the manner in which an AOD system is driven (i.e., responsive to one or more applied RF signals), a laser pulse exiting the AOD system can be different from an incident laser pulse in terms of one or more characteristics such as M² factor, spatial intensity profile type, spatial intensity profile shape and spot size. These and other beam characteristics may also be changed in any other suitable or desired manner that is either known in the art or otherwise disclosed herein (in this section or elsewhere).

Generally, one or more (or all) beam characteristics may be kept constant (or at least substantially constant), may be modulated (e.g., so as to be substantially non-constant), or any combination thereof, during processing of the workpiece 102. Example embodiments in which one or more beam characteristics can be changed during processing of a feature are described below. Although particular embodiments concerning modulation of beam characteristics are discussed in this section in connection with apparatus 100, it will be appreciated that any one of these embodiments or any combination thereof, may be implemented in connection with the multi-head apparatus 700. It will be further appreciated that the embodiments discussed in this section may be implemented with any suitably-equipped single- or multi-head laser-processing apparatus other than those discussed herein.

i. Feature Formation in Multilayered Workpieces

Workpieces having a multilayered construction can be processed to form one or more features that extend through multiple layers of the workpiece. In one embodiment, a multilayered workpiece 102 may be processed to form a feature such as an opening, slot, via or other hole, groove, trench, scribe line, kerf, recessed region, etc., which extends at least partially through two different layers of the multilayered workpiece 102. The different layers of the multilayered workpiece 102 may be formed of different materials, have different optical absorption characteristics (e.g., relative to the delivered beam of laser energy), or the like or any combination thereof. Accordingly, a feature may be formed in the multilayered workpiece 102 by ablating a first layer of the workpiece 102 using a beam of delivered laser energy characterized by a first set of beam characteristics to, for example, expose a second layer of the workpiece 102. Thereafter, the second layer of the workpiece 102 may be ablated using a beam of delivered laser energy characterized by a second set of beam characteristics that is different from the first set of beam characteristics (e.g., in terms of wavelength, average power, spatial intensity profile type, M² factor, spatial intensity profile shape, spot size, optical intensity, fluence, pulse repetition rate, pulse duration, peak power, or the like or any combination thereof). Any characteristic in the second set of beam characteristics may be the same as a corresponding characteristic in the first set of beam characteristics, so long as at least one characteristics is larger than, less than, or otherwise different from a corresponding characteristic in the first set of beam characteristics.

For example, a multilayered workpiece 102 may be provided as a PCB panel or PCB that includes a dielectric structure (e.g., a glass-reinforced epoxy laminate) adhered to a first conductor (e.g., a copper or copper alloy foil, which may have an exposed surface that is either darkened—e.g., by a chemical reaction, by a laser-darkening process, etc.— or that is not darkened) at a first side thereof and, optionally, to a second conductor (e.g., a pad, a trace, foil, etc., formed of copper or a copper alloy) at a second side thereof that is opposite the first side. The multilayered workpiece 102 may be processed to form a via extending completely through the first conductor and at least partially through the dielectric structure. The via may terminate at the second conductor (in which case the via is a blind via), or may extend completely through the second conductor (in which case the via may be a through via).

In the example given above, a beam of laser energy characterized by a first set of beam characteristics may be delivered to the first conductor (e.g., and, optionally, scanned according a scan technique exemplarily described above) in a first processing step to directly or indirectly ablate the first conductor to form an opening that exposes the dielectric structure. Thereafter, in a second processing step, a beam of laser energy characterized by a second set of beam characteristics may be delivered through the opening to the dielectric structure (e.g., and, optionally, scanned according a scan technique exemplarily described above) to directly ablate the dielectric structure form a hole extending into the dielectric structure.

In one embodiment, the first and second sets of beam characteristics may be same in terms of wavelength (e.g., the delivered beam of laser energy may have a wavelength in UV, visible or IR range of the electromagnetic spectrum), but may differ in terms of fluence, optical intensity, or the like or any combination thereof. For example, the fluence may be greater during the first processing step than during the second processing step. As between the first and second processing steps, the fluence may be adjusted by decreasing the pulse energy of the delivered beam of laser pulses, by increasing the spot size of the delivered beam of laser pulses, or the like or any combination thereof. For example, the spot size of the beam of laser pulses delivered during the second processing step (i.e., the "second spot size") can be increased relative to the spot size of the beam of laser pulses delivered during the first processing step (i.e., the "first spot size") to reduce the fluence at the process spot (e.g., below the threshold fluence at which materials from which the first and second conductors are formed can be directly ablated) without reducing average power. As a result, the number of number of pulses required to form the hole in the dielectric structure can be kept relatively low and damage to neighboring conductor structures can be avoided. In some embodiments, the first spot size may be in a range from 2 μm (or thereabout) to 35 μm (or thereabout) and the second spot size, while being greater than the first spot size, may be in a range of from 40 μm (or thereabout) to 150 μm (or thereabout). For example, the first spot size may be equal (or about equal) to 2 μm, 3 μm, 5 μm, 7 μm, 10 μm, 15 μm, 20 μm, 25 μm, 30 μm, 35 μm, etc., or between any of these values, and the second spot size may be equal (or about equal) to 40 μm, 50 μm, 60 μm, 80 μm, 100 μm, 125 μm, 140 μm, 155 μm, etc.

ii. Considerations Regarding Localized Heat Accumulation

In one embodiment, one or more beam characteristics (e.g., pulse energy, pulse repetition rate, pulse duration, average power, or the like or any combination thereof) may be selected, modulated or otherwise set to ensure that the temperature of a non-feature region of the workpiece 102 will be at or below the damage threshold temperature during processing of the workpiece 102 (e.g., over a period of time in which one or more features are formed in the workpiece 102). Modulation of one or more beam characteristics can be accomplished independently of parameters associated with any scanning technique used to form a feature, or may be implemented in conjunction with modulation of one or more scanning technique parameters (e.g., dwell time, pitch, or the like or any combination thereof).

For example, and continuing with the above-described example embodiment in which an opening is formed in a first conductor of a PCB by indirect ablation (e.g., by scanning a process spot along scan pattern 2800), the pulse energy of laser pulses delivered to the worksurface 102a (i.e., to the exposed surface of the first conductor) can be modulated such that the pulse energy of one or more laser pulses delivered to the last spot location 2504b of the scan pattern 2800 is less than the pulse energy of one or more laser pulses delivered to the first spot location 2504a of the scan pattern 2800. For example, one or more laser pulses delivered to the last spot location 2504b can have a pulse energy that is in a range of 75% (or thereabout) to 20% (or thereabout) of the pulse energy of one or more pulses delivered to the first spot location 2504a (e.g., equal, or about equal, to 80%, 75%, 70%, 65%, 60%, 55%, 50%, 45%, 40%, 35%, 30%, 25%, 20%, 15%, etc., or between any of these values, of the pulse energy of one or more pulses delivered to the first spot location 2504a. In one embodiment, the pulse energy of laser pulses delivered to spot locations in scan pattern 2800 can decrease (e.g., linearly or non-linearly, uniformly or non-uniformly, continuously or non-continuously, etc.) from the first spot location 2504a to the last spot location 2504b.

In another embodiment, the pulse energy of laser pulses delivered to spot locations in one group of sequentially-addressable spot locations in scan pattern 2800 can be different from the pulse energy of laser pulses delivered to spot locations in any other group of sequentially-addressable spot locations in scan pattern 2800. For example, the pulse energy of laser pulses delivered to spot locations in a first group of sequentially-addressable spot locations in scan pattern 2800 can be greater than the pulse energy of laser pulses delivered to spot locations in a second group of sequentially-addressable spot locations in scan pattern 2800. Generally, spot locations in the first group of sequentially-addressable spot locations are addressed before spot locations in the second group of sequentially-addressable spot locations. Thus, the first group of sequentially-addressable spot locations includes, at least, spot locations 2504a, 2504e and 2504f, and the second group of sequentially-addressable spot locations includes, at least, spot locations 2504b, 2504g and 2504h. In one embodiment, the number of spot locations in the first group of sequentially-addressable spot locations is in a range from 1% to 95% of the total number of spot locations of scan pattern 2800, and any spot locations not included in the first group of sequentially-addressable spot locations are included in the second group of sequentially-addressable spot locations.

In one embodiment, the pulse energy of laser pulses delivered to spot locations in the first group of sequentially-addressable spot locations is constant, and the number of spot locations in the first group of sequentially-addressable spot locations is in a range from 1% to 95% of the total number of spot locations of scan pattern 2800. In this embodiment, the number of spot locations in the first group of sequentially-addressable spot locations is equal (or about equal) to 3%, 5%, 10%, 15%, 20%, 30%, 40%, 50%, 60%, 70%, 80%, 90%, etc., or between any of these values).

IX. Post-Processing

Sometimes, additional processing may be performed after a feature has been formed (e.g., by scanning a process spot along one or more feature-forming scan patterns, such as those described above, or along one or more other scan patterns, or the like or any combination thereof). Additional processing (e.g., in the presence of ambient air, an oxidizing gas or liquid, a reducing gas or liquid, an inert gas or liquid, a vacuum, etc.) may be performed to remove material (e.g., residual material generated duration formation of a feature, or otherwise remaining on or within the feature after it has been formed) from a bottom surface of sidewall region of a feature, to further remove one or more portions of the workpiece 102 at the feature boundary (e.g., to attain a feature boundary that more closely matches a desired feature boundary, etc.), to heat, anneal, melt, carbonize, oxidize, reduce, chemically etch or otherwise alter (e.g., using a light-activated reactive agent, etc.), or otherwise treat one or more materials in which the feature is defined, or the like or any combination thereof. Accordingly, one or more post-processing techniques may be performed by scanning a process spot along one or more post-processing scan patterns, which may be the same as or different from any of the aforementioned feature-forming patterns discussed above.

Generally, one or more characteristics of the post-processing scan pattern (e.g., including the arrangement of spot locations, the proximity of spot locations to the feature boundary, etc.), one or more beam characteristics selected or otherwise used during post-processing, or the like or any combination thereof, may be same as, or different from, corresponding characteristics of the feature-forming scan pattern and may be the same as, or different from, corresponding characteristics of the beam characteristics selected or otherwise used during formation of the feature. In one embodiment, one or more post-processing techniques can be performed on a feature that has been formed, before forming another feature. In another embodiment however, one or more post-processing techniques can be performed on a plurality of features only after all of the plurality of features have been formed.

Example embodiments of post-processing techniques will now be discussed in greater detail below. Although particular embodiments concerning modulation of beam characteristics are discussed in this section in connection with apparatus 100, it will be appreciated that any one of these embodiments or any combination thereof, may be implemented in connection with the multi-head apparatus 700. It will be further appreciated that the embodiments discussed in this section may be implemented with any suitably-equipped single- or multi-head laser-processing apparatus other than those discussed herein.

i. Via Cleaning

A feature such as a blind via may be formed in a workpiece by directly ablating a dielectric structure (e.g., a glass-reinforced epoxy laminate) to form therein a hole, which exposes, at a bottom portion thereof, a conductor (e.g., a pad, a trace, foil, etc., formed of copper or a copper alloy). Generally, the hole can be formed using a beam of delivered laser energy characterized by a first set of beam characteristics. Residual material (e.g., including resinous material) may remain within the blind via (e.g., on the exposed conductor), which can prevent reliable adhesion of subsequently a formed metallization within the blind via, reduce the effective area at the bottom portion of the blind via available for electrical contact with the exposed copper layer, etc. Accordingly, it can be beneficial to remove (either partially or completely) the residual material. In one embodiment, the residual material may be removed using a beam of delivered laser energy characterized by a second set of beam characteristics that is different from the first set of beam characteristics (e.g., in terms of wavelength, average power, spatial intensity profile type, $M^2$ factor, spatial intensity profile shape, spot size, optical intensity, fluence, pulse repetition rate, pulse duration, peak power, or the like or any combination thereof). Any characteristic in the second set of beam characteristics may be the same as a corresponding characteristic in the first set of beam characteristics, so long as at least one characteristics is larger than, less than, or otherwise different from a corresponding characteristic in the first set of beam characteristics. The beam of laser energy characterized by the second set of beam characteristics may be delivered into the opening formed in the dielectric structure to the exposed conductor and the residual material arranged thereon. Such a beam of laser energy may, optionally, be scanned (e.g., according a scan technique exemplarily described above) to directly or indirectly ablate the residual material on the exposed conductor without ablating the exposed conductor.

In one embodiment, the first and second sets of beam characteristics may be same in terms of wavelength (e.g., the delivered beam of laser energy may have a wavelength in UV, visible or IR range of the electromagnetic spectrum), spatial intensity profile type (e.g., Gaussian-type spatial intensity profile), but may differ in terms of spot size, $M^2$ factor, or the like or any combination thereof. For example, the spot size of the delivered beam of laser energy during the second processing step may be larger than the spot size of the delivered beam of laser energy during the first processing step. Likewise, the $M^2$ factor of the delivered beam of laser energy may be adjusted to yield a delivered beam of laser energy having a larger effective spot size during the second processing step than during the first processing step. Adjustment of the spot size or the $M^2$ factor may be effected using any suitable or desired technique (e.g., as described above in the section "Embodiments Concerning Modulation of Beam Characteristics"). During the second processing step, the process spot may be scanned (e.g., so as to address to multiple spot locations along a scan pattern) as desired. If the spot size (or effective spot size) at the process spot during the second processing step is sufficiently large, then the number of spot locations to address with the process spot may be reduced (e.g., to one or two spot locations).

In another embodiment, the first and second sets of beam characteristics may be same in terms of wavelength (e.g., the delivered beam of laser energy may have a wavelength in UV, visible or IR range of the electromagnetic spectrum), but may differ in terms of spatial intensity profile type, spatial intensity profile shape, spot size, or the like or any combination thereof. For example, the delivered beam of laser energy during the first processing step may have a Gaussian-type spatial intensity profile with a generally circular shape, and have a relatively small spot size. However, the delivered beam of laser energy during the second processing step may have a non-Gaussian-type spatial intensity profile (e.g., a "top-hat" spatial intensity profile, etc.) with a shape that is circular or non-circular (e.g., square, etc.) and have a relatively large spot size. Adjustment of the spatial intensity profile type, spatial intensity profile shape and spot size spot size may be effected using any suitable or desired technique (e.g., as described above in the section "Embodiments Concerning Modulation of Beam Characteristics"). During the second processing step, the process spot may be scanned (e.g., so as to address to multiple spot locations along a scan pattern) as desired. If the spot size (or effective spot size) at the process spot during the second processing step is sufficiently large, then the number of spot locations to address with the process spot may be reduced (e.g., to one or two spot locations).

a. Blind Via Cleaning—Central Region

When forming features such as blind vias (e.g., through a dielectric structure, to expose a copper layer at the bottom portion thereof), residual material (e.g., dielectric material) may be present at a central region of the bottom portion of the blind via (e.g., on the electrical conductor exposed at the bottom portion of the blind via). This may often be the case when using feature-forming scan patterns characterized by relatively few (or no) spot locations located within a central region of the desired feature boundary (e.g., as with scan pattern 2600 shown in FIG. 26).

To remove (either partially or completely) such residual material, a post-processing scan pattern (also referred to herein as a "central region cleaning scan pattern") may be scanned. Generally, a central region cleaning scan pattern includes one or more spot locations disposed in a central region of the feature boundary at the bottom portion of the feature. FIG. 26 illustrates an example embodiment of a central region cleaning scan pattern. The central region cleaning scan pattern include one or more spot locations (e.g., as shown in FIG. 26, the central region cleaning scan pattern includes multiple spot locations 2504') located within a central region of the feature boundary (e.g., within a central region of boundary 2502, which is encompassed within region 2602). Among the spot locations 2504', spot location 2504a' represents the first spot location to be irradiated with a laser pulse during the central region cleaning, and spot location 2504b' represents the last spot location to be irradiated with a laser pulse during the central region cleaning. Accordingly, the solid line connecting the spot locations 2504' indicates the sequence in which the spot locations 2504 are addressed (e.g., by one or more delivered laser pulses). It should be recognized, however, that the spot locations 2504' may be addressed in any other desired sequence (thus changing the configuration of the solid line), and may even be addressed randomly.

Generally, laser pulses delivered to spot locations while scanning the central region cleaning scan pattern do not irradiate regions of the workpiece 102 at the feature boundary. However, depending upon one or more factors such as spot size, spatial intensity distribution, etc., of the delivered laser pulses, the size and shape of the feature boundary at the top portion of the feature, the size and shape of the feature boundary at the bottom portion of the feature, the depth of the feature, etc., or the like or any combination thereof, one or more regions of the workpiece 102 at the feature boundary (e.g., at or near the top portion of the feature) may be irradiated by at least a portion of at one or more delivered laser pulses.

b. Blind Via Cleaning—Peripheral Region

When forming features such as blind vias (e.g., through a dielectric structure, to expose a copper layer at the bottom portion thereof) using scan patterns such as those described above with respect to FIGS. 25 to 28, residual material (e.g., dielectric material) may be present at a peripheral region of the bottom portion of the blind via (e.g., at or near a region where a sidewall of the blind via meets the electrical conductor exposed at the bottom portion thereof).

To remove (either partially or completely) such residual material, a post-processing scan pattern (also referred to herein as a "peripheral region cleaning scan pattern") may be scanned. The peripheral region cleaning scan pattern may include one or more spot locations disposed in a peripheral region of the feature boundary at a bottom portion of the feature. In one embodiment, the spot locations such as spot locations 2504a, 2504b and 2504d of scan pattern 2500, spot locations 2504c of scan pattern 2600, spot locations 2504b and 2504d of scan pattern 2700 and spot locations 2504 of scan pattern 2800, etc., can be considered to be located in a peripheral portion of the feature boundary at a bottom portion of the feature (if such scan patterns 2500, 2600, 2700 or 2800 were actually scanned when the bottom portion of the feature was formed). In another embodiment, spot locations of the peripheral region cleaning scan pattern can be within a local vicinity of the aforementioned spot locations. For purposes of discussion, a spot location of the peripheral region cleaning scan pattern is considered to be within a local vicinity of one of the aforementioned spot locations if it is within 1 µm of one of the aforementioned spot locations (e.g., within 0.8 µm, 0.75 µm, 0.7 µm, 0.65 µm, 0.6 µm, 0.5 µm, 0.4 µm, 0.3 µm, 0.25 µm, 0.2 µm, 0.15 µm, 0.1 µm, 0.08 µm, 0.05 µm, 0.01 µm, or less than 0.01 µm, of one of the aforementioned spot locations). If both the central and peripheral regions of a blind via are to be cleaned, the peripheral region can be cleaned either before or after the central region is cleaned.

Generally, laser pulses delivered to spot locations while scanning the peripheral region cleaning scan pattern irradiate one or more regions of the workpiece 102 at the feature boundary (e.g., at or near the top portion of the feature). However, depending upon one or more factors such as spot size, spatial intensity distribution, etc., of the delivered laser pulses, the size and shape of the feature boundary at the top portion of the feature, the size and shape of the feature boundary at the bottom portion of the feature, the depth of the feature, etc., or the like or any combination thereof, laser pulses can be delivered to spot locations of the central region cleaning scan pattern so as to not irradiate regions of the workpiece 102 at the feature boundary.

ii. Fine-Tuning of Feature Boundary

In one embodiment, spot locations of the aforementioned scan patterns that are adjacent to the desired feature boundary 2502 (e.g., spot locations 2504a, 2504b and 2504d of scan pattern 2500, spot locations 2504c of scan pattern 2600, spot locations 2504b and 2504d of scan pattern 2700 and spot locations 2504 of scan pattern 2800) are arranged sufficiently close to the desired feature boundary so that, when one or more laser pulses are delivered thereto, material is removed from the workpiece 102 to form at least a portion of the desired feature boundary 2502. In another embodiment, the material removed from the workpiece 102 at such spot locations need not form a portion of the desired feature boundary. In either embodiment, a post-processing scan pattern including one or more scan lines extending along at least a portion of the desired feature boundary (also referred to herein as a "boundary improvement scan pattern") may be scanned (e.g., to, improve sidewall smoothness, improve fidelity of the feature boundary actually obtained to the shape of the desired feature boundary, or the like or any combination thereof).

iii. Timing for Post-Processing

In one embodiment, post-processing techniques such as those described above may be performed immediately after the feature has been formed. That is, a laser pulse may be delivered to the first spot location in a post-processing scan pattern immediately after the last laser pulse has been delivered to a spot location in the feature-forming scan pattern. For example, boundary fine-tuning process or the central or peripheral region cleaning processes can be performed immediately after a feature, such as a blind via, has been formed. In another embodiment, one post-processing technique (e.g., the peripheral region cleaning process) may be performed immediately after another post-processing technique (e.g., the central region cleaning process) is completed. In this context, "immediately after" means that the amount of time that elapses between the completion of a feature-forming process (or an earlier-performed post-processing process) and a subsequently-performed post-processing process is equal to (or at least substantially equal to) the shortest, longest, median or mean positioning period (e.g., of the first positioner 106 during the feature-forming process or the earlier-performed post-processing process). In one embodiment, the positioning period of the first positioner 106 is less than 20 µs (or thereabout). For example, the positioning period of the first positioner 106 can be less than or equal to 15 µs, 10 µs, 5 µs, 3 µs, 2 µs, 1 µs, 0.8 µs, 0.5 µs, 0.3 µs, 0.1 µs, etc.

During feature formation, heat can accumulate within the workpiece 102 in regions around where the feature is formed (e.g., due to the absorption of energy in the delivered laser pulses by one or more materials in the workpiece 102, due to the transfer of heat through one or more materials in the workpiece 102, etc.). Accordingly, the temperature of regions in the workpiece 102 around where a feature is formed can rise significantly during formation of the feature. When it is desired to remove material (e.g., material of a dielectric structure) from one or more regions in the workpiece 102 at the feature boundary (e.g., when post-processing to fine-tune the feature boundary), this accumulated thermal energy present in the material-to-be-removed advantageously increases the post-processing efficiency.

However, when it is desired to remove material (e.g., residual material) at the bottom portion of a feature (e.g., when post-processing to clean the central or peripheral regions at the bottom portion of the feature), the accumulated thermal energy present in one or more regions of the workpiece 102 (e.g., at or near the top portion of the feature) can make it easier to remove portions of the workpiece 102 at or near the top portion of the feature if laser pulses, delivered to spot locations during the central or peripheral region cleaning, irradiate such portions of the workpiece 102. As a result, the feature boundary at the top portion of the feature can be undesirably widened during while scanning a post-processing scan pattern such as a central region cleaning scan pattern or a peripheral region cleaning scan pattern.

To overcome the above-described problem, a delay period may be interposed between the completion of a feature-forming process (or an earlier-performed post-processing process) and a subsequently-performed post-processing process such as a central region cleaning process or a peripheral region cleaning process. The duration of the delay period is selected or otherwise set to allow thermal energy within the workpiece 102 (e.g., at or near the top portion of the feature) to dissipate (i.e., to allow regions of the workpiece 102 at or near the top portion of the feature to cool) so that portions of the workpiece 102 at or near the top portion of the feature are not removed upon being irradiated by laser pulses delivered during the central or peripheral region cleaning. Generally, the delay period is longer than the shortest, longest, median or mean positioning period (e.g., of the first positioner 106 during the feature-forming process or the earlier-performed post-processing process). In one embodiment, and when the positioning period is less than 20 µs (or thereabout), the delay period is greater than 20 µs (or thereabout). For example, the delay period can be greater than or equal to 22 µs, 25 µs, 30 µs, 35 µs, 40 µs, 45 µs, 50 µs, 55 µs, 60 µs, etc. It should be recognized that the delay period can be selected or otherwise set depending upon one or more factors such as such as thermal conductivity, thermal diffusivity, specific heat capacity, viscosity, etc., of the material(s) of the workpiece 102 at or near the top portion of the feature, the pulse duration, fluence, pulse repetition rate, etc., of laser pulses delivered during the post-processing, the desired throughput for processing the workpiece 102 (which includes formation of multiple features, and performing post-processing, etc.), or the like or any combination thereof.

X. Embodiments Concerning Removal of By-Products

When one or more features such as an opening, slot, via, hole, groove, trench, scribe line, kerf, recessed region, etc., is formed within a workpiece 102 as a result of laser-processing, byproduct materials such as vapor (e.g., containing particles having a maximum cross-sectional dimension ranging from about 0.01 µm to about 4 µm), dust (e.g., containing particles having a maximum cross-sectional dimension ranging from about 0.1 µm to about 0.7 mm), workpiece fragments or other scrap (e.g., having a maximum cross-sectional dimension greater than about 0.7 µm) can be generated. In some cases (e.g., during a drilling or cutting process), such byproduct materials are ejected from the workpiece 102 and re-deposited on the worksurface 102a of the workpiece 102. In other cases (e.g., during a cutting process for forming a through hole or other feature extending through the workpiece 102), one more fragments or other scrap are not ejected from the workpiece 102 but, rather, simply remain stuck to the workpiece 102 (e.g., at a kerf formed in the workpiece 102 during the cutting process). Depending upon the size of the through hole or other feature extending through the workpiece 102, a fragment or other scrap of the workpiece 102 may have a maximum dimension that is significantly larger (e.g., by at least one order of magnitude) than the spot size of the laser energy delivered during processing. To facilitate removal of such by-products, a byproduct removal system may be provided.

Figure 38:
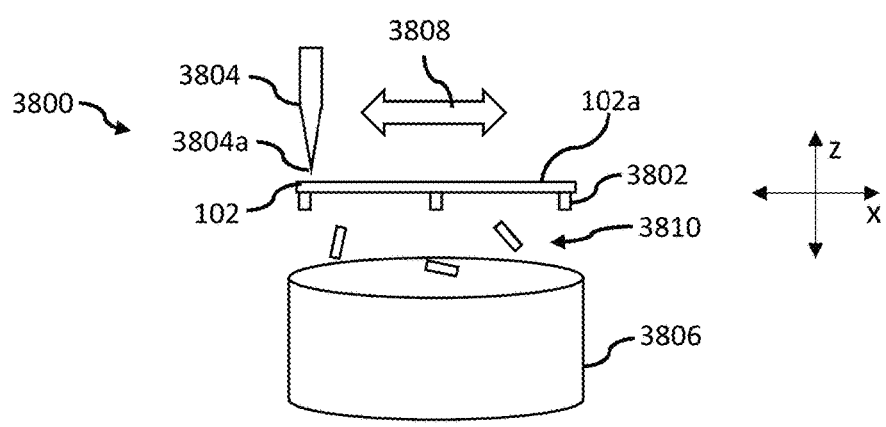
FIG. 38 schematically illustrates a byproduct removal system, according to one embodiment.

In one embodiment, and with reference to FIG. 38, the byproduct removal system may be provided as byproduct removal system 3800, which includes a frame 3802 for supporting a workpiece 102, an air knife 3804 arranged over the frame 3802, and a collection bin 3806 arranged under the frame 3802.

When supported by the frame 3802, the workpiece 102 (e.g., a PCB, an FPC, a lead frame blank, etc.) will have been processed and could include vapor or dust that has settled on the worksurface 102a. If the workpiece 102 has been processed to form a through hole or other feature extending therethrough, then one more fragments or other scrap may remain within the through hole or otherwise be stuck to the workpiece 102 (e.g., at a kerf formed in the workpiece 102 during the cutting process). The workpiece 102 may be transferred from the laser processing apparatus onto the frame 3802 by a transfer mechanism such as a robotic arm (e.g., having an end effector at an end thereof to engage with the workpiece, etc.), a roll-to-roll handling system, or the like or any combination thereof. In this case, the transfer mechanism may be controlled in response to one or more control signals output by the controller 114, by another controller, or the like or any combination thereof.

In one embodiment, the air knife 3804 is coupled to an actuator (not shown) and one or more linear stages or other mechanical linkages (e.g., guide rails, etc.) that is operative to move the air knife 3804 over the workpiece 102 (e.g., along the X-axis, as indicated by arrow 3808, along the Y-axis, or any combination thereof) while the workpiece 102 is kept stationary. In another embodiment, the frame 3802 is coupled to an actuator (not shown) and one or more linear stages or other mechanical linkages (e.g., guide rails, etc.) that is operative to move the frame 3802 (and, thus, the workpiece 102) beneath the air knife 3804 (e.g., along the X-axis, as indicated by arrow 3808, along the Y-axis, or any combination thereof). In either embodiment, the actuator may be controlled in response to one or more control signals output by the controller 114, by another controller, or the like or any combination thereof.

The air knife 3804 may be provided as a compressed air-powered air knife, a blower-powered air knife, or the like or any combination thereof, and include a nozzle 3804a configured to generate a high-pressure flow of air or other gas onto the worksurface 102a with sufficient force to blow any settled dust or vapor particles off of the worksurface 102a, to dislodge any fragments or other scraps stuck to the workpiece 102, or the like. Dislodged fragments or other scraps (shown generally at 3810) fall into the collection 3806 (e.g., under the influence of gravity, the high-pressure flow generated by the air knife 3804, or the like or any combination thereof). In one embodiment, an automated optical inspection (AOI) system (not shown) may also be provided to verify that by-products have been removed as desired. The air knife 3804 and optional AOI system may be controlled in response to one or more control signals output by the controller 114, by another controller, or the like or any combination thereof.

After the processed workpiece 102 has been subjected to the high-pressure flow generated by the air knife 3804, the workpiece 102 may be transferred (e.g., to a storage bay of a material handling apparatus such as the material handling apparatus 800, back to the laser-processing apparatus for further processing, or the like).

XI. Embodiments Concerning Use of Multiple Laser Sources

Certain workpieces can be characterized as being heterogeneous in composition or as being a composite material. Examples of such workpieces include PCB panels, PCBs, glass-reinforced epoxy laminates, prepregs, build-up materials, FPCs, ICs, ICPs, LEDs, LED packages, and the like. Sometimes, such heterogeneous or composite workpieces (generically referred to herein as "compound workpieces") are formed of one or more components that are transparent to the wavelength of laser pulses delivered to the workpiece 102 (i.e., herein referred to as a "transparent workpiece component"), in addition to components that are not transparent to the wavelength of laser pulses delivered to the workpiece 102 (i.e., herein referred to as a "nontransparent workpiece component"). In this context, a component of the workpiece 102 may be considered a transparent workpiece component if it is formed of a material having a linear absorption spectrum within a particular bandwidth of the delivered laser pulses, and a thickness, such that the percentage of light transmitted through the material (e.g., along the beam axis) is greater than 10%, greater than 25%, greater than 50%, greater than 75%, greater than 80%, greater than 85%, greater than 90%, greater than 95%, greater than 98%, or greater than 99%.

As will be appreciated, it can be difficult to efficiently process a compound workpiece having a component made of a material that is transparent to the wavelength of the delivered laser pulses, especially when the pulse duration of the delivered laser pulses is greater than a few tens of picoseconds. While use of "ultrashort" laser pulses (i.e., laser pulses having a pulse duration less than a few tens of picoseconds, and often having a pulse duration in the femtosecond range) can effectively process transparent workpiece components via nonlinear absorption, use of ultrashort laser pulses to process compound workpieces is not satisfactory either because the amount of material removed by each ultrashort laser pulse is relatively small. In view of these problems, some embodiments of the present invention provide an apparatus having multiple laser sources (also referred to herein as a "multi-source apparatus") for processing a compound workpiece (formed of both transparent and nontransparent workpiece components).

Figure 30:
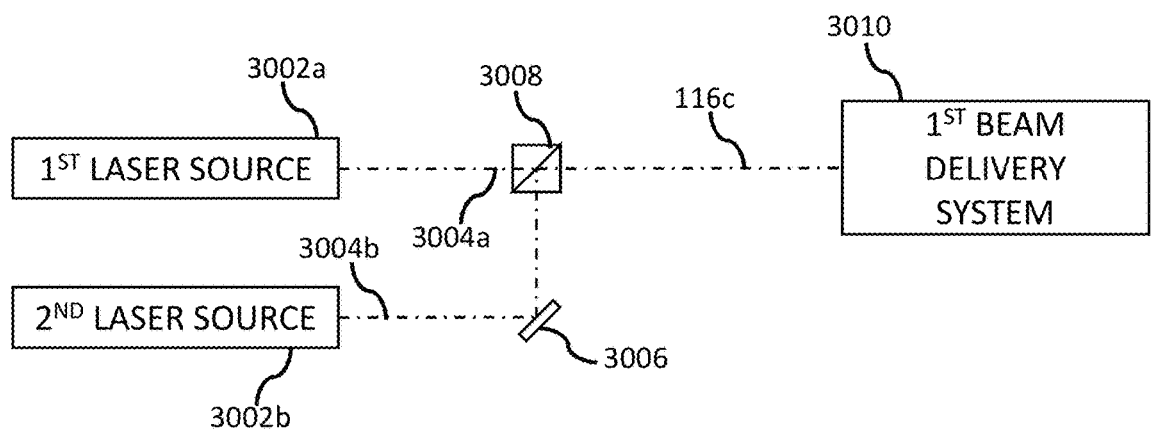
FIGS. 30 to 32 schematically illustrate a multi-source apparatus, according to some embodiments.

For example, and with reference to FIG. 30, one embodiment of a multi-source apparatus, such as apparatus 3000, may include a first laser source 3002a and a second laser source 3002b. Generally, each of the first laser source 3002a and the second laser source 3002b are both operative to generate laser energy sufficient to process the nontransparent workpiece component of a compound workpiece. In addition, the first laser source 3002a is also generally operative to generate laser energy sufficient to process the transparent workpiece component of the compound workpiece.

Generally, each of the first laser source 3002a and the second laser source 3002b may be provided as exemplarily described above with respect to laser source 104. Accordingly, each of the first laser source 3002a and the second laser source 3002b may include a pulse laser source, a CW laser source, a QCW laser source, a burst mode laser source, or the like or any combination thereof. In the event that either of the first laser source 3002a or the second laser source 3002b includes a QCW or CW laser source, such laser source may, optionally, include a pulse gating unit (e.g., an acousto-optic (AO) modulator (AOM), a beam chopper, etc.) to temporally modulate beam of laser radiation output from the QCW or CW laser source. In one embodiment, each of the first laser source 3002a and the second laser source 3002b are provided as a pulse laser source. In another embodiment, the first laser source 3002a is provided as a pulse laser source whereas the second laser source 3002b is provided as a QCW or CW laser source and includes a pulse gating unit to temporally modulate beam of laser radiation output from the QCW or CW laser source.

Depending upon the nature or composition of the various components in the compound workpiece, the second laser source 3002b may also be operative to generate laser energy sufficient to process the transparent workpiece component of the compound workpiece. For example if, during processing of a compound workpiece (e.g., a glass-reinforced epoxy laminate) having a transparent workpiece component (e.g., glass fibers) embedded within (or otherwise in contact with) a nontransparent workpiece component (e.g., a resin material), the nontransparent workpiece component may be directly processed (e.g., melted, vaporized, ablated, carbonized, etc.) upon exposure to laser energy generated by the first laser source 3002a or the second laser source 3002b. During, or as a result of, direct processing of the nontransparent workpiece component, the transparent workpiece component may become indirectly processed. For example, the transparent workpiece component may become cracked, heated, discolored (e.g., via a light- or heat-induced chemical reaction between the transparent and nontransparent workpiece components), coated (e.g., with the nontransparent workpiece component, with a residue of the nontransparent workpiece component, etc.). Such indirect processing of the transparent workpiece component may facilitate subsequent processing directly under the influence of laser energy generated by the second laser source 3002b. Depending upon the nature or composition of the various components in the compound workpiece, such subsequent direct processing may be substantial.

Generally, the first laser source 3002a is operative to output laser pulses having a first pulse duration, and the second laser source 3002b is operative to output laser pulses having a second pulse duration that is greater than the first pulse duration. For example, the first pulse duration can be less than 500 ps (e.g., less than 450 ps, 25 ps, 15 ps, 10 ps, 7 ps, 5 ps, 4 ps, 3 ps, 2 ps, 1 ps, 900 fs, 850 fs, 750 fs, 700 fs, 500 fs, 400 fs, 300 fs, 200 fs, 150 fs, 100 fs, 50 fs, 30 fs, 15 fs, 10 fs, etc., or between any of these values). In one embodiment, the second pulse duration can be greater than or equal to 500 ps (e.g., greater than or equal to 600 ps, 700 ps, 800 ps, 900 ps, 1 ns, 1.5 ns, 2 ns, 5 ns, 10 ns, 20 ns, 50 ns, 100 ns, 200 ns, 400 ns, 800 ns, 1000 ns, 2 μs, 5 μs, 10 μs, 50 μs, 100 μs, 200 μs, 300 μs, 500 μs, 900 μs, 1 ms, 2 ms, 5 ms, 10 ms, 20 ms, 50 ms, 100 ms, 300 ms, 500 ms, 900 ms, 1 s, etc., or between any of these values). In another embodiment, the second laser source 3002b is provided as a QCW or CW laser source and does not include a pulse gating unit (e.g., such that the second laser source 3002b can generate a QCW or CW beam of laser energy).

Generally, the first laser source 3002a is operative to output laser pulses at a first pulse repetition rate, and the second laser source 3002b is operative to output laser pulses at a first pulse repetition rate that is greater than the first pulse repetition rate. For example, the second pulse repetition rate can be greater than or equal to 100 kHz (e.g., greater than or equal to 150 kHz, 250 kHz, 500 kHz, 800 kHz, 900 kHz, 1 MHz, 2 MHz, 10 MHz, 20 MHz, 50 MHz, 70 MHz, 100 MHz, 150 MHz, 200 MHz, etc., or between any of these values). In one embodiment, the second pulse repetition rate is equal to 150 MHz (or thereabout) and the first pulse repetition rate is equal to 1 MHz (or thereabout). Alternatively, the first laser source 3002a and the second laser 3002b may be operative to output laser pulses at the same (or at least substantially the same) pulse repetition rate.

In one embodiment, the first laser source 3002a and the second laser source 3002b are operative to generate a beam of laser energy having at least substantially the same wavelength(s), and at least substantially the same spectral bandwidth (i.e., as measured at FWHM). For example, the first laser source 3002a and the second laser source 3002b are operative to generate a beam of laser energy having one or more wavelengths in the visible (e.g., green) range of the electromagnetic spectrum. In another embodiment, at least one of the wavelength and spectral bandwidth of laser energy generated by the first laser source 3002a may be different from (e.g., greater than, less than, or any combination thereof) the laser energy generated by the second laser source 3002b.

Although not illustrated, the apparatus 3000 also includes one or more optical components (e.g., beam expanders, beam shapers, apertures, harmonic generation crystals, filters, collimators, lenses, mirrors, polarizers, wave plates, diffractive optical elements, refractive optical elements, or the like or any combination thereof) to focus, expand, collimate, shape, polarize, filter, split, combine, crop, or otherwise modify, condition or direct laser energy generated by the first laser source 3002a and propagating along a first preliminary beam path 3004a. Likewise, the apparatus 3000 may include one or more optical components to focus, expand, collimate, shape, polarize, filter, split, combine, crop, or otherwise modify, condition or direct laser energy generated by the second laser source 3002b and propagating along a second preliminary beam path 3004b.

Laser energy propagating along the first preliminary beam path 3004a and the second preliminary beam path 3004b may be spatially combined in any suitable manner. For example, a fold mirror 3006 may be provided to direct the second preliminary beam path 3004b into a beam combiner 3008, which is also disposed in the first preliminary beam path 3004a. Upon exiting the beam combiner 3008, laser energy can propagate along beam path 116c (e.g., corresponding to the beam path 116 shown in FIG. 1) to a beam delivery system such as first beam delivery system 3010.

Generally, the first beam delivery system 3010 may include one or more positioners such as the aforementioned first positioner 106, the aforementioned second positioner 108, or any combination thereof, provided as exemplarily described above. In certain implementations, however, the beam combiner 3008 may alter a polarization state of laser energy propagating along the first preliminary beam path 3004a or the second preliminary beam path 3004b. As a result, laser energy propagating along the beam path 116c may be characterized by multiple polarization states (e.g., p—polarization states, s—polarization states, etc., or between any of these values). In such implementations, the first beam delivery system 3010 does not include components that are relatively sensitive to the polarization state of laser energy incident thereto (e.g., an AOD system which is generally operationally sensitive to laser energy having a linear polarization at a specific orientation). Rather, the first beam delivery system 3010 includes one or more components that are relatively polarization-insensitive, such as a galvanometer mirror system, a MEMs mirror or mirror array, an FSM, or the like or any combination thereof.

Although not illustrated, the apparatus 3000 may additionally include one or more components such as aforementioned third positioner 110, a scan lens (e.g., aforementioned scan lens 112), controller (e.g., aforementioned controller 114), or any other component previously discussed with respect to apparatus 100 or 700, or the like or any combination thereof.

In one embodiment, the controller 114 controls an operation of the first laser source 3002a and the second laser source 3002b to enable for the setting of, or adjustment to, a temporal offset between (or temporal overlap of) one or more laser pulses generated by the first laser source 3002a and one or more laser pulses generated by the second laser source 3002b. To facilitate such setting or adjustment, the apparatus 3000 may, in one embodiment, further include one or more synchronizers, oscillators, etc., as described in International Patent App. Pub. No. WO2015/108991, which is incorporated herein by reference in its entirety.

In another embodiment, the controller 114 does not control an operation of the first laser source 3002a and the second laser source 3002b to enable for the setting of, or adjustment to, a temporal offset between (or overlap of) any laser pulses generated by the first laser source 3002a and any laser pulses generated by the second laser source 3002b. In this case, the apparatus 3000 does not include the synchronizers, oscillators, etc., as described in aforementioned International Patent App. Pub. No. WO2015/108991. Rather, relative operational control of the first laser source 3002a and the second laser source 3002b is made without regard to the temporal relationship of laser pulses generated by the first laser source 3002a relative to the generation of laser energy by the second laser source 3002b (which may be pulsed or continuous). Accordingly, the first laser source 3002a may be operated to generate laser energy independently of whether the second laser source 3002b is operated to generate laser energy. Trigger signals transmitted to the first laser source 3002a and the second laser source 3002b may be synchronized relative to one another in any suitable or desirable manner, or may not be synchronized at all.

Figure 31:
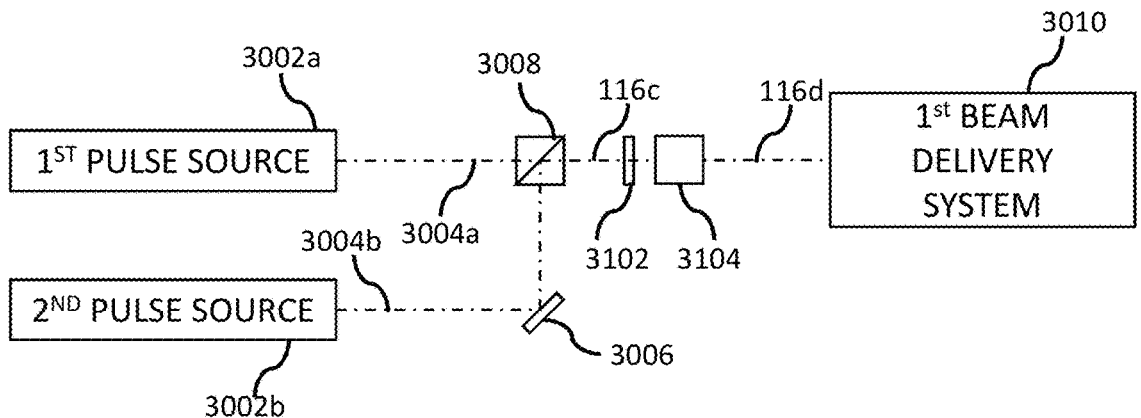

As mentioned above, laser energy propagating along the beam path 116c can contain multiple polarization states. Instead of limiting components in the first beam delivery system 3010 to those which are relatively polarization-insensitive, a multi-source apparatus can be provided to modify a polarization state of laser energy transmitted by the beam combiner 3008. For example, and with reference to FIG. 31, one embodiment of a multi-source apparatus, such as apparatus 3100, may be provided as discussed above with respect to apparatus 3000, but may further include a wave plate 3102 (e.g., a half-wave plate) disposed in beam path 116c to alter the polarization states of laser energy transmitted by the beam combiner 3008, and a polarizer 3104 to filter a portion of the laser energy transmitted by the wave plate 3102. Laser energy transmitted by the polarizer 3104 can thereafter propagate along beam path 116d (e.g., corresponding to the beam path 116 shown in FIG. 1) to the first beam delivery system 3010. In one embodiment, one or both of the wave plate 3102 and the polarizer 3104 can be adjusted (e.g., rotated about the axis of beam path 116c) to adjust the ratio of the amount of power within the beam of laser energy propagating along beam path 116d, which originated from the first laser source 3002a, versus that which originated from the second laser source 3002b. Accordingly, laser energy propagating along the beam path 116d can contain a 50:50 mix of power originating from the first and second laser sources, respectively, or any other suitable or desired ratio (e.g., 60:40, 70:30, 80:20, 90:10, 10:90, 20:80, 30:70, 40:60, etc., or between any of these values). In the present embodiment, the first beam delivery system 3010 can be provided as discussed above with respect to the apparatus 3000, or may be provided to include one or more polarization-sensitive components such as an AOD system as exemplarily described above.

Figure 32:
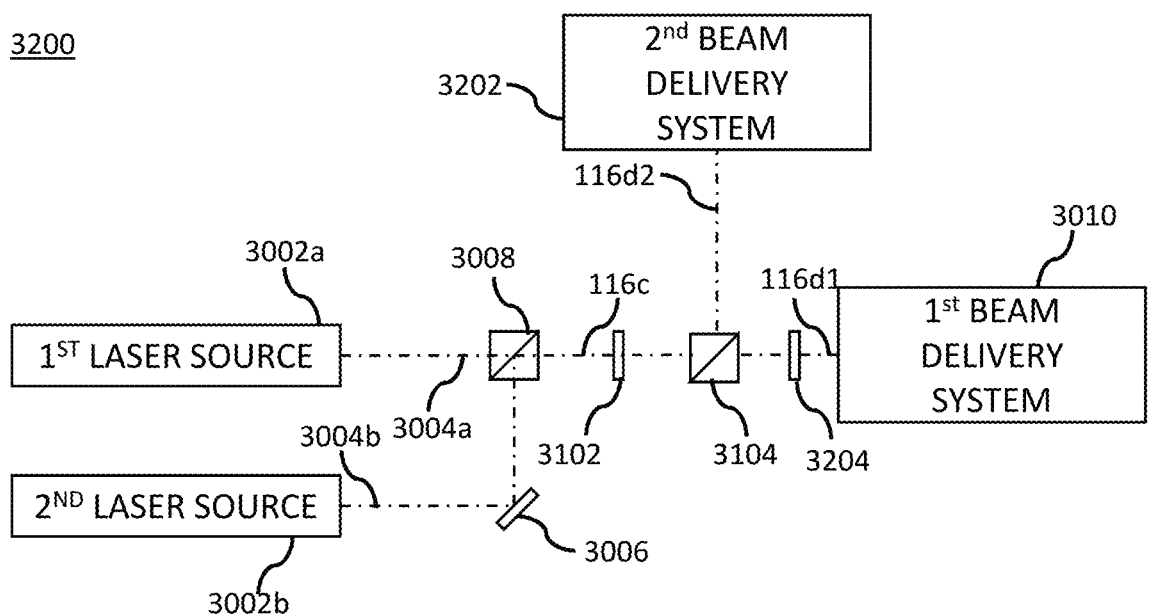

In another embodiment, and with reference to FIG. 32, one embodiment of a multi-source apparatus, such as apparatus 3200, may be provided as discussed above with respect to apparatus 3100, but may further include a second beam delivery system 3202 optically coupled to the polarizer 3104 (e.g., via beam path 116d2), whereas the first beam delivery system 3010 is optically coupled to the polarizer 3104 via beam path 116d1. The second beam delivery system 3202 may be configured in the same manner as (or different from) the first beam delivery system 3010. In the embodiment shown in FIG. 32, each of beam paths 116d1 and 116d2 correspond to a different instance of the beam path 116 shown in FIG. 1. In this embodiment, the wave plate 3102 and polarizer 3104 (shown here as a polarizing beam splitter cube) are configured such that each of the beam paths 116d1 and 116d2 contain half (or at least roughly half) of the optical power originated from the first laser source 3002a and half (or at least roughly half) of the optical power originated from the second laser source 3002b. An additional wave plate 3204 (e.g., a half-wave plate) is disposed in beam path 116d1 to alter the polarization state of laser energy transmitted by the polarizing beam splitter cube 3104.

In another embodiment, within the apparatus 3200, the half-wave plate 3102, the polarizer 3104 and the half-wave plate 3204 may be omitted and replaced by a spinning chopper mirror, rotating polygon mirror, resonant galvanometer mirror system, or the like or any combination thereof, to distribute laser energy along the beam paths 116d1 and 116d2. In this case, the first beam delivery system 3010 and the second beam delivery system 3202 does not contain any polarization sensitive components.

Figure 33:
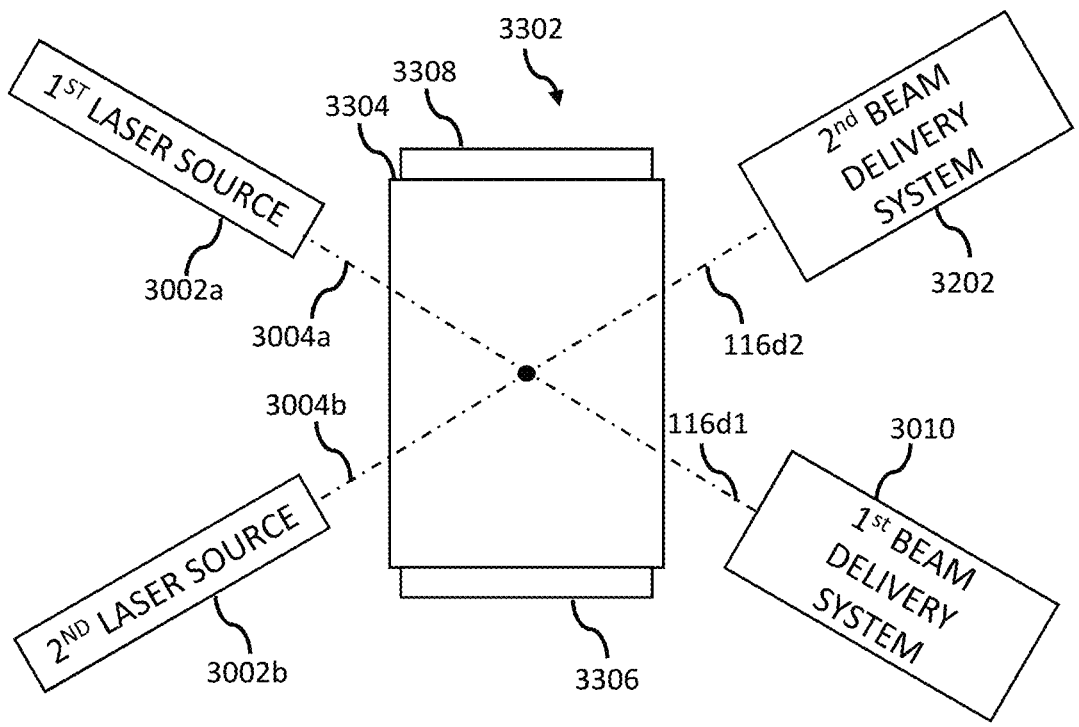
FIG. 33 schematically illustrates a manner of combining beams of laser energy in a multi-source apparatus, according to one embodiment.

In another embodiment, and with reference to FIG. 33, one embodiment of a multi-source apparatus, such as apparatus 3300, may include a beam distributor 3302 configured to variously direct laser pulses output by the first laser source 3002a and the second laser source 3002b to the first beam delivery system 3010, to the second beam delivery system 3202, or any combination thereof. In this case, the beam distributor 3302 may include an AO cell 3304, an ultrasonic transducer element 3306 acoustically coupled to one side of the AO cell 3304, and an absorber 3308 acoustically coupled to another side of the AO cell 3304 opposite the ultrasonic transducer element 3306.

As illustrated, the first laser source 3002a and the second laser source 3002b can be aligned (or one or more optical components can be provided) such that laser pulses propagating along the first preliminary beam path 3004a and the second preliminary beam path 3004b can completely (or at least substantially completely) overlap one another at a region (e.g., indicated by the black dot) within the AO cell 3304. Further, light within the laser pulses propagating along the first preliminary beam path 3004a and the second preliminary beam path 3004b can be generated or otherwise conditioned by in any suitable manner to have a polarization state necessary to be suitably diffracted within the AO cell 3304, to be suitably deflected by the first beam delivery system 3010 or the second beam delivery system 3202.

The ultrasonic transducer element 3306 generates an acoustic wave within the AO cell 3304 upon being driven by an applied RF signal, where the power of the applied RF signal is modulated (while maintaining a constant RF frequency) to control the power of laser pulses deflected within the AO cell 3304. In the absence of any applied RF signal, no acoustic wave is generated within the AO cell 3304 by the ultrasonic transducer element 3306, and any laser pulses generated by the first laser source 3002a and the first laser source 3002b, which are incident to the AO cell 3304, can pass through the AO cell 3304 to respective ones of the first beam delivery system 3010 and the second beam delivery system 3202. For example, in the absence of an RF signal laser applied to the ultrasonic transducer element 3306, laser pulses propagating along the first preliminary beam path 3004a are passed by the AO cell 3304 to propagate along beam path 116d1 to the first beam delivery system 3010 and, similarly, laser pulses propagating along the second preliminary beam path 3004b are passed by the AO cell 3304 to propagate along beam path 116d2 to the second beam delivery system 3202. Thus, beam path 116d1 constitutes the zeroth-order beam path for the first laser source 3002a and beam path 116d2 constitutes the zeroth-order beam path for the second laser source 3002b.

When an RF signal having a first power level (e.g., a "full power level") is applied to the ultrasonic transducer element 3306, most of the power (e.g., about 90%) in the laser pulses propagating along the first preliminary beam path 3004a is deflected by the AO cell 3304 to propagate along beam path 116d2 to the second beam delivery system 3202 and, likewise, most of the power (e.g., about 90%) in the laser pulses propagating along the second preliminary beam path 3004b are deflected by the AO cell 3304 to propagate along beam path 116d1 to the first beam delivery system 3010. In this case, a residual amount of power (e.g., about 10%) in the laser pulses propagating along the first preliminary beam path 3004a is passed by the AO cell 3304 to propagate along beam path 116d1 to the first beam delivery system 3010 and, likewise, a residual amount of power (e.g., about 10%) in the laser pulses propagating along the second preliminary beam path 3004b is passed by the AO cell 3304 to propagate along beam path 116d2 to the first second delivery system 3202.

In view of above, it will be appreciated that, when the ultrasonic transducer element 3306 is driven at full power, about 90% of the power in laser pulses generated by the first laser source 3002a and about 10% of the power in laser pulses generated by the second laser source 3002b is delivered to the second beam delivery system 3202, while about 90% of the power in laser pulses generated by the second laser source 3002b and about 10% of the power in laser pulses generated by the first laser source 3002a is delivered to the first beam delivery system 3010. The amount of power in the laser pulses generated by any single laser source and ultimately delivered to the first beam delivery system 3010 and the second beam delivery system 3202 can be further modulated by varying the power of the RF signal applied to the ultrasonic transducer element 3306. For example, when an RF signal having a second power level that is 50% of the first power level is applied to the ultrasonic transducer element 3306, about 50% of the power in laser pulses generated by the first laser source 3002a and the second laser source 3002b is delivered to the first beam delivery system 3010 and to the second beam delivery system 3202. The power level of the applied RF signal can be kept constant while the workpiece 102 is processed to form a feature, or can be varied during the formation of an individual feature.

Although the multi-source apparatus 3300 has been described as including both the first beam delivery system 3010 and the second beam delivery system 3202, it will be appreciated that the multi-source apparatus 3300 may include only the first beam delivery system 3010 or only the second beam delivery system 3202. In such a case, the omitted beam delivery system may be replaced by a beam dump.

Generally, the rate (also referred to as a "modulation rate") with which the power of an applied RF signal can be varied to thereby modulate the amount power in laser pulses that is ultimately delivered to the first beam delivery system 3010 or the second beam delivery system 3202, from either the first laser source 3002a or the second laser source 3002b, is in a range from 50 kHz (or thereabout) to 10 MHz (or thereabout). In one embodiment, the modulation rate is in a range from 100 kHz (or thereabout) to 2 MHz (or thereabout). In another embodiment, the modulation rate is 1 MHz (or thereabout). Thus, the relative power levels of laser pulses generated by the first laser source 3002a and the second laser source 3002b that are ultimately delivered to either of the first beam delivery system 3010 or the second beam delivery system 3202 can be changed rapidly during processing of the workpiece 102, simply by modulating the power level of the RF signal applied to the ultrasonic transducer element 3306.

For example, if the first beam delivery system 3010 is to be used to form a feature such as a via (e.g., a blind via, a through via, etc.) in a multilayered workpiece including an electrical conductor structure (e.g., a film, foil, etc., which may be formed of copper, a copper alloy, etc.) provided (e.g., deposited, laminated, etc.) on a top surface of a compound workpiece such as a glass-reinforced epoxy laminate material, then the power of an applied RF signal can be initially set such that more than 50% (e.g., at least 55%, at least 60%, at least 75%, at least 80%, at least 85%, etc., or between any of these values) of the power in laser pulses generated by the second laser source 3002b is delivered to the first beam delivery system 3010 to form an opening in the electrical conductor that exposes the compound workpiece. Thereafter, the power of an applied RF signal can be rapidly modulated such that more than 50% (e.g., at least 55%, at least 60%, at least 75%, at least 80%, at least 85%, etc., or between any of these values) of the power in laser pulses generated by the first laser source 3002a is delivered to the first beam delivery system 3010 to form the via in the compound workpiece.

XII. Embodiments Concerning Thermal Management

A. Thermal Management of Workpiece

Sometimes, during processing of a workpiece, the temperature of the ambient environment in the vicinity of a worksurface 102a of the workpiece 102 can rise due to heat generating as a result of laser-material interactions between the delivered laser pulses and the workpiece. Such can be the case when performing a laser process such as via drilling in workpieces such as PCB panels. If the temperature rise becomes high enough, the workpiece can undesirably expand, which can degrade the positional accuracy and precision with vias are drilled. To help maintain the positional accuracy and precision with which vias are drilled in the workpiece 102, the apparatus 100 can optionally be provided with a temperature control system.

In one embodiment, the temperature control system includes a temperature sensor 120 coupled to an input of the controller 114, and a temperature-controlled fluid nozzle 122. The temperature sensor 120 is configured to measure a temperature of (or a characteristic indicative of the temperature of) the ambient environment (e.g., the ambient air) in the vicinity of the worksurface 102a. The temperature-controlled fluid nozzle 122 is configured to induce a temperature-controlled gaseous flow (e.g., air) into the ambient environment within the vicinity of the worksurface 102a. Typically, the temperature of the gaseous flow induced by the fluid nozzle 122 will be relatively cool compared to the temperature measured by the temperature sensor 120. Thus, the gaseous flow can act to carry heat away from the ambient environment in the vicinity of the worksurface 102a (and, consequently, to also carry away from the workpiece). In one embodiment, the apparatus 100 may include a collection nozzle as disclosed in U.S. Patent App. Pub. No. 2014/0026351 (and the motive nozzle therein would deliver temperature-controlled fluid, thus acting as the temperature-controlled fluid nozzle described herein).

During operation, the temperature sensor 120 can generate one or more signals (e.g., "temperature signals") indicative of the measured temperature (or characteristic thereof) and output the same to the controller 114. The controller 114 can process the temperature signal(s) to determine whether or not the measured temperature is outside a predetermined nominal temperature process window (e.g., ±10 degrees Celsius, ±5 degrees Celsius, ±2 degrees Celsius, etc.). If the measured temperature is determined to be outside the nominal temperature process window (e.g., higher than the nominal temperature process window), then the controller 114 can generate and output one or more control signals to the temperature-controlled fluid nozzle 122 to induce a fluid flow having a temperature that is different from (e.g., lower than) the measured temperature to bring the temperature of the ambient environment within the vicinity of the worksurface 102a back to within the nominal temperature process window. In the illustrated embodiment, the controller 114 can be considered to be part of the temperature control system insofar as it is communicatively coupled to the temperature sensor 120 and the fluid nozzle 122. In other embodiments, however, the temperature sensor 120 and the fluid nozzle 122 may be coupled to a different controller (not shown, but having a construction and operation that is the same or similar to that of the controller 114) associated with the temperature control system. Although the temperature control system has been described as being an optional component of the apparatus 100, it will be appreciated that the temperature control system may be incorporated into another apparatus (either a laser-processing apparatus or otherwise) other than the apparatus 100.

B. Thermal Management of the AO Cell

Figure 34:
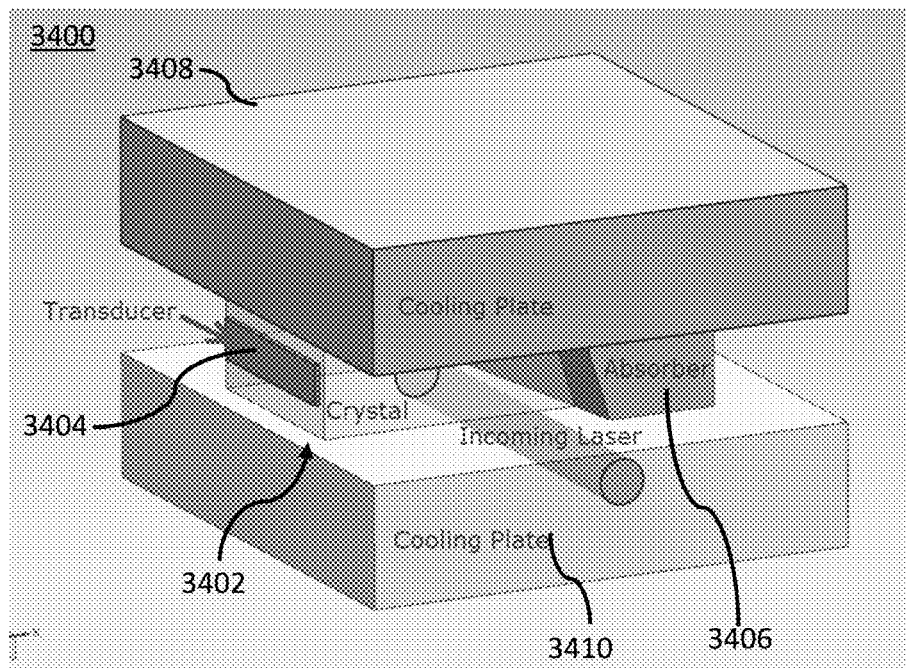
FIGS. 34 to 37 schematically illustrate techniques for managing thermal loads within an AO cell, according to some embodiments.
Figure 35:
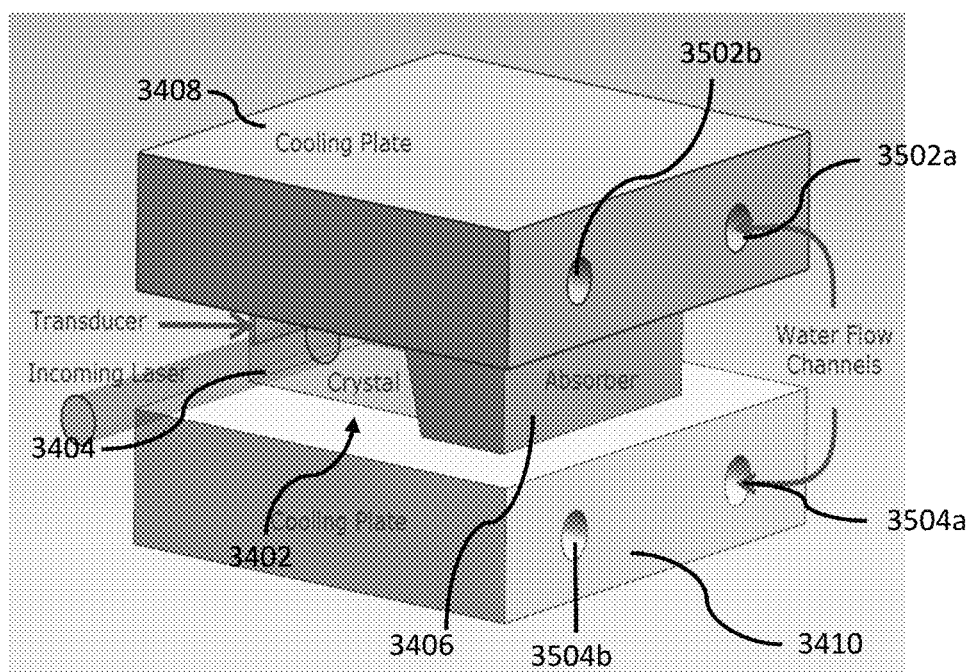

As mentioned above, acoustic waves are typically launched into an AO cell by driving an ultrasonic transducer element, acoustically coupled to one end of the AO cell (also referred to as a "connector end"), at one or more RF frequencies. An example AO device (i.e., which may be an AOM, an AOD, etc.) having the construction described above is shown in FIGS. 34 and 35. Referring to FIGS. 34 and 35, an exemplary AO device 3400 includes an AO cell 3402, an ultrasonic transducer element 3404 acoustically coupled to a connector end of the AO cell 3402, and an absorber 3406 acoustically coupled to an absorber end of the AO cell 3402, opposite the connector end. In FIGS. 34 and 35, a beam of laser energy 3408 is illustrated as entering into the AO cell 3402 through an input face thereof.

Acoustic waves propagating through the AO cell 3402 generate heat, which is beneficially extracted to prevent the AO cell 3402 from degrading (e.g., optically, physically, etc.). A common method of cooling the AO cell 3402 is to attach cooling plates to the AO cell 3402 at positions which will not interfere with the propagation of optical waves from the input face to output face of the AO cell. For example, and with reference to FIGS. 34 and 35, a first cooling plate 3408 may be thermally coupled to a first thermal extraction face of the AO cell 3402, and a second cooling plate 3410 may be thermally coupled to a second thermal extraction face of the AO cell 3402 that is opposite the first thermal extraction face. Generally, the first and second thermal extraction faces can be characterized as oppositely-situated faces (or facets) of the AO cell 3402, which are not covered by the ultrasonic transducer element 3304 or the absorber 3406. Also, the beam of laser energy does not typically propagate through the first and second thermal extractions faces.

Generally, the AO cell 3402 can have a length dimension (i.e., as measured from the input face to the output face), in a range from 15 mm (or thereabout) to 35 mm (or thereabout). In one embodiment, the length of the AO cell 3402 can be in a range from 18 mm to 30 mm. In another embodiment, the length of the AO cell 3402 is in a range from 20 mm to 30 mm. In yet another embodiment, the length of the AO cell 3402 is in a range from 22 mm to 28 mm. It should be recognized, however, that the AO cell 3402 can have a length that is less than 15 mm, or greater than 30 mm.

Generally, the AO cell 3402 can have a thickness dimension (i.e., as measured from the first thermal extraction face to the second thermal extraction face), in a range from 15 mm (or thereabout) to 35 mm (or thereabout). In one embodiment, the thickness of the AO cell 3402 can be in a range from 18 mm to 30 mm. In another embodiment, the thickness of the AO cell 3402 is in a range from 20 mm to 30 mm. In yet another embodiment, the thickness of the AO cell 3402 is in a range from 22 mm to 28 mm. It should be recognized, however, that the AO cell 3402 can have a thickness that is less than 15 mm, or greater than 30 mm. It should also be recognized that thickness of the AO cell 3402 can be greater than, equal to, or less than the length of the AO cell 3402.

Generally, the AO cell 3402 can have a width dimension (i.e., as measured from the connector end to the absorber end), in a range from 15 mm (or thereabout) to 35 mm (or thereabout). In one embodiment, the width of the AO cell 3402 can be in a range from 18 mm to 30 mm. In another embodiment, the width of the AO cell 3402 is in a range from 20 mm to 30 mm. In yet another embodiment, the width of the AO cell 3402 is in a range from 22 mm to 28 mm. It should be recognized, however, that the AO cell 3402 can have a width that is less than 15 mm, or greater than 30 mm. It should also be recognized that width of the AO cell 3402 can be greater than, equal to, or less than any of the length or thickness of the AO cell 3402.

The first cooling plate 3408 and the second cooling plate 3410 are generally cooled by flowing water through one or more channels formed therein. For example, and with reference to FIG. 35, first cooling plate 3408 and second cooling plate 3410 each include a cooling channel formed therein (e.g., a U-shaped channel, where only the ends of the channels are shown). In FIG. 35, ends 3502a and 3502b are input and output ends, respectively, of a cooling channel formed in first cooling plate 3408. Likewise, ends 3504a and 3504b are input and output ends, respectively, of a cooling channel formed in the second cooling plate 3410. A pump (not shown) can be provided to generate a flow of coolant (e.g., water) through each cooling channel (e.g., such that coolant enters a cooling channel through an input end 3502a or 3504a, and exits the cooling channel through an output end 3502b or 3504b, respectively, to remove heat from the AO cell 3402.

Cooling plates such as those described above are configured to remove roughly the same amount of heat from the center of the AO cell 3402 as they do from the connector and absorber ends. However, the amount of heat generated at the connector end of the AO cell 3402 can be high compared to a central region of the AO cell 3402, and can be even higher at the absorber end of the AO cell 3402. Thermal gradients may, to a lesser extent, also be present across the length and thickness dimensions of the AO cell 3402. Sufficiently large thermal gradients within the AO cell 3402 can cause undesirable thermal lensing effects, deterioration in diffraction efficiency, deflection errors, etc.

Conventionally, deleterious effects associated with undesirably large thermal gradients within the AO cell 3402 are minimized or avoided by confining the beam of laser energy propagating through the AO cell 3402 to within a relatively small volume (also referred to herein as a "working volume") of the AO cell 3402 (e.g., measuring 4 mm to 5 mm, in the width dimension). However, it would be desirable to increase the working volume of the AO cell 3402, at least in the width dimension. Thus, in accordance with some embodiments, an AO device is configured to provide for non-uniform heat removal, wherein less heat is removed from the central region of the AO cell 3402 than from peripheral regions of the AO cell 3402 (i.e., regions of the AO cell 3402 at or near the connector end, at or near the absorber end, or any combination thereof.

In some embodiments, non-uniform heat removal is accomplished by providing, instead of a cooling plate such as the first cooling plate 3408 or the second cooling plate 3410, a "non-uniform" cooling plate configured to remove less heat from the central region of the AO cell 3402 than from one or more peripheral regions of the AO cell 3402.

Figure 36:
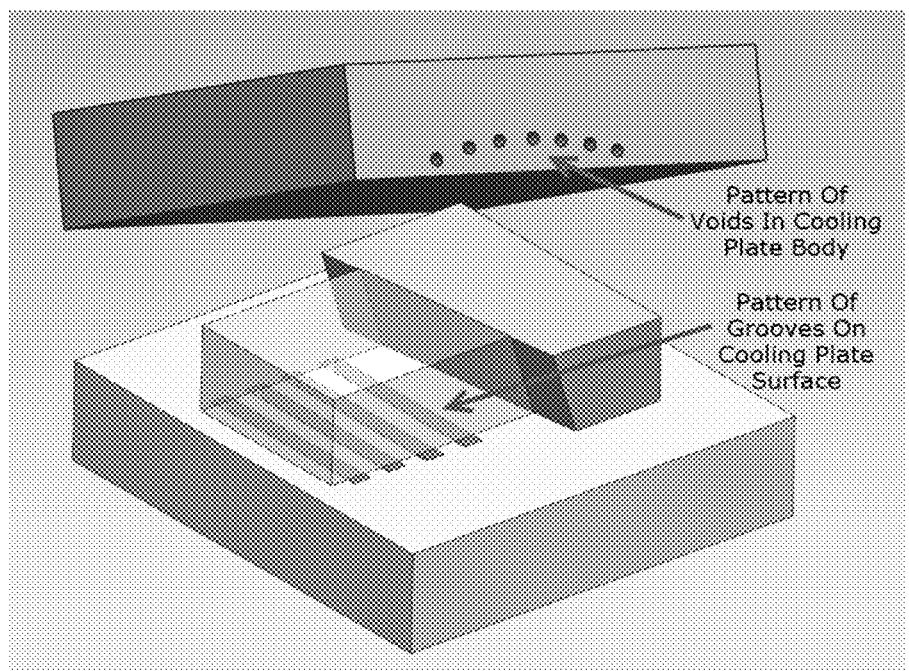

For example, a non-uniform cooling plate can be provided with one or more grooves, pits, etc., formed in a thermal extraction surface thereof (e.g., a surface which forms a thermal interface with the first or second thermal extraction face of the AO cell 3402) at a location corresponding to the central region of the AO cell 3402. When disposed in the thermal contact with a thermal extraction face of the AO cell 3402, the one or more grooves, pits, etc., help define voids within the central region of the AO cell 3402, which act as impediments thermal transfer (i.e., relative to the thermal interface between the AO cell 3402 and the non-uniform cooling plate). See, e.g., FIG. 36.

In another example, a non-uniform cooling plate can be provided with one or more voids, channels, etc., formed within the interior thereof (e.g., spaced apart from the thermal extraction surface) at a location corresponding to the central region of the AO cell 3402. When disposed in the thermal contact with a thermal extraction face of the AO cell 3402, the one or more voids, pits, etc., act as impediments to thermal transfer from the central region of the AO cell 3402. See, e.g., FIG. 36.

Figure 37:
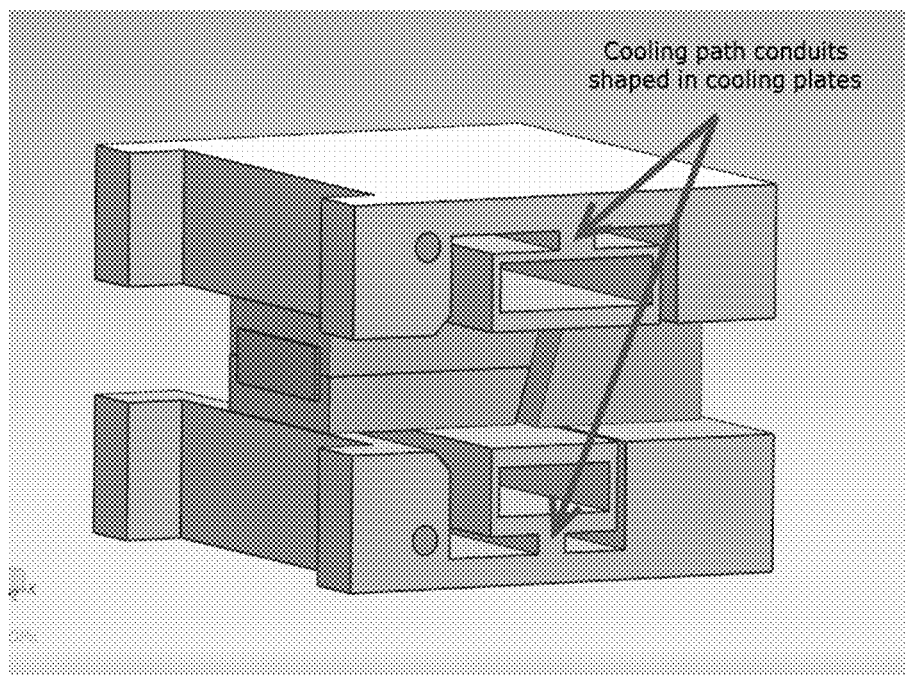

In another example, a non-uniform cooling plate can be provided with one or more voids, channels, etc., formed within the interior thereof (e.g., spaced apart from the thermal extraction surface), as well as grooves formed in the surface thereof, at a location corresponding to the central region of the AO cell 3402, resulting in a so-called "thermal choke" structure that has a reduced capacity to conduct transfer heat from the AO cell 3402. An example of such as thermal choke structure, which is composed of cooling path conduits, is illustrated in FIG. 37.

In yet another example, a non-uniform cooling plate can be formed of multiple materials having different heat transfer characteristics. For example, the non-uniform cooling plate can be formed of a first material having a first thermal conductivity at a location corresponding to the central region of the AO cell 3402, and a second material having a second thermal conductivity (higher than the first thermal conductivity) at one or more locations corresponding to a peripheral region of the AO cell 3402.

In still another example, a non-uniform cooling plate can include one or more cooling channels, formed as discussed above, but more cooling channels may be located at a region of the cooling plate corresponding to a peripheral region of the AO cell 3402 than at a region of the cooling plate corresponding to the central region of the AO cell 3402. In one implementation, the non-uniform cooling plate can contain no cooling channels in a region of the cooling plate corresponding to a central region of the AO cell 3402.

In yet another example, a non-uniform cooling plate can include one or more cooling channels, formed as discussed above, but the flow rate of coolant through one or more cooling channels located at a region of the cooling plate corresponding to the central region of the AO cell 3402 may be lower than a flow rate of coolant through one or more cooling channels located at a region of the cooling plate corresponding to a peripheral region of the AO cell 3402.

In another example, a non-uniform cooling plate may simply be configured so as to thermally contact a thermal extraction face at one or more locations corresponding to a peripheral region of the AO cell 3402, but not at a location corresponding to the central region of the AO cell 3402.

In another embodiment, non-uniform heat removal can be accomplished by providing a cooling plate in thermal contact with a thermal extraction face of the AO cell 3402 only at a region corresponding to a peripheral region of the AO cell 3402, by providing a heating element in thermal contact with the thermal extraction face at a location corresponding to the central region of the AO cell 3402, or any combination thereof. In this embodiment, the heating element acts to heat the central region of the AO cell 3402 so as to reduce the temperature difference(s) within the AO cell 3402 between the central region and one or more of the peripheral regions thereof.

XIII. Conclusion

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. An apparatus for laser-processing a workpiece comprising an electrical conductor structure in thermal contact with a dielectric structure, the apparatus comprising:
   a laser source configured to generate a plurality of laser pulses;
   a scan lens arranged in a beam path along which the plurality of laser pulses are directable to the workpiece to thereby irradiate a process spot at the workpiece;
   a first positioner including an acousto-optical deflector (AOD) system arranged along the optical path between the laser source and the scan lens, wherein the first positioner is operative to deflect the plurality of laser pulses relative to the scan lens;
   a controller communicatively coupled to the first positioner and configured to control an operation of the first positioner, wherein the controller includes:
      a processor configured to generate one or more control signals to which the first positioner is responsive; and
      computer memory accessible by the processor, wherein the computer memory has instructions stored thereon which, when executed by the processor, cause the first positioner to scan the process spot along a process trajectory to form a via in the workpiece, wherein the process trajectory defines a sequence of spot locations to be addressed upon irradiating the workpiece with the plurality of laser pulses during formation of the via and wherein the controller is configured to control the operation of the first positioner to form the via such that the laser pulses irradiating the workpiece at the sequence of spot locations:
         a) vaporize a first region of the dielectric structure at the surface, thereby generating a high-pressure region between the first region of the dielectric structure and a first region of the electrical conductor structure, and
         b) heat the first region of the electrical conductor structure such that at least a portion of the heated first region of the electrical conductor structure is ejectable from the workpiece by the high-pressure region.

2. The apparatus of claim 1, wherein the laser pulses have a wavelength of less than 1 μm.

3. The apparatus of claim 2, wherein the laser pulses are delivered to the workpiece at a pulse repetition rate greater than or equal to 100 MHz.

4. The apparatus of claim 1, wherein the laser pulses have a pulse duration greater than or equal to 1 ns.

5. The apparatus of claim 1, wherein the laser pulses have an average power greater than or equal to 100 W.

6. The apparatus of claim 1, wherein a pulse repetition rate at which laser pulses irradiate the workpiece is greater than a rate with which different spot locations of the sequence of spot locations are addressed.

7. The apparatus of claim 1, wherein a pulse repetition rate at which laser pulses irradiate the workpiece is equal to a rate with which different spot locations of the sequence of spot locations are addressed.

8. The apparatus of claim 1, wherein a pulse repetition rate at which laser pulses irradiate workpiece is less than a rate with which different spot locations of the sequence of spot locations are addressed.

9. The apparatus of claim 1, wherein the first positioner is operated to scan the process spot such that a different spot location of the sequence of spot locations is addressed at a rate in a range from 50 kHz to 10 MHz.

10. The apparatus of claim 9, wherein the rate is greater than 1 MHz.

11. The apparatus of claim 1, wherein a pitch between one pair of adjacent spot locations in the sequence of spot locations is equal to a pitch between another pair of adjacent spot locations in the sequence of spot locations.

12. The apparatus of claim 1, wherein a pitch between one pair of adjacent spot locations in the sequence of spot locations is different from a pitch between another pair of adjacent spot locations in the sequence of spot locations.

13. The apparatus of claim 1, wherein a period of time during which one spot location of the sequence of spot locations is irradiated by laser energy is equal to a period of time during which another spot location of the sequence of spot locations is irradiated by laser energy.

14. The apparatus of claim 1, wherein a period of time during which one spot location of the sequence of spot locations is irradiated by laser energy is different from a period of time during which another spot location of the sequence of spot locations is irradiated by laser energy.

15. The apparatus of claim 1, wherein the process trajectory defines a sequence of spot locations arranged in a circular scan pattern.

16. The apparatus of claim 1, wherein the controller is configured to control the operation of the first positioner to form the via such that the laser pulses irradiating the workpiece at the sequence of spot locations heat the first region of the electrical conductor structure to at least 50% of the melting point of the electrical conductor structure.

17. An apparatus for processing a workpiece comprising an electrical conductor structure in thermal contact with a dielectric structure, the apparatus comprising:
   a laser source operative to generate a beam of laser energy comprising a plurality of laser pulses, wherein laser pulses of the plurality of laser pulses have a wavelength of less than 1 µm and a pulse energy in a range from 100 µJ to 50 µJ over a time scale of at least one microsecond;

a positioner arranged within a beam path along which the beam of laser energy can propagate to the workpiece and irradiate the workpiece, wherein the first positioner is operative to impart movement of the beam path relative to the workpiece;

a controller communicatively coupled to the positioner and configured to generate one or more control signals to which the positioner is responsive to cause the positioner to irradiate the workpiece according to a scanning technique to deliver at least one laser pulse from the beam of laser energy to the workpiece to form a via in the workpiece, wherein characteristics of the beam of laser energy and the scanning technique are such that laser pulses delivered to the workpiece:

a) vaporize a first region of the dielectric structure at the surface, thereby generating a high-pressure region between the first region of the dielectric structure and a first region of the electrical conductor structure, and b) heat the first region of the electrical conductor structure such that at least a portion of the heated first region of the electrical conductor structure is ejectable from the workpiece by the high-pressure region.

18. The apparatus of claim 17, wherein the beam of laser energy has a wavelength in the visible green range of the electromagnetic spectrum.

19. The apparatus of claim 17, wherein, according to the scanning technique, at least one laser pulse from the beam of laser energy is delivered to the same location on the workpiece to form the via in the workpiece.

20. The apparatus of claim 18, wherein a plurality of laser pulses from the beam of laser energy are delivered to the same location on the workpiece over a time period in a range from 1 µs to 30 µs.

* * * * *

UNITED STATES PATENT AND TRADEMARK OFFICE
CERTIFICATE OF CORRECTION

| | |
|---|---|
| PATENT NO. | : 11,077,526 B2 |
| APPLICATION NO. | : 15/750140 |
| DATED | : August 3, 2021 |
| INVENTOR(S) | : Jan Kleinert, Zhibin Lin and Hisashi Matsumoto |

It is certified that error appears in the above-identified patent and that said Letters Patent is hereby corrected as shown below:

In the Claims

Column 83, Line 67, replace the term "the surface," with --the surface of the dielectric structure,--.

Column 85, Lines 20-21, replace the term "the surface," with --the surface of the dielectric structure,--.

Signed and Sealed this
Fourth Day of July, 2023

Katherine Kelly Vidal
*Director of the United States Patent and Trademark Office*